(12) United States Patent
Lee

(10) Patent No.: US 9,584,799 B2
(45) Date of Patent: Feb. 28, 2017

(54) DISPLAY DEVICE AND DRIVING METHOD THEREOF

(75) Inventor: Baek-Woon Lee, Yongin (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 648 days.

(21) Appl. No.: 13/242,978

(22) Filed: Sep. 23, 2011

(65) Prior Publication Data
US 2012/0249615 A1    Oct. 4, 2012

(30) Foreign Application Priority Data
Mar. 29, 2011    (KR) .................. 10-2011-0028249

(51) Int. Cl.
*G09G 5/10*    (2006.01)
*H04N 13/04*    (2006.01)
(Continued)

(52) U.S. Cl.
CPC ......... *H04N 13/0438* (2013.01); *G09G 3/003* (2013.01); *G09G 3/3233* (2013.01); *H04N 13/0029* (2013.01); *H04N 13/0497* (2013.01); *G09G 2300/0819* (2013.01); *G09G 2310/0224* (2013.01); *G09G 2310/0251* (2013.01); *G09G 2340/0435* (2013.01)

(58) Field of Classification Search
CPC .. G09G 3/3233; G02B 27/017; G02B 6/0018; G02B 6/0002; G02B 6/0028; G02B 6/0036
USPC ...................... 345/76–83, 690–691
See application file for complete search history.

(56) References Cited

U.S. PATENT DOCUMENTS 5,633,682 A    5/1997    Tahara
2004/0095338 A1*    5/2004    Miyazawa .................... 345/204
(Continued)

FOREIGN PATENT DOCUMENTS

CN    1494048 A    5/2004
EP    1793366 A2    6/2007
(Continued)

OTHER PUBLICATIONS

Sanford, et al.; TFT AMOLED Pixel Circuits and Driving Methods; 2003 SID International Symposium; May 20, 2003; pp. 10-13; SID 03 Digest; Baltimore, MD; USA.
(Continued)

*Primary Examiner* — Kwin Xie
(74) *Attorney, Agent, or Firm* — Lee & Morse, P.C.

(57) ABSTRACT

A method of driving a display device including a plurality of pixels, the method including transmitting a plurality of data signals to first group pixels during a first scan period, simultaneously emitting light through the first group pixels according to a programmed data signal during a first light emitting period adjacent to the first scan period, transmitting a plurality of data signals to second group pixels, different from the first group pixels, during a second scan period, and simultaneously emitting light through the second group pixels according to a programmed data signal during a second light emitting period adjacent to the second scan period. A first field including the first scan period and the first light emitting period and a second field including the second scan period and the second light emitting period are temporally divided.

30 Claims, 34 Drawing Sheets

(51) Int. Cl.
  *G09G 3/00*  (2006.01)
  *G09G 3/32*  (2016.01)
  *H04N 13/00* (2006.01)

(56) References Cited

U.S. PATENT DOCUMENTS

| | | | |
|---|---|---|---|
| 2006/0103611 A1* | 5/2006 | Choi | 345/82 |
| 2006/0256058 A1* | 11/2006 | Asano | G09G 3/3233 345/92 |
| 2008/0150846 A1* | 6/2008 | Chung | 345/80 |
| 2008/0297541 A1* | 12/2008 | Credelle | 345/694 |
| 2009/0109208 A1 | 4/2009 | Yamashita et al. | |
| 2010/0277641 A1 | 11/2010 | Kato et al. | |
| 2011/0025671 A1* | 2/2011 | Lee | 345/211 |
| 2011/0058016 A1 | 3/2011 | Hulyalkar et al. | |
| 2011/0193855 A1* | 8/2011 | Han | G09G 3/3233 345/214 |

FOREIGN PATENT DOCUMENTS

| | | |
|---|---|---|
| EP | 1936596 A1 | 6/2008 |
| EP | 2237255 A2 | 10/2010 |
| JP | 01-316092 | 12/1989 |
| JP | 07-123447 | 5/1995 |
| JP | 2003-122303 | 4/2003 |
| JP | 2008-158477 | 7/2008 |
| KR | 10-2003-0090408 A | 11/2003 |
| KR | 10-2005-0014124 A | 2/2005 |
| KR | 10-2007-0070327 A | 7/2007 |
| KR | 10-2011-0013693 A | 2/2011 |
| WO | WO 2004/084168 A1 | 9/2004 |

OTHER PUBLICATIONS

European Search Report dated Oct. 8, 2014.

* cited by examiner

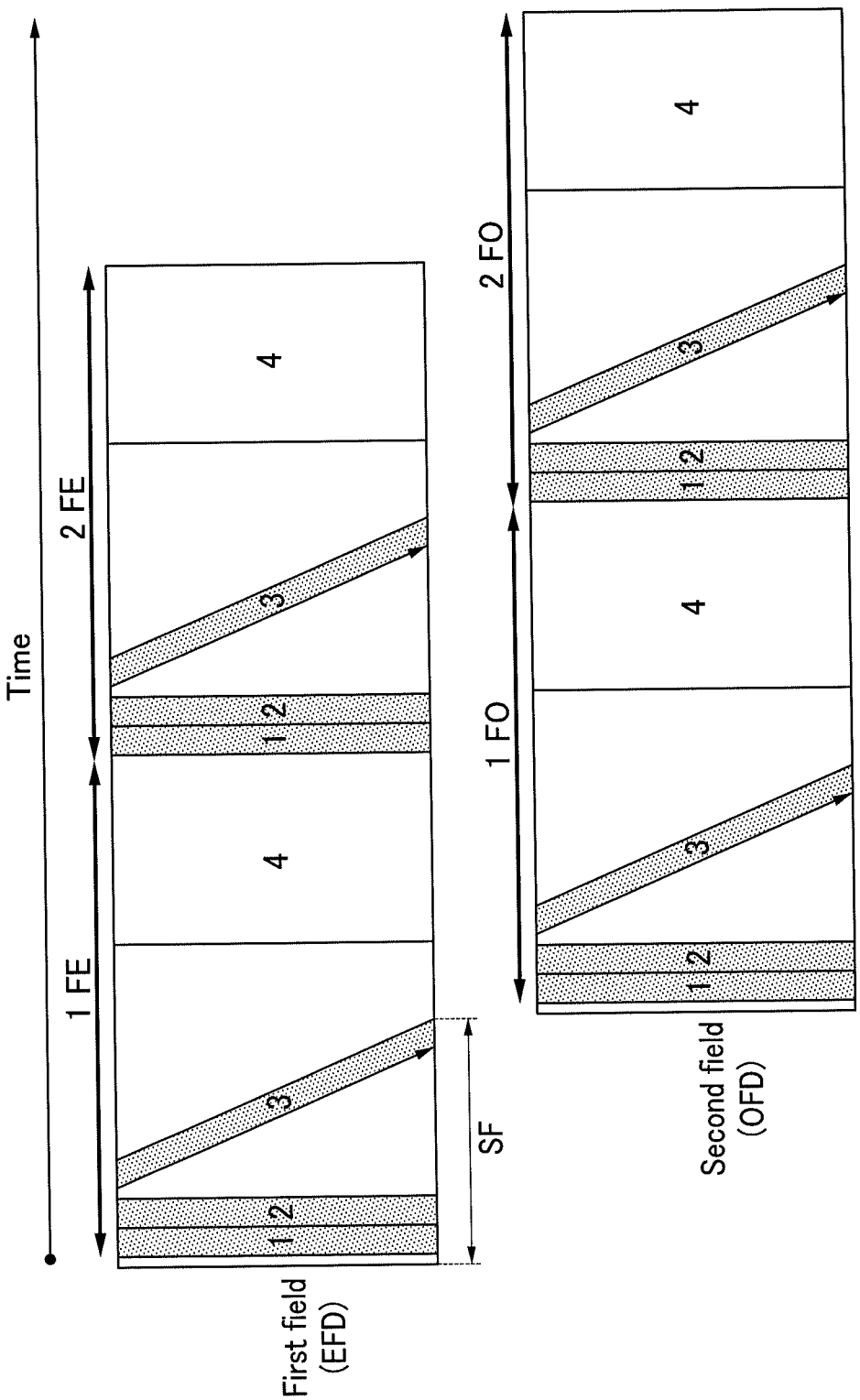

FIG.2A

| | | | | | | | |
|---|---|---|---|---|---|---|---|
| E | E | E | E | E | E | E | E | —HE1
| O | O | O | O | O | O | O | O | —HO1
| E | E | E | E | E | E | E | E | —HE2
| O | O | O | O | O | O | O | O | —HO2
| E | E | E | E | E | E | E | E | —HE3
| O | O | O | O | O | O | O | O | —HO3

1x1 Dot Weave

FIG.2D

2x1 Dot Weave

DISPLAY DEVICE AND DRIVING METHOD THEREOF

BACKGROUND

1. Field

Embodiments relate to a display device and a driving method thereof.

2. Description of the Related Art

A display device displays 60 pictures in a case of an NTSC method, and 50 pictures in a case of a PAL method, during one second. When the display device displays a stereoscopic image according to the NTSC method, the display device must alternately display 60 left eye pictures 60 right eye pictures during one second. Accordingly, the driving frequency of the display device to display the stereoscopic image must be at least double compared with a case that the display device displays a plane image.

One frame of the active matrix type of display device includes a scan period (for programming image data) and a light emitting period (for emitting light according to the programmed image data). The data writing must be finished within at most $1/120$ second to display the stereoscopic image, such that a driver scans the entire display panel during the scan period and operates with a high driving frequency for programming the image data. The driver of the high driving frequency increases production cost. Furthermore, as the size of the display panel is increased and the resolution thereof is increased, an RC delay of the display panel is increased such image data programming is difficult.

The above information disclosed in this Background section is only for enhancement of understanding of the background of the invention and therefore it may contain information that does not form the prior art that is already known in this country to a person of skill in the art.

SUMMARY

A driving method of a display device including a plurality of pixels according to embodiments may include: transmitting a plurality of data signals to a first group pixels of a plurality of pixels during a first scan period; simultaneously emitting light through the first group pixels according to a programmed data signal during a first light emitting period adjacent to the first scan period; transmitting a plurality of data signals to a second group pixels of a plurality of pixels different from the first group pixels during a second scan period; and simultaneously emitting light through the second group pixels according to a programmed data signal during a second light emitting period adjacent to the second scan period, wherein a first field including the first scan period and the first light emitting period and a second field including the second scan period and the second light emitting period are temporally divided.

The second field may be driven in synchronization with a timing point and is shifted by a predetermined period with respect to the first field. The first field may include a plurality of first frames made of a first scan period and a first light emitting period and the second field includes a plurality of second frames made of a second scan period and a second light emitting period, and the second frame that is temporally adjacent to one first frame of a plurality of first frames is shifted from one first frame by a predetermined period.

The first period from a timing point where the first scan period of one first frame is finished to a timing point where the first light emitting period is started and the second period from the timing point where the second scan period of the second frame adjacent to one first frame is finished to the timing point where the second light emitting period is started may be equal to each other.

When an image source signal input to the display device displays a stereoscopic image, the method further may include displaying the first timing point picture according to the image source signal during the first light emitting period, and displaying the second timing point picture according to the image source signal different from the first timing point during the second light emitting period.

The method may further include dividing the first video signal of a first view point and dividing the first video signal as a frame unit from the image source signal, and generating a first interpolation video signal representing a first interpolation picture as a middle picture between first view point pictures represented by the first video signals of the continuous frame units.

The method may further include dividing a second video signal of a second view point and dividing the second video signal as the frame unit from the image source signal, and generating a second interpolation video signal representing a second interpolation picture as a middle picture between second view point pictures represented by the second video signals of the continuous frame units.

The first interpolation video signal may be displayed in a light emitting period of the first field frame adjacent to the frame in which the first video signal is displayed, and the second interpolation video signal may be displayed in the light emitting period of the second field frame adjacent to the frame in which the second video signal is displayed.

The method may further include generating the video signals arranged in a sequence of the signal representing the data signal corresponding to the first group pixels among the first video signal, the signal representing the data signal corresponding to the second group pixels among the second video signal, the signal representing the data signal corresponding to the first group pixels among the first interpolation video signal, and the signal representing the data signal corresponding to the second group pixels among the second interpolation video signal.

The method may further include dividing a first video signal of the first view point and dividing the first video signal as the frame unit from the image source signal, and generating the first interpolation video signal representing the first interpolation picture of at least two frames as the middle picture between the first view point pictures represented by the first video signals of the continuous frame units.

The method may further include dividing the second video signal of the second view point and the second video signal as the frame unit from the image source signal, and generating the second interpolation video signal representing the second interpolation pictures of at least two frames as the middle picture between the second view point pictures represented by the second video signals of the continuous frame units.

The first interpolation video signal of one frame unit selected among the first interpolation video signals of at least two frames may be displayed in the first light emitting period of the first field frame adjacent to the frame in which the first video signal is displayed, and the second interpolation video signal of one frame unit selected among the second interpolation video signals of at least two frames may be displayed in the second light emitting period of the second field frame adjacent to the frame in which the second video signal is displayed.

The method may further include generating the video signal arranged in a sequence of the signal representing the data signal corresponding to the first group pixels among the first video signal, the signal representing the data signal corresponding to the second group pixels among the second video signal, the signal representing the data signal corresponding to the first group pixels among the first interpolation video signal of the selected one frame unit, and the signal representing the data signal corresponding to the second group pixels among the second interpolation video signal of the selected one frame unit.

In another embodiment, the method may further include dividing the image source signal as the frame unit and generating the interpolation video signal of at least two frames representing the interpolation picture as the middle picture between the pictures represented by the plane video signals of the continuous frame units when the image source signal input to the display device displays the plane image.

The plane video signal may be displayed in the first light emitting period of one frame of the first field, the interpolation video signal of the selected one frame unit among the interpolation video signals of at least two frames may be displayed in the second light emitting period of the frame of the second field adjacent to one frame of the first field, and the interpolation video signal of the selected other frame unit among the interpolation video signals of at least two frames may be displayed in the first light emitting period of the next frame of the first field and the second light emitting period of the next frame of the second field.

The method may further include generating the video signal arranged in the sequence of the signal representing the data signal corresponding to the first group pixels among the plane video signal, the signal representing the data signal corresponding to the second group pixels among the interpolation video signal of the selected one frame unit, the signal representing the data signal corresponding to the first group pixels among the interpolation video signal of the selected other one frame unit, and the signal representing the data signal corresponding to the second group pixels among the interpolation video signal of the selected other one frame unit.

The first period from the timing point in which the first scan period of one first frame is finished to the timing point in which the first light emitting period is started and the second period from the timing point in which the second scan period of the second frame close to one first frame is finished to the timing point in which the second light emitting period is started may be different from each other, and the first period may be longer than the second period in the range in which the first light emitting period and the second light emitting period do not overlap.

The method may further include displaying the first view point picture according to the image source signal during the first light emitting period and displaying the picture of the second view point different from the first view point according to the image source signal during the second light emitting period adjacent to the first light emitting period when the image source signal input to the display device displays a stereoscopic image.

The method may further include dividing the first video signal of the first view point from the image source signal, dividing the first video signal as the frame unit, dividing the second video signal of the second view point from the image source signal, and dividing the second video signal as the frame unit; dividing and displaying the first video signal of the frame unit in the first light emitting period and the adjacent second light emitting period; and dividing and displaying the second video signal of the frame unit in the first light emitting period next to the first light emitting period and the second light emitting period adjacent to the next first light emitting period.

The method may further include generating the video signal arranged in the sequence of the signal representing the data signal corresponding to the first group pixels among the first video signal, the signal representing the data signal corresponding to the second group pixels among the first video signal, the signal representing the data signal corresponding to the first group pixels among the second video signal, and the signal representing the data signal corresponding to the second group pixels among the second video signal.

The method may further include dividing the image source signal as the frame unit and generating the interpolation video signal of one frame representing the interpolation picture as the middle picture between the pictures represented by the plane video signals of the continuous frame units when the image source signal input to the display device displays the plane image.

The plane video signal may be divided and displayed in the first light emitting period of one frame of the first field and the second light emitting period of the frame of the second field adjacent to one frame of the first field, and the interpolation video signal of one frame may be displayed in the first light emitting period of the frame next to the first field and the second light emitting period of the frame next to the second field.

The method may further include generating the video signal arranged in the sequence to the signal representing the data signal corresponding to the first group pixels among the plane video signal, the signal representing the data signal corresponding to the second group pixels among the plane video signal, the signal representing the data signal corresponding to the first group pixels among the interpolation video signal of one frame unit, and the signal representing the data signal corresponding to the second group pixels among the interpolation video signal of one frame unit.

A driving method of a display device according to embodiments may include a plurality of pixels, a plurality of organic light emitting diodes OLED, and a plurality of driving transistors controlling a driving current supplied to the plurality of organic light emitting diodes OLED, and a first power source voltage and a second power source voltage supplying a driving voltage to the plurality of pixels. The driving method of the display device may include a first field including a first reset period resetting each anode voltage of a plurality of first organic light emitting diodes OLED of the first group pixels among the plurality of pixels, a first compensation period compensating each threshold voltage of a plurality of first driving transistors of the first group pixel, a first scan period transmitting the corresponding data signal to the plurality of first driving transistors, and a first light emitting period in which the plurality of first organic light emitting diodes OLED simultaneously emit light according to a plurality of driving currents controlled by the plurality of first driving transistors; and a second field including a second reset period resetting each anode voltage of a plurality of second organic light emitting diodes OLED of the second group pixel different from the first group pixels among the plurality of pixels, a second compensation period compensating each threshold voltage of a plurality of second driving transistors of the second group pixel, a second scan period transmitting the corresponding data signal to the plurality of second driving transistors, and a second light emitting period in which the plurality of second organic light emitting diodes OLED simultaneously emit light according to a plurality of driving currents controlled by the plurality of first driving transistors.

The first power source voltage supplied to the first group pixels may have a different voltage level for the remaining periods excluding the first light emitting period and the first light emitting period, and the second power source voltage supplied to the first group pixels may have the different voltage level for the remaining periods excluding the first reset period and the first reset period.

The first power source voltage supplied to the second group pixels may have a different voltage level for the remaining periods excluding the second light emitting period and the second light emitting period, and the second power source voltage supplied to the second group pixels may have a different voltage level for the remaining periods excluding the first reset period and the second reset period.

The first light emitting period and the second reset period may not overlap with each other, and the second light emitting period and the first light emitting period may not overlap with each other.

The voltage of a plurality of data signals supplied to the second group pixels during the second reset period may be the level for the driving current discharging the anode voltage of the second group pixels during the second reset period to flow to the driving transistor. The voltage of a plurality of data signals supplied to the first group pixels during the first reset period may be the level for the driving current discharging the anode voltage of the first group pixels during the first reset period to flow to the driving transistor.

The first power source voltage supplied to the first group pixels may have the different level during the first reset period, the first scan period, and the first light emitting period, and the second power source voltage may be maintained as a constant level.

The first power source voltage supplied to the first group pixels during the first compensation period may be the same as the first scan period. The first power source voltage supplied to the second group pixels may have the different level during the second reset period, the second scan period, and the second light emitting period. The first power source voltage supplied to the second group pixels during the second compensation period may be the same as the second scan period.

The first light emitting period may overlap the second reset period, the second compensation period, and the second scan period, and the second light emitting period may overlap the first reset period, the first compensation period, and the first scan period. The first light emitting period and the second light emitting period may overlap by a predetermined period.

A display device according to embodiments may include a plurality of pixels including a plurality of organic light emitting diodes OLED and a plurality of driving transistors controlling a driving current supplied to the plurality of organic light emitting diodes OLED; a plurality of data lines transmitting a plurality of data signals to the plurality of pixels; a plurality of scan lines transmitting a plurality of scan signals to the plurality of pixels; a plurality of first power lines supplying a first power source voltage to the plurality of pixels; and a plurality of second power lines supplying a second power source voltage to the plurality of pixels, wherein the image is displayed while being divided into a first field including a first compensation period in which a threshold voltage of the driving transistor of the first group pixels among the plurality of pixels is compensated and a first light emitting period in which the first group pixels simultaneously emits light according to the programmed data signal and a second field including a second compensation period in which a threshold voltage of the driving transistor of the second group pixels different from the first group pixels among the plurality of pixels is compensated and a second light emitting period in which the second group pixels simultaneously emits light according to the programmed data signal.

The plurality of first power lines may include a plurality of second power lines arranged according to the first direction to supply the first power source voltage to the first group pixels and a plurality of third power lines arranged according to the second direction intersecting the first direction, and a node at which the second power line and the third power line are connected is formed at the position where the second power line and the third power line intersect.

The plurality of first pixels may be connected to the adjacent second power line or the adjacent third power line.

The plurality of first power lines may include a plurality of fourth power lines arranged between the plurality of second power lines according to the first direction to supply the first power source voltage to the second group pixels and a plurality of fifth power lines arranged between the plurality of third power lines according to the second direction, and a node at which the fourth power lines and the fifth power lines are connected may be where the fourth power lines and the fifth power lines intersect.

The plurality of second pixels may be connected to the adjacent fourth power line or the adjacent fifth power line.

The first group pixels may include a plurality of first pixel rows in which a plurality of first pixels are arranged according to the second direction, the second group pixels includes a plurality of second pixel rows in which a plurality of second pixels are arranged according to the second direction, and the plurality of first pixel rows and the plurality of second pixel rows may be alternately arranged according to the first direction.

The plurality of first power lines may include a plurality of second power lines arranged according to the first direction to supply the first power source voltage to the first group pixel, a plurality of third power lines arranged according to the second direction intersecting the first direction to supply the first power source voltage to the first group pixel, a plurality of fourth power lines arranged between a plurality of second power lines according to the first direction to supply the first power source voltage to the second group pixel, and a plurality of fifth power lines arranged between a plurality of third power lines according to the second direction to supply the first power source voltage to the second group pixel, wherein a node at which the second power lines and the third power lines are connected is formed at the position where the second power lines and the third power lines intersect, and a node at which the fourth power lines and the fifth power lines are connected is formed at the position where the fourth power lines and the fifth power lines intersect.

The first group pixels may include a plurality of first pixel rows in which a plurality of first pixels are arranged according to the second direction, the second group pixels includes a plurality of second pixel rows in which a plurality of second pixels are arranged according to the second direction, and the plurality of first pixel rows and the plurality of second pixel rows are alternately arranged according to the first direction.

The first group pixels may include a plurality of first pixels, the second group pixels may include a plurality of second pixels, and the plurality of first pixels and the plurality of second pixels may be alternately arranged according to the first direction and the second direction.

The first group pixels may include a plurality of first pixel columns in which a plurality of first pixels are arranged according to the first direction, the second group pixels may include a plurality of second pixel columns in which a plurality of second pixels are arranged according to the first direction, and the plurality of first pixel columns and the plurality of second pixel columns may be alternately arranged according to the second direction.

The first group pixels may include a plurality of first pixels, the second group pixels may include a plurality of second pixels, at least two first pixels and at least two second pixels may be alternately arranged according to the first direction, and the first pixels and the second pixels may be alternately arranged according to the second direction.

The plurality of first pixels may be connected to the adjacent second power line and the plurality of second pixels may be connected to the adjacent fourth power line, or the plurality of first pixels may be connected to the adjacent third power line and the plurality of second pixels may be connected to the adjacent fifth power line.

The plurality of pixels may further include a plurality of compensation transistors connected between the gate electrode and the drain electrode of the plurality of driving transistors, a plurality of first compensation transistors of the plurality of compensation transistors are turned on in the first compensation period, and a plurality of second compensation transistors different from the plurality of first compensation transistors among the plurality of compensation transistors are turned on in the second compensation period.

A plurality of first controlling lines transmitting the compensation control signal to the plurality of first compensation transistors may be arranged according to the first direction, and a plurality of second controlling lines transmitting the compensation control signal to the plurality of second compensation transistors may be arranged between the plurality of first controlling lines according to the first direction.

The plurality of first pixels may be connected to the adjacent first controlling line, and the plurality of second pixels may be connected to the adjacent second controlling line.

A plurality of first controlling lines transmitting the compensation control signal to a plurality of first compensation transistors may extend in the row direction and may be arranged according to the column direction, and a plurality of second controlling lines transmitting the compensation control signal to the plurality of second compensation transistors may extend in the row direction and may be arranged between the plurality of first controlling lines according to the column direction.

Alternatively, a plurality of first controlling lines transmitting the compensation control signal to a plurality of first compensation transistors may extend in the column direction and may be arranged according to the row direction, and a plurality of second controlling lines transmitting the compensation control signal to the plurality of second compensation transistors may extend in the column direction and may be arranged between the plurality of first controlling lines according to the row direction.

The plurality of pixels may include a plurality of switching transistors transmitting a plurality of data signals to the plurality of driving transistors according to the plurality of scan signals, a plurality of compensation transistors connected between the gate electrode and the drain electrode of the plurality of driving transistors, a plurality of compensation capacitors connected between the plurality of switching transistors and the gate electrode of the plurality of driving transistors, and a plurality of storage capacitors connected between the plurality of switching transistors and the source electrode of the plurality of driving transistors, wherein the first power source voltage is transmitted to the source electrode of the driving transistor, and the second power source voltage is transmitted to the cathode of the organic light emitting diode OLED.

The first field further may include a first reset period in which the anode voltage of the organic light emitting diode OLED of the first group pixels is reset, and the second field further may include a second reset period in which the anode voltage of the organic light emitting diode OLED of the second group pixels is reset.

The voltage of a plurality of data signals supplied to the first group pixels during the first reset period may be a level for resetting the anode voltage to the first power source voltage supplied to the first group pixels by the current flowing to the driving transistor of the first group pixels during the reset period.

The voltage of a plurality of data signals supplied to the second group pixels during the second reset period may be a level for resetting the anode voltage to the first power source voltage supplied to the second group pixels by the current flowing to the driving transistor of the second group pixels during the second reset period.

During the first light emitting period and the second light emitting period, the first power source voltage may have a different level from the remaining periods, and may be a higher voltage than the second power source voltage.

The second power source voltage may be constantly maintained, and the first power source voltage may be a lower level than the second power source voltage during the first reset period and the second reset period. A plurality of compensation transistors of the first group pixels may be turned on during the first compensation period, a plurality of compensation transistors of the second group pixels may be turned on during the second compensation period, and the first power source voltage during the first compensation period and the second compensation period may be different from the first power source voltage of the first reset period and the second reset period.

The first power source voltage during the first light emitting period and the second light emitting period may be different from the first power source voltage during the first compensation period and the second compensation period, and the first reset period and the second reset period.

The first field may further include a first scan period in which a plurality of data signals are transmitted to the plurality of compensation capacitors and the plurality of storage capacitors through the plurality of switching transistors of the first group pixel, and the second field may further include a second scan period in which a plurality of data signals are transmitted to the plurality of compensation capacitors and the plurality of storage capacitors through a plurality of switching transistors of the second group pixel. The first power source voltage during the first scan period and the second scan period may be equal to the first power source voltage during the first compensation period and the second compensation period. The first power source voltage during the first light emitting period and the second light emitting period may be different from the first power source voltage during the first compensation period, the second compensation period, the first reset period, and the second reset period, and the first power source voltage during the first compensation period and the second compensation period may be different from the first power source voltage during the first reset period and the second reset period.

BRIEF DESCRIPTION OF THE DRAWINGS

The above and other features and advantages will become more apparent to those of skill in the art by describing in detail example embodiments with reference to the attached drawings, in which:

FIG. 1A illustrates a view of a driving method of a display device according to an example embodiment.

FIGS. 2A-2D illustrate views of regions of first group pixels and second group pixels emitting light to the first field when bi-dividing a display panel according to an example embodiment.

DETAILED DESCRIPTION OF THE EMBODIMENTS

Figure 1B:
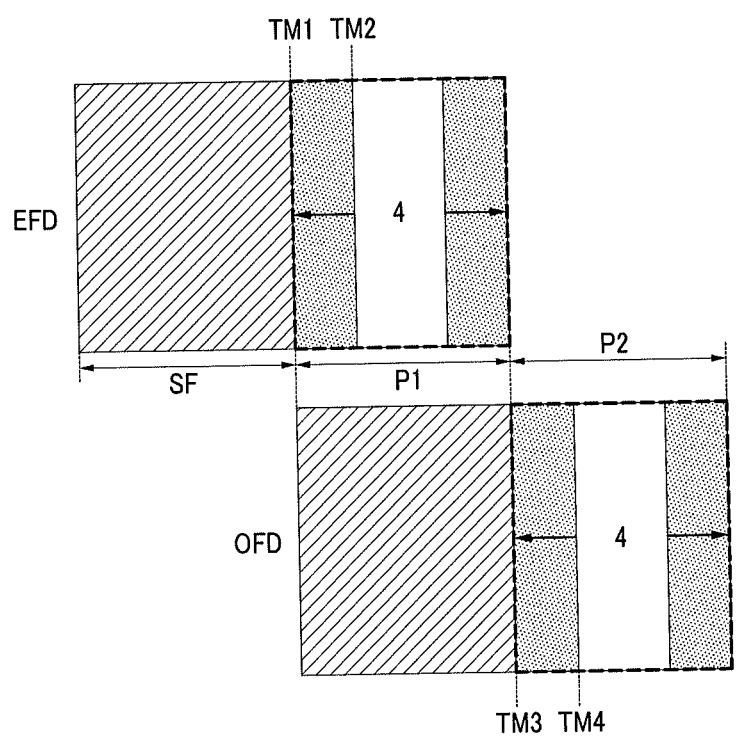
FIG. 1B and FIG. 1C illustrate views of a method in which a starting point of a light emitting period is controlled in a first field and a second field.

Korean Patent Application No. 10-2011-028249, filed on Mar. 29, 2011, in the Korean Intellectual Property Office, and entitled: "Display Device and Driving Method Thereof," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

FIG. 1A is a view of a driving method of a display device according to an example embodiment.

In the driving method according to the present example embodiment, a plurality of pixels of a display device panel are divided into a plurality of first group pixels (emitting light at a first field EFD; as a mnemonic, E may be though of as even, although this is merely for descriptive purposes and is not to be construed as a limitation) and a plurality of second group pixels (emitting light at a second field OFD; as a mnemonic, O may be though of as odd, although this is merely for descriptive purposes and is not to be construed as a limitation). The first field EFD and the second field OFD are display periods including at least one frame. One frame sequentially includes a reset period 1, a compensation period 2, a scan period 3, and a light emitting period 4.

The first field EFD and the second field OFD are driven in synchronization with a timing point that is moved by a predetermined period SF. In detail, one frame 1FO of the second field OFD, temporally adjacent to one frame 1FE of the first field EFD, is temporally shifted by a period SF from the one frame 1FE. The period SF is set so that scan periods 3 to not overlap to each other. Frame 2FE of the first field EFD is continuous with regard to the frame 1FE, and frame 2FO of the second field OFD is continuous with regard to the frame 1FO.

A scan period 3, in which a data signal respectively corresponding to the second group pixels is programmed, is generated during a period 4 in which the first group pixels emit the light. Likewise, a scan period 3, in which a data signal respectively corresponding to the first group pixels is programmed, is generated during a period 4 in which the second group pixels emit the light. Accordingly, the scan periods 3 may be sufficiently obtained such that a temporal margin to drive the display panel is increased. Also, the scan frequency may be decreased such that bandwidth of a data driver, generating the data signal and transmitting the data signal to a data line, and a gate driver, generating the scan signal, is decreased. Thus, cost of a circuit element may be reduced. Furthermore, a light emitting time 4 of the first group pixels and a light emitting time 4 of the second group pixels are dispersed such that a required maximum current is decreased. Thus, the cost of a power supply circuit supplying power to the display device may be decreased.

Figure 1C:
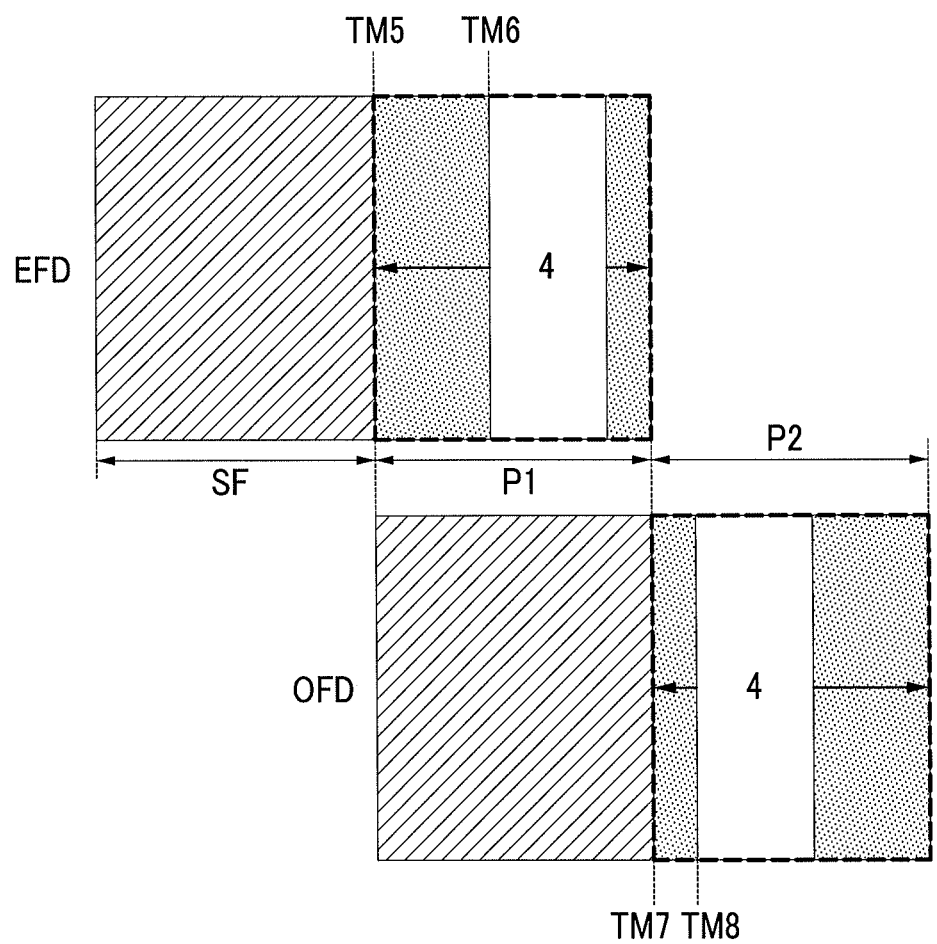

FIG. 1B and FIG. 1C are views of a method in which a starting point of a light emitting period is controlled in a first field and a second field.

FIG. 1B is a view showing a method in which a light emitting period is started at a same time as a timing point after a scan period is completed in the first field and the second field.

As shown in FIG. 1B, the light emitting period 4 is started at a timing point TM2 after a finishing point TM1 of the scan period 3 of the first field EFD. After one frame of the second field OFD is started at a timing point that is shifted by the period SF, such that a timing point TM3 is finished at the scan period 3 of the second field OFD, the light emitting period 4 is started at a timing point TM4. Here, a period TM1-TM2 and a period TM3-TM4 may be set as the same period. In an equal-interval light emitting mode that will be described below, the starting point of the light emitting period 4 is set up at the same timing point like in FIG. 1B.

FIG. 1C is a view showing a method in which a light emitting period is started at a different time to a timing point after a scan period is completed in the first field and the second field.

As shown in FIG. 1C, after a finishing point TM5 of the scan period 3 of the first field EFD, the light emitting period 4 is started at a timing point TM6. After one frame of the second field OFD is started at a timing point that is shifted by the period SF such that the scan period 3 of the second field OFD is finished at a timing point TM7, the light emitting period 4 is started at a timing point TM8. Here, a period TM5-TM6 and a period TM7-TM8 may be set up as different periods. In a concatenation light emitting mode that will be described below, the starting point of the light emitting period 4 is set up as a different timing point like in FIG. 1C. In detail, the starting point of the light emitting period is controlled for the light emitting period 4 of the first field and the light emitting period 4 of the second field to be close to each other.

Next, a method for dividing first group pixels and second group pixels according to an example embodiment will be described.

FIGS. 2A-2D are views of regions of first group pixels and second group pixels emitting light to the first field when bi-dividing a display panel according to an example embodiment.

A plurality of unit regions (hereinafter, the first unit region) forming the region (hereinafter, the first region) where the first group pixels is disposed is indicated by "E." A plurality of unit regions (hereinafter, the second unit region) forming the region (hereinafter, the second region) where the second group pixels is disposed is indicated by "O." Each unit region includes at least one pixel.

A luminance difference may be generated for the first unit region E and the second unit region O such that it is appropriate that the first unit region E and the second unit region O are disposed to be spatially close to each other.

FIG. 2A is a view of a horizontal line arrangement method in which first horizontal lines HE1-HE3, in which a plurality of first unit regions E is arranged according to a horizontal line, and the second horizontal lines HO1-HO3, in which a plurality of second unit regions O is arranged, are alternately positioned. For better understanding and ease of description, three first horizontal lines and three second horizontal lines are shown, although it is understood that this is a simplification for descriptive purposes only. The horizontal line arrangement method is appropriate for an interlace broadcast.

FIG. 2B is a vertical line arrangement method in which first vertical lines VE1-VE4, in which a plurality of first unit regions E are arranged according to a vertical line, and second vertical lines VO1-VO4, in which a plurality of second unit regions O are arranged according to a vertical line, are alternately positioned. For better understanding and ease of description, four first vertical lines and four second vertical lines are shown, although it is understood that this is a simplification for descriptive purposes only. The vertical line arrangement method is appropriate for displaying an image including a lot of transverse motion.

Figures 2C, 2D:
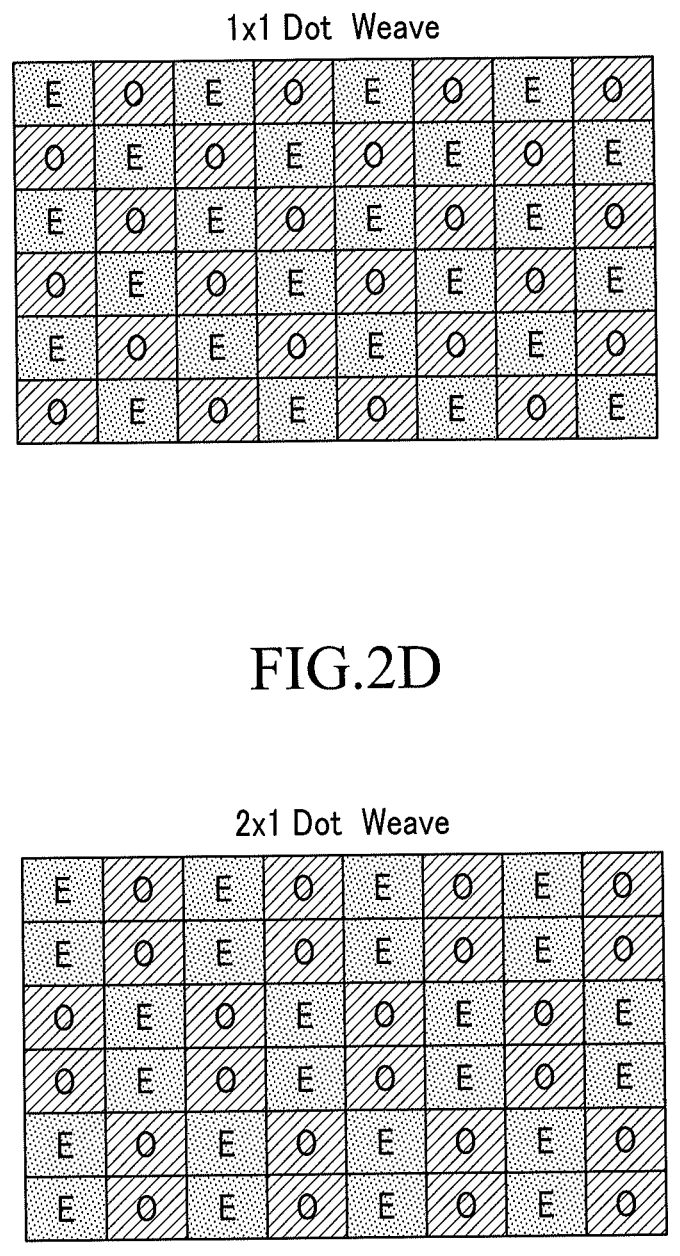

FIG. 2C illustrates a view of a display panel in which a plurality of first unit regions E and a plurality of second unit regions O are arranged according to a 1×1 dot arrangement. For better understanding and ease of description, the display panel is divided into a 6×8 matrix, although it is understood that this is a simplification for descriptive purposes only.

The 1×1 dot arrangement is appropriate for a progressive broadcast. Also, the first unit regions E and the second unit regions O are closely disposed in the vertical and horizontal directions such that a luminance difference between the first unit regions E and the second unit regions O may be dispersed.

FIG. 2D is a view of a display panel in which a plurality of first unit regions E and a plurality of second unit regions O are arranged according to a 2×1 dot arrangement. For better understanding and ease of description, the display panel is divided into a 6×8 matrix, although it is understood that this is a simplification for descriptive purposes only. The 2×1 dot arrangement is appropriate to avoid a dithering pattern. A 2×2 dithering pattern is generally selected if the image is displayed according to a video signal generated with a 2×2 dithering pattern to the display panel disposed according to the 1×1 dot arrangement, and the 2×2 dithering pattern is emphasized. The 2×1 or the 1×2 dot arrangements may prevent an emphasis phenomenon of the 2×2 dithering pattern.

According to the 2×1 dot arrangement, two second unit regions O close in the horizontal direction of the first unit region E exist, and one second unit region O close in the vertical direction exists. According to the 1×2 dot arrangement, two second unit regions O close in the vertical direction of the first unit region E exist, and one second unit region O close in the horizontal direction exists.

The 2×2 dithering pattern and the 1×1 dot arrangement according to an example embodiment have the same basic repetition unit. Therefore, it may be shown that the dither pattern is remarkable. For example, when displaying a 100.5 grayscale with the 2×2 dithering pattern, the diagonal direction pixel of the left upper and the right lower pixel among the 2×2 pixel displays the 101 grayscale and the diagonal direction pixel of the right upper and left lower displays the 100 grayscale. Seen from a distance, it is shown that the 100.5 grayscale is displayed on average. Here, if this display is applied to the display device of an embodiment including the 1×1 dot arrangement, the pixels of the first unit region E positioned at the upper left and the lower right all display the 101 grayscale, and the pixels of the second unit region O positioned at the upper right and the lower left all display the 100 grayscale.

The panel is designed for a deviation between the same luminance displayed in each pixel of the first unit region E and the second unit region O to not be generated. However, a luminance deviation may be generated due to an asymmetry of the layout to some degree. As a result, although the same grayscale is displayed, it is assumed that the luminance displayed by the pixels of the first unit region E is higher than the luminance displayed by the pixels of the second unit region O.

For example, if a difference of a 2% degree (a difference of 1 grayscale) is highly generated, it may seem that the pixels of the first unit region E display the 102 grayscale and the pixels of the second unit region O display the 100 grayscale. Accordingly, if the luminance difference between the pixels of the first unit region E and the pixels of the second unit region O is increased, the non-uniformity may be recognizeda even though seen from a distance.

Meanwhile, if a video signal according to the 2×2 dithering pattern is displayed to the 1×2 dot arrangement or the 2×1 dot arrangement, the dithering pattern exists with the same probabilities in the first unit region E and the second unit region O such that the non-uniformity is improved.

For example, when displaying the above-described 100.5 grayscale, all pixels of the first unit region E display the 101 grayscale in the 1×1 dot arrangement. However, the pixels of the first unit region E may display the 101 grayscale or the 100 grayscale in the 1×2 or the 2×1 dot arrangements (50:50 ratio).

Figure 3A:
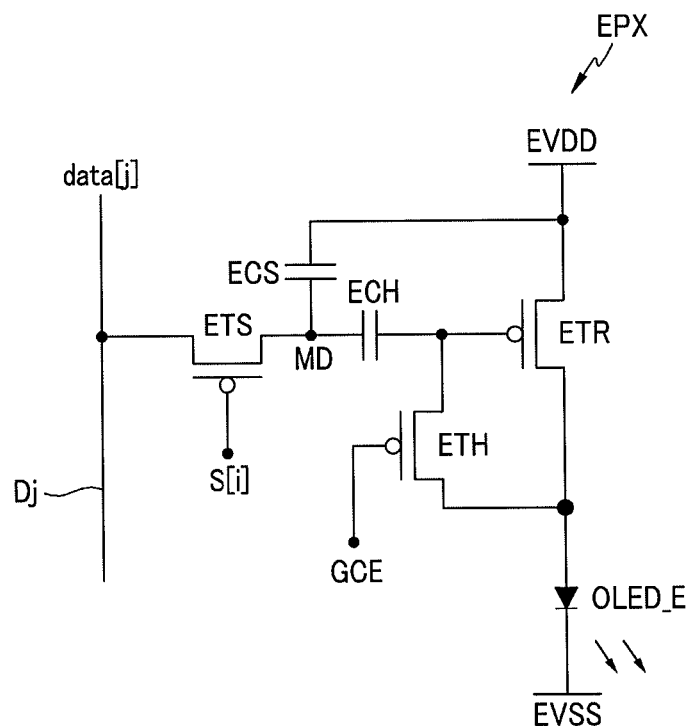
FIG. 3A and FIG. 3B illustrate views respectively showing a pixel in the first group pixels and the second group pixels included in a first unit region E and a second unit region O.
Figure 3B:
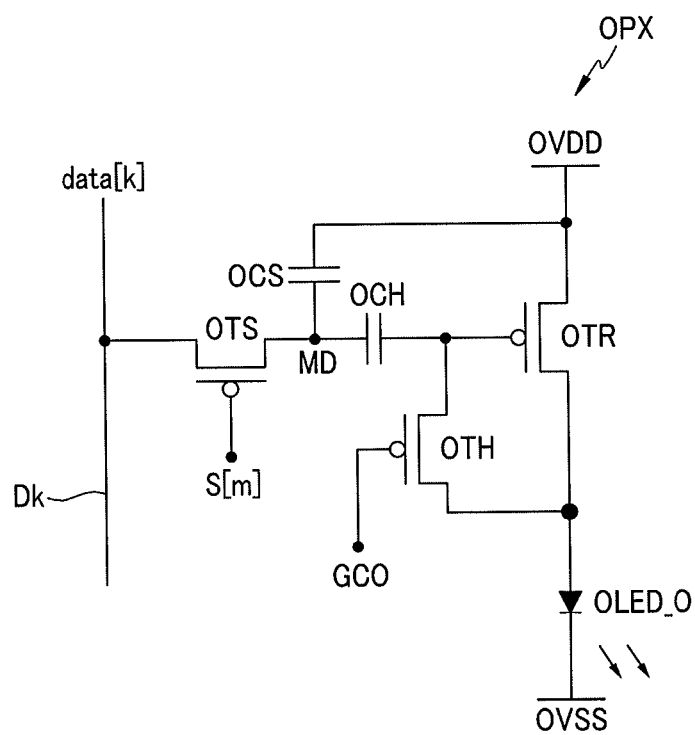

FIG. 3A and FIG. 3B are views respectively showing example embodiments of a pixel in the first group pixels and the second group pixels included in the first unit region E and the second unit region O.

As shown in FIG. 3A, a first pixel EPX included in the first unit region E includes a switching transistor ETS, a driving transistor ETR, a compensation transistor ETH, a compensation capacitor ECH, and a storage capacitor ECS.

The driving transistor ETR includes a drain electrode connected to an anode of an organic light emitting diode OLED_E, a gate electrode connected to one electrode of the compensation capacitor ECH, and a source electrode connected to a first power source voltage EVDD. The driving transistor ETR controls a driving current supplied to the organic light emitting diode OLED_E.

The compensation transistor ETH includes a gate electrode input with a first compensation control signal GCE, and two electrodes respectively connected to the drain electrode and the gate electrode of the driving transistor ETR.

Another electrode of the compensation capacitor ECH is connected to one electrode of the storage capacitor ECS and one electrode of the switching transistor ETS. Another electrode of the storage capacitor ECS is connected to the first power source voltage EVDD.

A gate electrode of the switching transistor ETS is input with a scan signal S[i], and another electrode of the switching transistor ETS is connected to a data line Dj. A data signal data[j] is transmitted through the data line Dj.

A cathode of the organic light emitting diode OLED_E is connected to a second power source voltage EVSS.

The first power source voltage EVDD and the second power source voltage EVSS supply the driving voltage for the operation of the pixel. In detail, the first power source voltage EVDD and the second power source voltage EVSS supply the driving voltage for the operation of the driving transistor ETR and the organic light emitting diode OLED_E according to the reset period 1, the compensation period 2, the scan period 3, and the light emitting period 4.

The first power source voltage EVDD includes at least two levels according to the reset period 1, the compensation period 2, the scan period 3, and the light emitting period 4. The first compensation control signal GCE comes to the level for turning on the compensation transistor ETH only during the compensation period 2.

The scan signal S[i] has at least two levels according to the reset period 1, the compensation period 2, the scan period 3, and the light emitting period 4. In detail, the scan signal S[i] comes to the level for turning on the switching transistor ETS during the period in which the data signal is programmed to the corresponding scan line among at least the compensation period 2 and the scan period 3.

The second power source voltage EVSS is maintained with a constant level, however the voltage level of the reset period 1 and the voltage level of the remaining three periods may be different.

As shown in FIG. 3B, a second pixel OPX included in the second unit region O includes a switching transistor OTS, a driving transistor OTR, a compensation transistor OTH, a compensation capacitor OCH, and a storage capacitor OCS.

The driving transistor OTR includes a drain electrode connected to an anode of the organic light emitting diode OLED_O, a gate electrode connected to one electrode of the compensation capacitor OCH, and a source electrode connected to a third power source voltage OVDD.

The compensation transistor OTH includes an electrode input with a second compensation control signal GCO, and two electrodes respectively connected to the drain electrode and the gate electrode of the driving transistor OTR.

Another electrode of the compensation capacitor OCH is connected to one electrode of the storage capacitor OCS and one electrode of the switching transistor OTS. Another electrode of the storage capacitor OCS is connected to the third power source voltage OVDD.

A gate electrode of the switching transistor OTS is input with a scan signal S[m], and another electrode of the switching transistor OTS is connected to a data line Dk. A data signal data[k] is transmitted through the data line Dk.

A cathode of the organic light emitting diode OLED_O is connected to a fourth power source voltage OVSS.

The third power source voltage OVDD has at least two levels according to the reset period 1, the compensation period 2, the scan period 3, and the light emitting period 4. The second compensation control signal GCO becomes the level for turning on the compensation transistor OTH only during the compensation period 2.

The scan signal S[m] has at least two levels according to the reset period 1, the compensation period 2, the scan period 3, and the light emitting period 4. In detail, the scan signal S[m] becomes the level for turning on the switching transistor OTS during the period in which the data signal is programmed to the corresponding to the scan line among at least the compensation period 2 and the scan period 3.

The fourth power source voltage OVSS is maintained as the constant level, however the voltage level of the reset period 1 and the remaining three period voltage levels may be different.

As described above, in the pixel according to an example embodiment, the structure and the operation of the first pixel EPX and the second pixel OPX are the same. The wires supplying the first power source voltage EVDD and the third power source voltage OVDD, the wires supplying the first compensation control signal GCE and the second compensation control signal GCO, and the wires supplying the second power source voltage EVSS and the fourth power source voltage OVSS are divided according to the first region and the second region.

The first pixel is a pixel of the first unit region E, thereby being a pixel driven during the first field, and the second pixel is a pixel of the second unit region O, thereby being a pixel driven during the second field. The detailed operation will be described below.

The display device displays the left eye picture and the right eye picture to display a stereoscopic image. Hereafter, the display number of the left eye picture and the display number of the right eye picture during one second is referred to as a stereoscopic image display frequency.

The display device according to an example embodiment may generate an interpolation picture between an n-th original picture and an (n+1)-th original picture. The interpolation picture means a middle picture between the n-th original picture and the (n+1)-th original picture.

In a case of a plurality of interpolation pictures, the plurality of interpolation pictures express a plurality of middle motions between the n-th original picture and the (n+1)-th original picture. The display device calculates the motion difference between the n-th picture and the (n+1)-th picture and divides the calculated motion difference according to the interpolation frequency and the reference frequency (it may be, e.g., 60 Hz or 50 Hz; it is 60 Hz in the present example embodiment), thereby overlapping and reflecting the calculated motion difference to the n-th picture and generating the interpolation pictures.

The display device generates image data signals representing the original left eye picture, the original right eye picture, the interpolation left eye picture, and the interpolation right eye picture according to an input video signal. An image data signal representing one picture is referred to as a unit image data signal, and the image data signal includes a plurality of unit image data signals.

The display device calculates field information and view point information of a plurality of unit image data signals and displays the unit image data signals according to the corresponding field and view point. The field information is information representing the field in which the corresponding unit image data signal must be displayed among the first field EFD and the second field OFD. The view point information means the view point in which the corresponding unit image data is displayed among the left eye and the right eye.

The picture generated by the display device is indicated by L or R, and when the picture generated by the display device is displayed according to the corresponding field, the display picture is represented along with the field and is indicated by LE or RO. Also, the interpolation picture and the number thereof are indicated by using a number.

A driving method for displaying the stereoscopic image by using an example embodiment will now be described with reference to FIG. 4.

Figure 4:
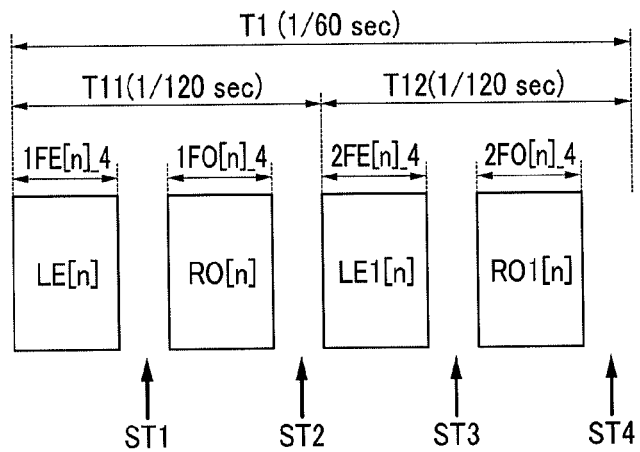
FIG. 4 illustrates a view of a picture displayed during a period of 1/60 of a second when a stereoscopic image display frequency is 120 Hz.

FIG. 4 illustrates a view of a picture displayed during a period of 1/60 of a second when a stereoscopic image display frequency is 120 Hz. More particularly, FIG. 4 is a view of a driving method when displaying the stereoscopic image according to an equal-interval light emitting mode according to an example embodiment. It is set up such that the left eye picture is displayed in the first group pixels emitting light in the first field EFD, and the right eye picture is displayed in the second group pixels emitting light in the second field OFD. In another implementation, the left eye picture may be displayed in the second field and the right eye picture may be displayed in the first field.

When the image display frequency is 120 Hz, 120 frames are displayed in the first field and 120 frames are displayed in the second field during one second. When the stereoscopic image is displayed at the image display frequency of 120 Hz, the left eye pictures of 120 sheets (displayed in the first field) and the right eye pictures of 120 sheets (displayed in the second field) are displayed during one second.

When the video signal input to the display device from the outside is the signal displaying the stereoscopic image, it is set up that the stereoscopic video signal includes the original left eye picture of 60 sheets and the original right eye picture of 60 sheets during one second. Accordingly, the display device may further display the left eye picture of 60 sheets and the right eye picture of 60 sheets during one second, as well as the original left eye picture of 60 sheets and the original right eye picture of 60 sheets. That is, one interpolation left eye picture may be further displayed between two original left eye pictures, and one interpolation right eye picture may be further displayed between two original right eye pictures. As described above, the interpolation frequency may be the same as, or greater than, the stereoscopic image display frequency to generate the interpolation left eye picture and the interpolation right eye picture.

A user may wear spectacles of a liquid crystal shutter method to respectively project the left-eye image and the right-eye image to the left eye and the right eye, although other implementations may be used.

As shown in FIG. 4, the pictures that are displayed according to the stereoscopic image display frequency 120 Hz are 4 sheets during the unit time (1/60 second) T1. That is, the unit time T1 includes the light emitting period of 4 frames. The unit time T1 is divided into a period T11 and a period T12, the left eye picture and the right eye picture are displayed during the period T11, and the interpolation left eye picture and the interpolation right eye picture are displayed during the period T12.

In the period T11, the n-th left eye picture LE[n] is displayed during the light emitting period 1FE[n]_4 of one frame of the first field, and the n-th right eye picture RO[n] is displayed during the light emitting period 1FO[n]_4 of one frame of the second field.

In the period T12, the n-th left eye interpolation picture LE1[$n$] is displayed during the light emitting period 2FE[n]_4 of one frame of the first field, and the right eye interpolation picture RO1[$n$] is displayed during the light emitting period 2FO[n]_4 of one frame of the second field.

The n-th interpolation left eye picture LE1[$n$] is the interpolation left eye picture between the n-th original left eye picture and the (n+1)-th original left eye picture. The n-th interpolation right eye picture RO1[$n$] is the interpolation right eye picture between the n-th original right eye picture and the (n+1)-th original right eye picture.

In FIG. 4, the timing point in which the left eye and the right eye of the shutter spectacles are opened and closed is indicated by an arrow. The right eye is opened and the left eye is closed at the timing points ST1 and ST3, and the left eye is opened and the right eye is closed at the timing points ST2 and ST4.

Figure 5:
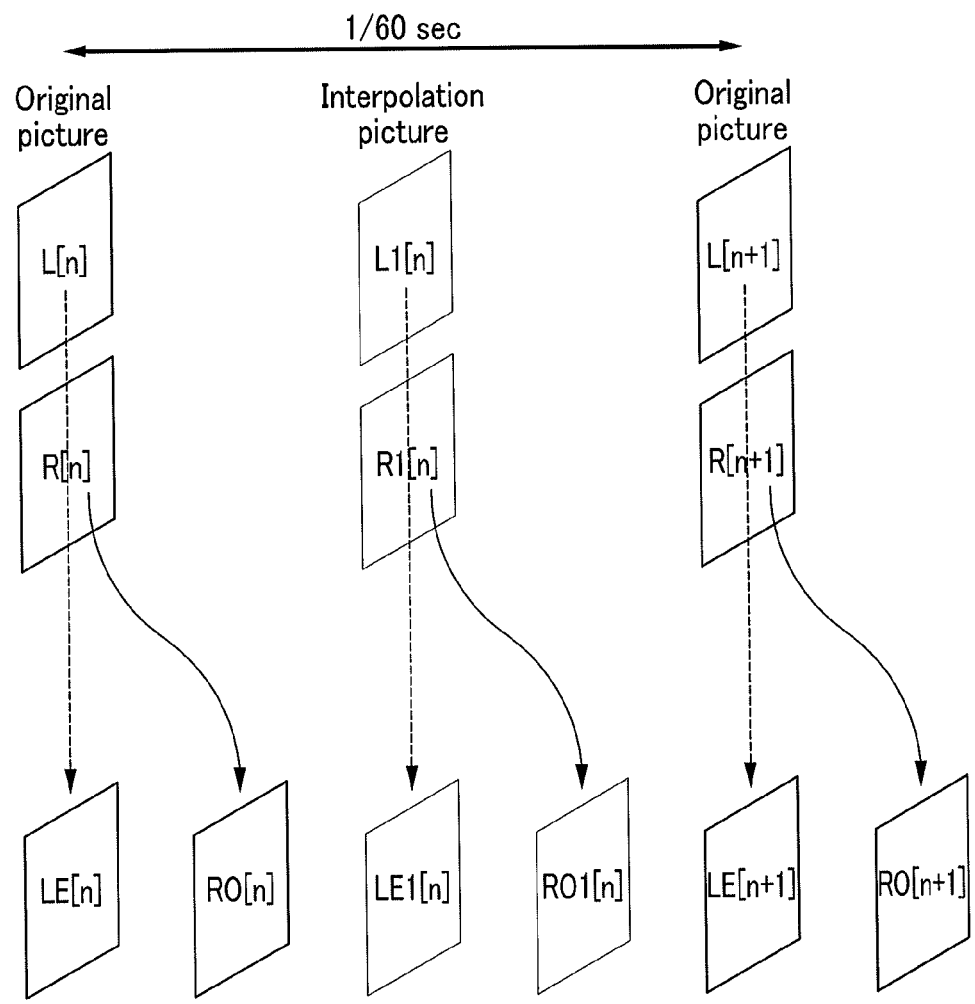
FIG. 5 illustrates a view of a method in which a display device selectively displays an interpolation left eye picture and an interpolation right eye picture respectively generated between original left eye pictures and original right eye pictures when the interpolation frequency is 120 Hz.

FIG. 5 illustrates a view of a method in which a display device selectively displays an interpolation left eye picture and an interpolation right eye picture respectively generated between original left eye pictures and original right eye pictures when the interpolation frequency is 120 Hz.

The display device selects the data signal representing the left eye picture LE[n] displayed in the first field among the data signal representing the n-th original left eye picture L[n] and supplies it to the first group pixels. The display device selects the data signal representing the right eye picture RO[n] displayed in the second field among the data signal representing the n-th original right eye picture R[n] and supplies it to the second group pixels.

The display device generates the interpolation left eye picture L1[$n$] between the n-th original left eye picture L[n] and the (n+1)-th original left eye picture L[n+1]. The display device generates the interpolation right eye picture R1[$n$] between the n-th original right eye picture R[n] and the (n+1)-th original right eye picture R[n+1].

The display device selects the data signal representing the interpolation left eye picture LE1[$n$] displayed in the first field among the data signal representing the interpolation left eye picture L1[$n$] and supplies it to the first group pixels. The display device selects the data signal representing the interpolation right eye picture RO1[$n$] displayed in the second field among the data signal representing the interpolation right eye picture R1[$n$] and supplies it to the second group pixels.

The display device selects the data signal representing the left eye picture LE[n+1] displayed in the first field among the data signal representing the (n+1)-th original left eye picture L[n+1] and supplies it to the first group pixels. The display device selects the data signal representing the right eye picture RO[n+1] displayed in the second field among the data signal representing the (n+1)-th original right eye picture R[n+1] and supplies it to the second group pixels.

The display device displays the left eye picture LE[n] and the interpolation left eye picture LE1[$n$] in the first field EFD, and displays the right eye picture RO[n] and the interpolation right eye picture RO1[$n$] in the second field OFD. Next, the display device displays the left eye picture LE[n+1] and the interpolation left eye picture (not shown) in the first field EFD, and displays the right eye picture RO[n+1] and the interpolation right eye picture (not shown) in the second field OFD. The display device repeats the above-described operation to display the stereoscopic image.

The light emitting time of the first field and the light emitting time of the second field are temporally divided, and as shown in FIG. 5, the display device sequentially displays the left eye picture LE[n], the right eye picture RO[n], the interpolation left eye picture LE1[$n$], the interpolation right eye picture RO1[$n$], the left eye picture LE[n+1], and the right eye picture RO[n+1].

Figure 6:
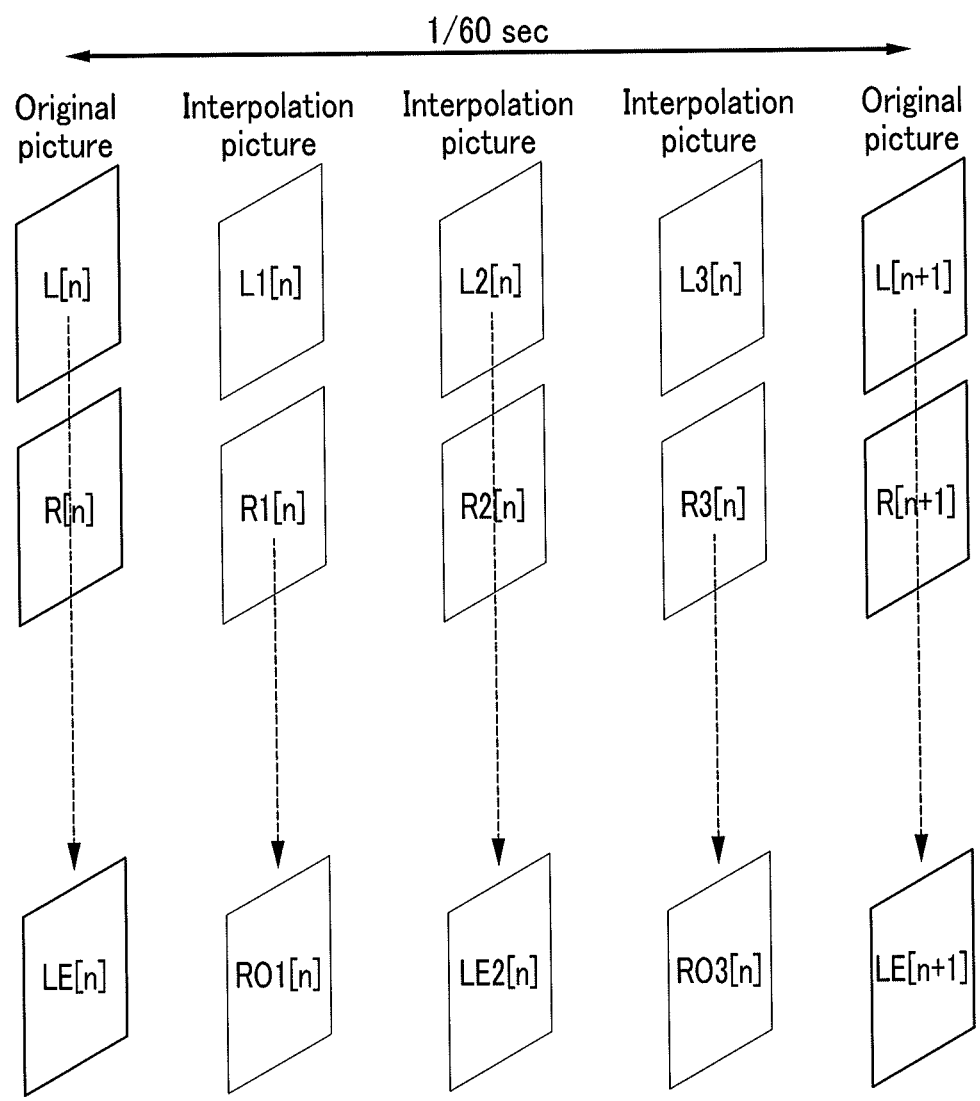
FIG. 6 illustrates a view of a method in which a display device selectively displays an interpolation picture and an original picture when the interpolation frequency is 240 Hz as double a stereoscopic image display frequency.

FIG. 6 illustrates a view of a method in which a display device selectively displays an interpolation picture and an original picture when the interpolation frequency is 240 Hz as double a stereoscopic image display frequency.

In the example shown in FIG. 6, the display device generates three interpolation left eye pictures L1[$n$], L2[$n$], and L3[$n$] and three interpolation right eye pictures R1[$n$], R2[$n$], and R3[$n$] according to the interpolation frequency. Here, the stereoscopic image display frequency is 120 Hz such that the picture displayed during the unit time 1/60 second is 4 sheets.

The display device selects the interpolation right eye picture RO1[$n$], the interpolation left eye picture LE2[$n$], and the interpolation right eye picture RO3[$n$] among the interpolation left eye picture and the interpolation right eye picture, and sequentially displays the left eye picture LE[n], the interpolation right eye picture RO1[$n$], the interpolation left eye picture LE2[$n$], the interpolation right eye picture RO3[$n$], and the left eye picture LE[n+1]. Although not shown in FIG. 6, the interpolation right eye picture RO1[$n$+1] is displayed following the left eye picture LE[n+1] by the same method.

Next, a method in which a stereoscopic image is displayed according to a concatenation light emitting mode according to another example embodiment will be described. The concatenation light emitting mode is a light emitting mode to prevent a motion artifact, which may be generated by a disparity when two blocks that are divided into a plurality of pixels displayed in the first field and a plurality of pixels displayed in the second field emit light with the disparity.

Figure 7:
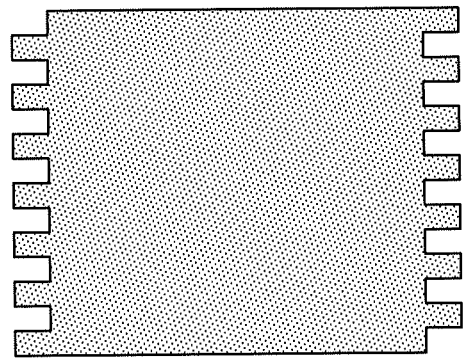
FIG. 7 illustrates a view of a motion artifact, as an aid to describing advantages of embodiments.

FIG. 7 illustrates a view of a motion artifact, as an aid to describing advantages of embodiments. Patterns where the pixels are disposed inside the panel in the first field and the second field are recognized as the motion artifact. As shown in FIG. 7, a block of the pixel group of the first field and a block of the pixel group of the second field are separated spatially. Thus, as shown in FIG. 7, the motion artifact of which the block edges of the pixel groups appear to be missed may be generated.

To prevent the motion artifact, the previous example embodiment uses the light emitting mode generating the interpolation picture and inserting it between the original pictures. Another example embodiment prevents the motion artifact through the concatenation light emitting mode without the interpolation picture.

Figure 8:
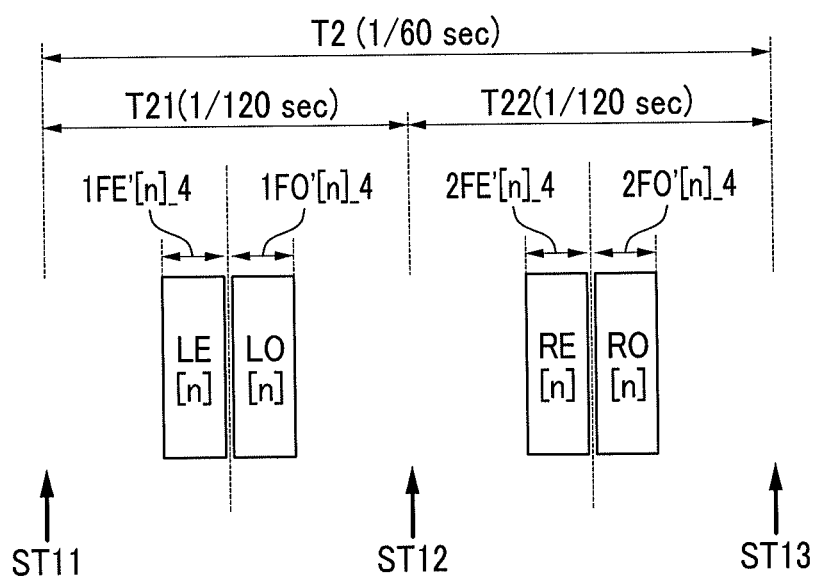
FIG. 8 illustrates a view of a driving method when displaying a stereoscopic image according to a concatenation light emitting mode among a driving method according to an example embodiment.

FIG. 8 illustrates a view of a driving method when displaying a stereoscopic image according to a concatenation light emitting mode among a driving method according to an example embodiment.

As described in detail below, in the concatenation light emitting mode, the n-th original left eye picture L[n] is displayed in the one frame light emitting period 1FE'[n]_4 of the first field and one frame light emitting period 1FO'[n]_4 of the second field close to the frame light emitting period 1FE'[n]_4. The n-th original right eye picture R[n] is displayed in one frame light emitting period 2FE'[n]_4 of the first field and one frame light emitting period 2FO'[n]_4 of the second field close to the frame light emitting period 2FE'[n]_4.

More particularly, the portion that is displayed in the light emitting period 1FE'[n]_4 of the first field among the n-th original left eye picture L[n] is the left eye picture LE[n], and the portion that is displayed in the light emitting period 1FO'[n]_4 of the second field is the left eye picture LO[n]. The sum of the first left eye picture LE[n] that is displayed during the light emitting period 1FE'[n]_4 in the first group pixels and the second left eye picture LO[n] that is displayed during the light emitting period 1FO'[n]_4 in the second group pixels is the original left eye picture L[n].

Likewise, the portion that is displayed in the light emitting period 2FE'[n]_4 of the first field among the n-th original right eye picture L[n] is the right eye picture RE[n], and the portion that is displayed in the light emitting period 2FO'[n]_4 of the second field is the right eye picture RO[n]. The sum of the right eye picture RE[n] that is displayed during the light emitting period 2FE'[n]_4 in the first group pixels and the right eye picture RO[n] that is displayed during the light emitting period 2FO'[n]_4 in the second group pixels is the original right eye picture R[n].

In FIG. 8, the timing points at which the left eye and the right eye of the shutter spectacles are opened and closed are indicated by arrows. The left eye is opened and the right eye is closed at the timing points ST11 and ST13, and the right eye is opened and the left eye is closed at the timing point ST12.

Figure 9:
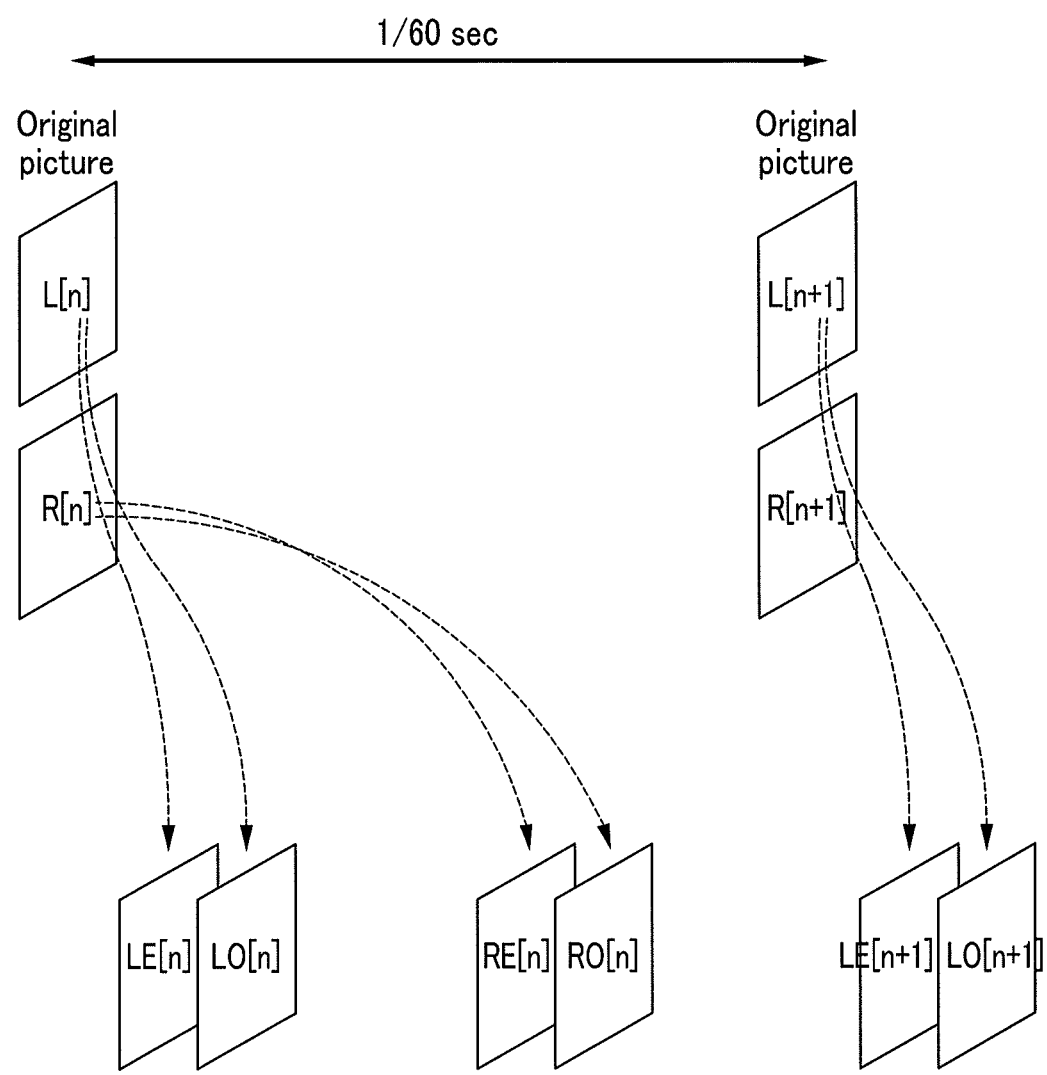
FIG. 9 illustrates a view showing a method in which a display device selects an original left eye picture and an original right eye picture according to a concatenation light emitting mode.

FIG. 9 illustrates a view showing a method in which a display device selects an original left eye picture and an original right eye picture according to a concatenation light emitting mode.

In the example shown in FIG. 9, the display device divides the data signal representing the n-th original left eye picture L[n] to transmit the data signal representing the left eye picture LE[n] in the first group pixels and the data signal representing the left eye picture LO[n] in the second group pixels. The display device displays the left eye picture LE[n] and the left eye picture LO[n] in the light emitting period among one frame of the first field and the second field.

The display device divides the data signal representing the n-th original right eye picture R[n] to transmit the data signal representing the right eye picture RE[n] in the first group pixels and the data signal representing the right eye picture RO[n] in the second group pixels. The display device displays the right eye picture RE[n] and the right eye picture RO[n] in the light emitting period among one frame (the frame next to the frame that the left eye picture is displayed) of the first field and the second field.

The display device displays the (n+1)-th original left eye picture L[n+1] and the original right eye picture R[n+1] with the same method.

Next, an operation of the display device when displaying the plane image will be described.

Figure 10:
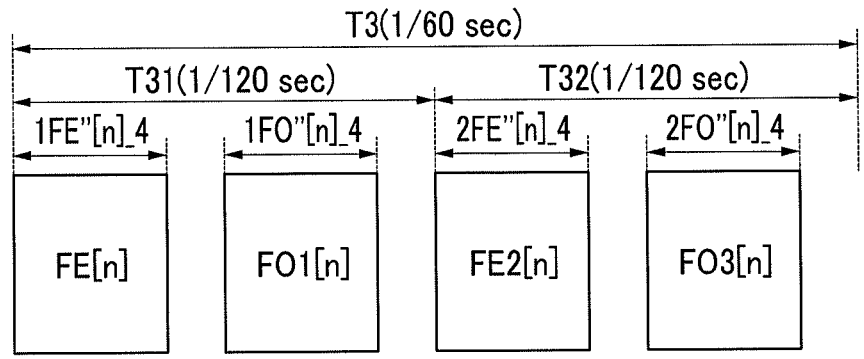
FIG. 10 illustrates a view of a driving method when displaying a plane image according to an equal-interval light emitting mode.

FIG. 10 illustrates a view of a driving method when displaying a plane image according to an equal-interval light emitting mode.

In FIG. 10, when the plane image display frequency is 120 Hz, 120 frames are displayed in the first field and 120 frames are displayed in the second field during one second.

FIG. 10 is a view showing the picture displayed during the period of 1/60 second. When the video signal input to the display device from the outside is the signal displaying the plane image, the plane video signal includes the original plane picture of 60 sheets at 1 second.

Accordingly, the display device may further display the interpolation plane of 180 as well as the original plane picture of 60 during 1 second. That is, three interpolation plane pictures may be displayed between two original plane pictures. The interpolation frequency is at least twice the stereoscopic image display frequency to generate three interpolation plane pictures between two original plane pictures.

As shown in FIG. 10, the picture displayed according to the plane image display frequency 120 Hz during the unit time (1/60 second) T3 is 4 sheets. That is, the unit time T3 includes the light emitting period of 4 frames. The unit time T3 is divided into the period T31 and the period T32, and the original plane picture and the interpolation picture during the period T31 and two interpolation pictures during the period T32 are displayed.

In the period T31, the n-th plane picture FE[n] is displayed during the light emitting period 1FE"[n]_4 of one frame of the first field, and the interpolation picture FO1[n] is displayed during the light emitting period 1FO"[n]_4 of one frame of the second field.

In the period T32, the interpolation picture FE2[n] is displayed during the light emitting period 2FE"[n]_4 of one frame of the first field, and the interpolation picture FO3[n] is displayed during the light emitting period 2FO"[n]_4 of one frame of the second field.

The interpolation picture FO1[n], the interpolation picture FE2[n], and the interpolation picture FO3[n] are the interpolation pictures between the n-th original plane picture and the (n+1)-th original plane picture.

Figure 11:
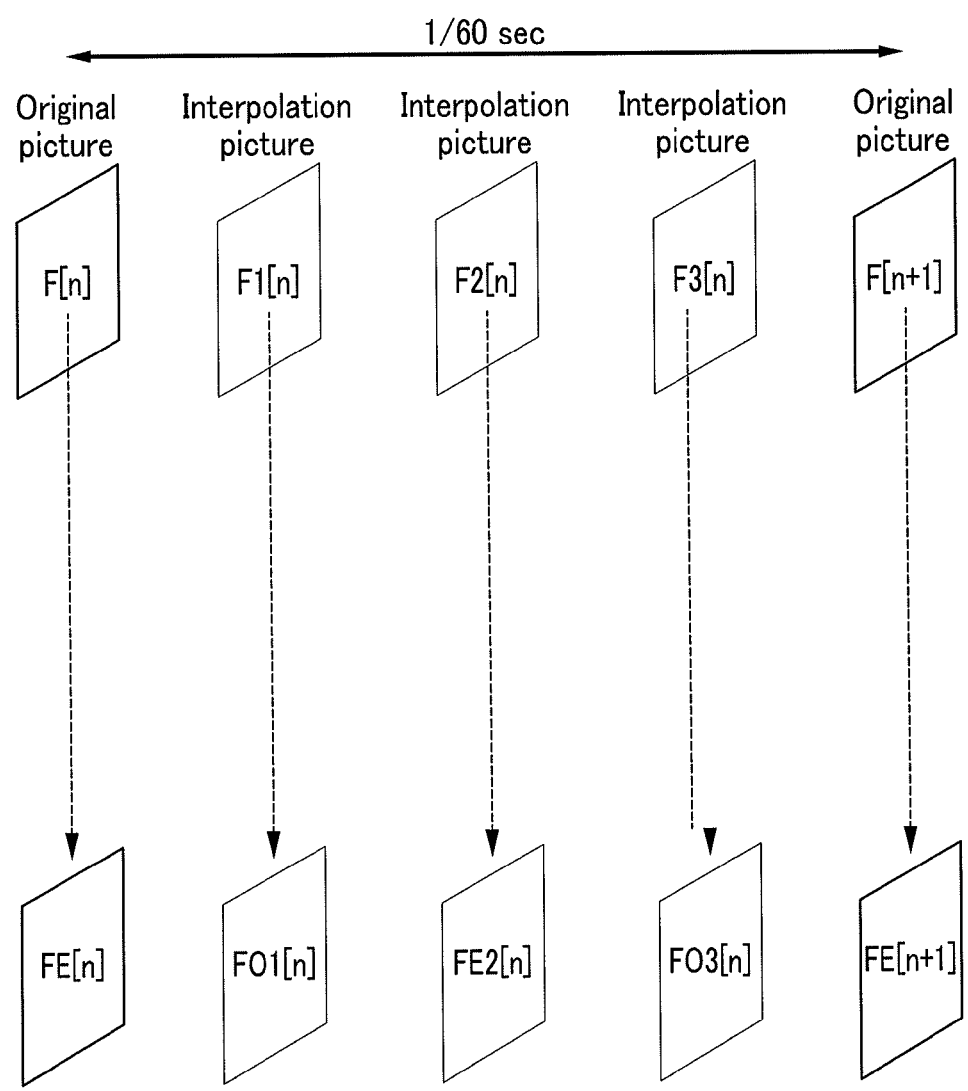
FIG. 11 illustrates a view showing a method in which a display device selectively displays interpolation pictures generated between original plane pictures when an interpolation frequency is 240 Hz.

FIG. 11 illustrates a view showing a method in which a display device selectively displays interpolation pictures generated between original plane pictures when an interpolation frequency is 240 Hz.

The display device selects the data signal representing the plane picture FE[n] displayed in the first field among the data signal representing the n-th original plane picture F[n] and supplies it to the first group pixels.

The display device generates three interpolation pictures, the interpolation picture F1[n], the interpolation picture F2[n], and the interpolation picture F3[n], between the n-th original plane picture F[n] and the (n+1)-th original plane picture F[n+1].

The display device selects the data signal representing the interpolation picture FO1[n] displayed in the second field among the data signal representing the interpolation picture F1[n] and supplies it to the second group pixels. Next, the display device selects the data signal representing the interpolation picture FE2[n] displayed in the first field among the data signal representing the interpolation picture F2[n] and supplies it to the first group pixels. The display device selects the data signal representing the interpolation picture FO3[n] displayed in the second field among the data signal representing the interpolation picture F3[n] and supplies it to the second group pixels.

The display device displays the plane picture FE[n] and the interpolation picture FE2[n] in the first field EFD, and the interpolation picture FO1[n] and the interpolation picture RO1[n] in the second field OFD. Next, the display device displays the plane picture FE[n+1] and the interpolation picture (not shown) in the first field EFD, and two interpolation pictures (not shown) in the second field OFD. The display device repeats the above operation to display the plane image.

The light emitting time of the first field and the light emitting time of the second field are temporally divided, and thereby the display device sequentially displays the plane picture FE[n], the interpolation picture FO1[n], the interpolation picture FE2[n], the interpolation picture F03[n], and the plane picture FE[n+1], as shown in FIG. 10.

Figure 12:
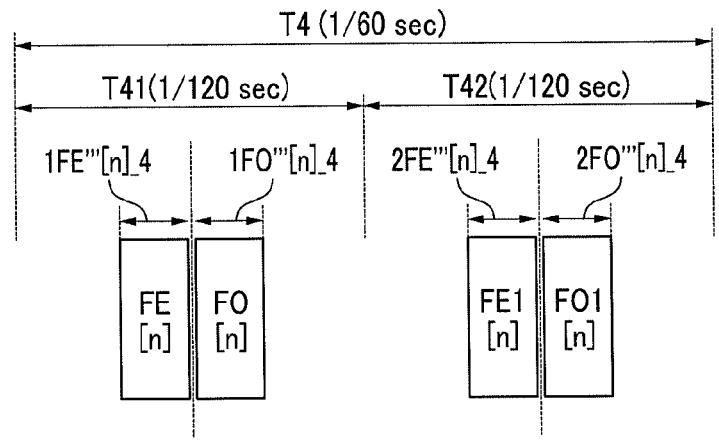
FIG. 12 illustrates a view of a driving method when displaying a plane image according to a concatenation light emitting mode according to another example embodiment.

FIG. 12 illustrates a view of a driving method when displaying a plane image according to a concatenation light emitting mode according to another example embodiment.

In the concatenation light emitting mode, the n-th original plane picture F[n] is displayed in the light emitting period 1FE'''[n]_4 of one frame of the first field and the light emitting period 1FO'''[n]_4 of one frame of the second field close to the frame light emitting period 1FE'''[n]_4. The interpolation picture F1[n] is displayed in the light emitting period 2FE'''[n]_4 of one frame of the first field and the light emitting period 2FO'''[n]_4 of one frame of the second field close to the frame light emitting period 2FE'''[n]_4.

More particularly, the plane picture FE[n] is displayed during the light emitting period 1FE'''[n]_4 of the first field among the n-th original plane picture F[n], and the plane picture FO[n] is displayed during the light emitting period 1FO'''[n]_4 of the second field among the original plane picture F[n].

The interpolation picture FE1[n] is displayed during the light emitting period 2FE'''[n]_4 of the first field among the interpolation picture F1[n], and the interpolation picture FO1[n] is displayed during the light emitting period 2FO'''[n]_4 of the second field among the interpolation picture F1[n].

Figure 13:
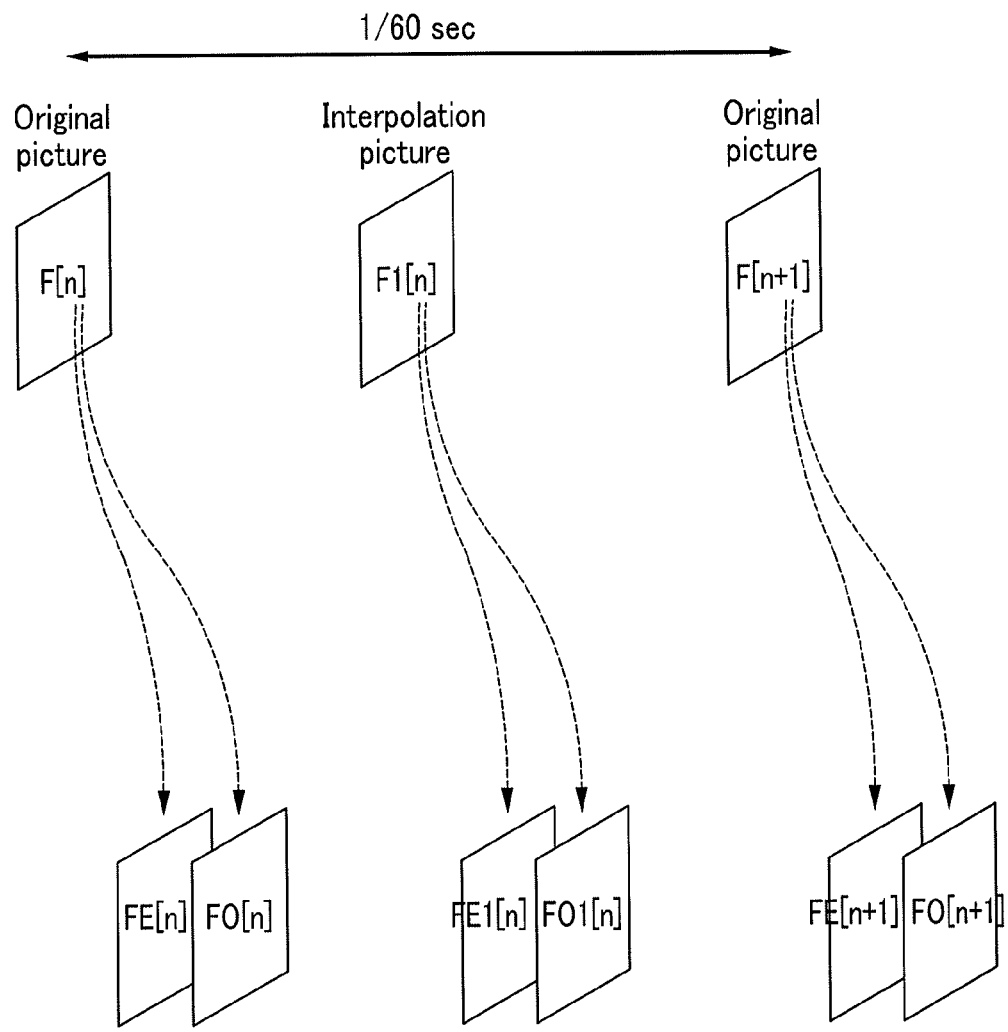
FIG. 13 illustrates a view showing a method in which a display device selects an original plane picture and an interpolation picture according to a concatenation light emitting mode.

FIG. 13 illustrates a view showing a method in which a display device selects an original plane picture and an interpolation picture according to a concatenation light emitting mode.

In the example shown in FIG. 13, the interpolation frequency is 120 Hz, and one interpolation picture F1[n] is generated between the original plane pictures F[n] and F[n+1].

As shown in FIG. 13, the display device divides the data signal representing the n-th original plane picture F[n] to transmit the data signal representing the plane picture FE[n] in the first group pixels and the data signal representing the plane picture FO[n] in the second group pixels. The display device displays the plane picture FE[n] and the plane picture FO[n] in the light emitting period among one frame of the first field and the second field.

The display device divides the data signal representing the interpolation picture F1[n] to transmit the data signal representing the interpolation picture FE1[n] in the first group pixels and the data signal representing the interpolation picture FO1[n] in the second group pixels. The display device displays the interpolation picture FE1[n] and the interpolation picture FO1[n] in the light emitting period among one frame of the first field and the second field.

The display device divides the data signal representing the (n+1)-th original plane picture F[n+1] to transmit the data signal representing the plane picture FE[n+1] in the first group pixels and the data signal representing the plane picture FO[n+1] in the second group pixels.

According to the above method, the display device displays the original plane picture and the interpolation picture.

The stereoscopic image display frequency and the plane image display frequency are set up as 120 Hz and the interpolation frequency is set up as 120 Hz or 240 Hz in the example embodiment, although other implementations may be used.

When the stereoscopic image display frequency and the plane image display frequency is 60 Hz, e.g., to reduce the cost of the driver included in the display device, the same method may also be applied.

The number of pictures displayed during 1 second is half. In detail, the periods T1, T2, and T3 are not $\frac{1}{120}$ second but are $\frac{1}{60}$ second, and the remaining periods are twice the above-described periods such that the example embodiment of 60 Hz is realized.

Also, if a unit frequency of 50 Hz (the PAL method) is applied instead of the unit frequency of 60 Hz (the NTSC method), only the periods are changed, and the driving principle is the same.

Next, an arrangement of a power line, which is a control line transmitting the compensation control signal in the display panel according to an example embodiment, will be described with reference to FIG. 14.

Figure 14:
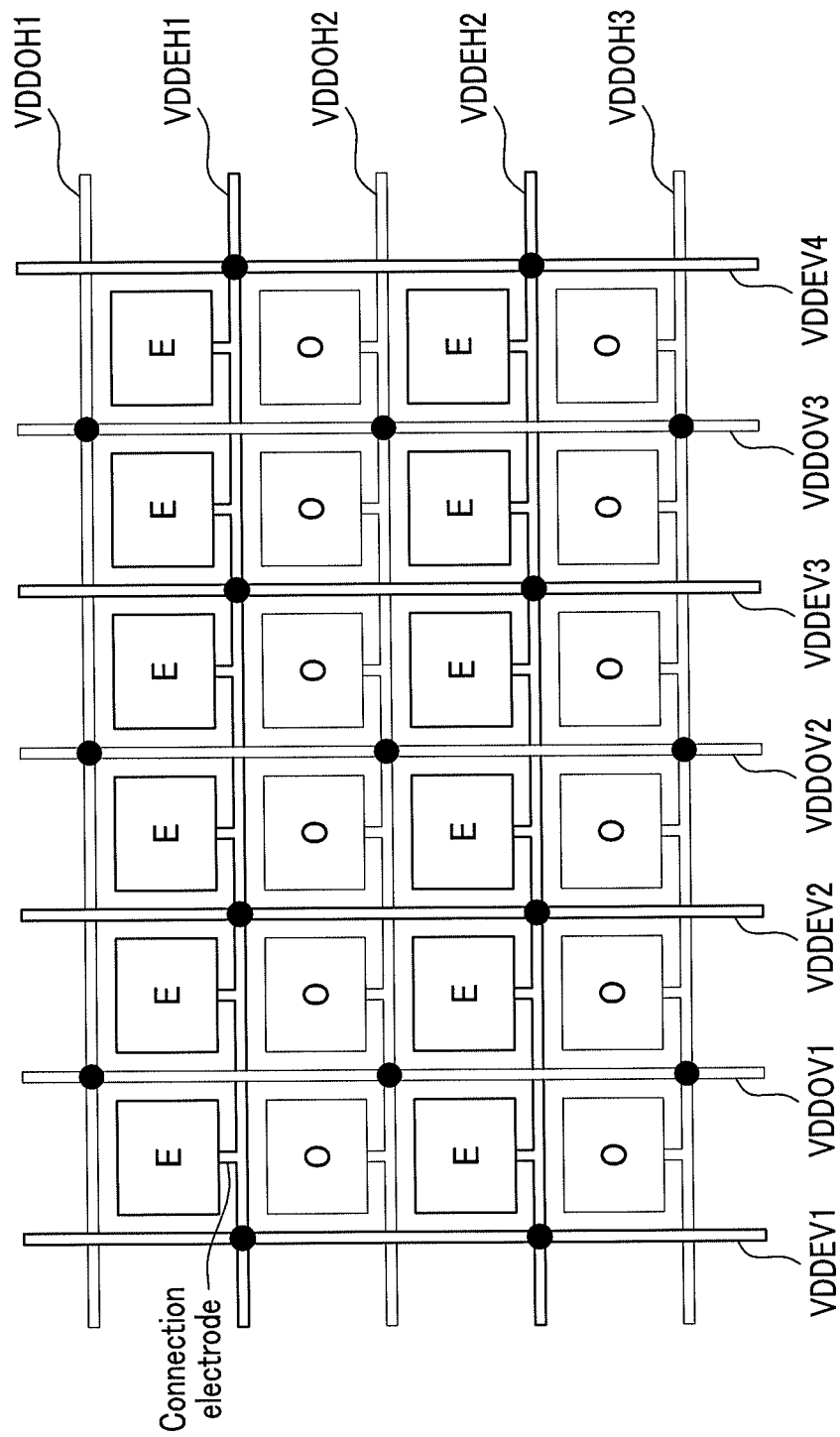
FIG. 14 illustrates a view showing a connection structure between a power line and a unit region according to a horizontal line arrangement method shown in FIG. 2A.

FIG. 14 illustrates a view showing a connection structure between a power line and a unit region according to a horizontal line arrangement method shown in FIG. 2A.

In the example shown in FIG. 14, a plurality of first power lines VDDEV and a plurality of second power lines VDDOV are arranged in a first direction (in FIG. 14, from the left side to the right side), e.g., a horizontal direction. The numbers along with "VDDEV" distinguish the first power lines VDDEV, and the numbers along with "VDDOV" distinguish the second power lines VDDOV.

As shown in FIG. 14, a plurality of first power lines VDDEH and a plurality of second power lines VDDOH are arranged in a second direction (in FIG. 14, from the lower side to the upper side), e.g., a vertical direction. The numbers along with "VDDEH" distinguish the first power lines VDDEH, and the numbers along with "VDDOH" distinguish the second power lines VDDOH.

"V" and "H" immediately before the number indicate the first power lines formed in the vertical direction and the first power lines formed in horizontal direction among a plurality of first power lines, respectively. Likewise, "V" and "H" immediately before the number indicate the second power lines formed in the vertical direction and the second power lines formed in horizontal direction among a plurality of second power lines, respectively.

In addition, "E" and "O" indicate the power lines supplying the power source voltage VDD to the first group pixels emitting the light in the first field EFD and the power lines supplying the power source voltage VDD to the second group pixels emitting the light in the second field OFD, respectively.

As shown in FIG. 14, a plurality of first power lines VDDEV1-VDDEV3 intersect a plurality of first power lines VDDEH1 and VDDEH2, and they are connected to each other at the intersecting points thereof, thereby being arranged in a matrix structure. A plurality of second power lines VDDOV1-VDDOV3 intersect a plurality of second power lines VDDOH1-VDDOH3, and they are connected to each other at the intersecting points thereof, thereby being arranged in a matrix structure.

A plurality of unit regions E arranged in the first row are connected to the first power line VDDEH1, thereby being supplied with the power source voltage VDD from the first power line VDDEH1. A plurality of unit regions E arranged in the third row are connected to the first power line VDDEH2, thereby being supplied with the power source voltage VDD from the first power line VDDEH2.

A plurality of unit regions O arranged in the second row are connected to the second power line VDDOH2, thereby being supplied with the second power line VDDOH2 from the power source voltage VDD. A plurality of unit regions O arranged in the fourth row are connected to the second power line VDDOH3, thereby being supplied with the second power line VDDOH3 from the power source voltage VDD.

A plurality of first power lines and a plurality of second power lines are connected to a plurality of corresponding unit regions through connection electrodes.

Figure 15:
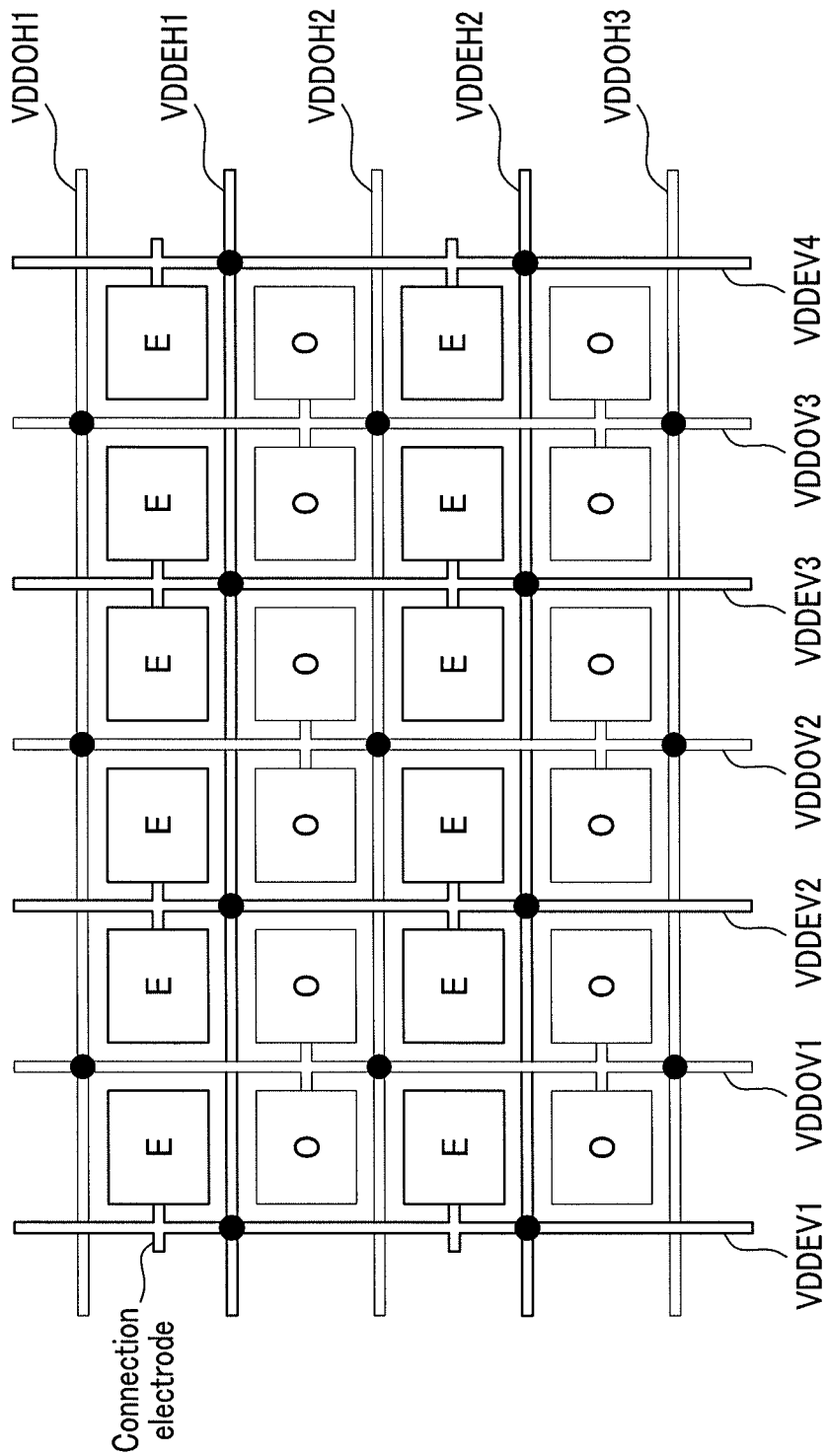
FIG. 15 illustrates a view showing another connection structure between a power line and a unit region according to a horizontal line arrangement method shown in FIG. 2A.

FIG. 15 illustrates a view showing another connection structure between a power line and a unit region according to a horizontal line arrangement method shown in FIG. 2A.

The connection relation between a plurality of first power lines and the connection relation between a plurality of second power lines are the same as that of FIG. 14.

A plurality of unit regions E arranged in the first column are connected to the first power line VDDEV1, thereby receiving the power source voltage VDD from the first power line VDDEV1. A plurality of unit regions E arranged in the second column and the third column are connected to the first power line VDDEV2, thereby receiving the power source voltage VDD from the first power line VDDEV2. A plurality of unit regions E arranged in the fourth column and the fifth column are connected to the first power line VDDEV3, thereby receiving the power source voltage VDD from the first power line VDDEV3. A plurality of unit regions E arranged in the sixth column are connected to the first power line VDDEV4, thereby receiving the power source voltage VDD from the first power line VDDEV4.

A plurality of unit regions O arranged in the first column and the second column are connected to the second power line VDDOV1, thereby receiving the power source voltage VDD from the second power line VDDOV1. A plurality of unit regions O arranged in the third column and the fourth column are connected to the second power line VDDOV2, thereby receiving the power source voltage VDD from the second power line VDDOV2. A plurality of unit regions O arranged in the fifth column and the sixth column are connected to the second power line VDDOV3, thereby receiving the power source voltage VDD from the second power line VDDOV3.

Figure 16:
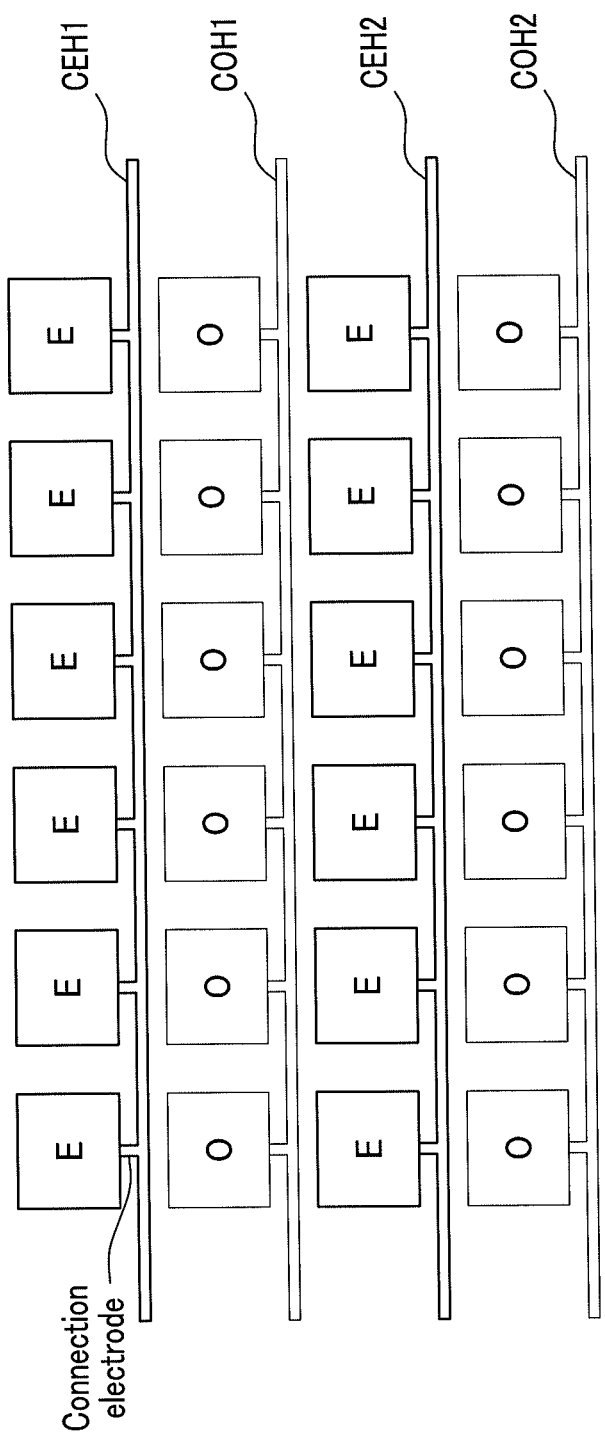
FIG. 16 illustrates a view showing signal lines transmitting a first compensation control signal and a second compensation control signal, the signal lines being arranged in a vertical direction when unit regions are arranged as in FIG. 2A.

FIG. 16 illustrates a view showing signal lines transmitting a first compensation control signal and a second compensation control signal, the signal lines being arranged in a vertical direction when unit regions are arranged as in FIG. 2A.

In the example shown in FIG. 16, a plurality of first control signal lines CEH1 and CEH2, transmitting the first compensation control signal GCE, and a plurality of second control signal lines COH1 and COH2, transmitting the second compensation control signal GCO, are alternately disposed. The arrangement shown in FIG. 16 is merely one example in which a plurality of first and second control signal lines are alternately disposed.

A plurality of unit regions E arranged in the first row are connected to the first control signal line CEH1, thereby receiving the first compensation control signal GCE from the first control signal line CEH1. A plurality of unit regions E arranged in the third row are connected to the first control signal line CEH2, thereby receiving the first compensation control signal GCE from the first control signal line CEH2.

A plurality of unit regions O arranged in the second row are connected to the second control signal line COH1, thereby receiving the second compensation control signal GCO from the second control signal line COH1. A plurality of unit regions O arranged in the fourth row are connected to the second control signal line COH2, thereby receiving the second compensation control signal GCO from the second control signal line COH2.

Figure 17:
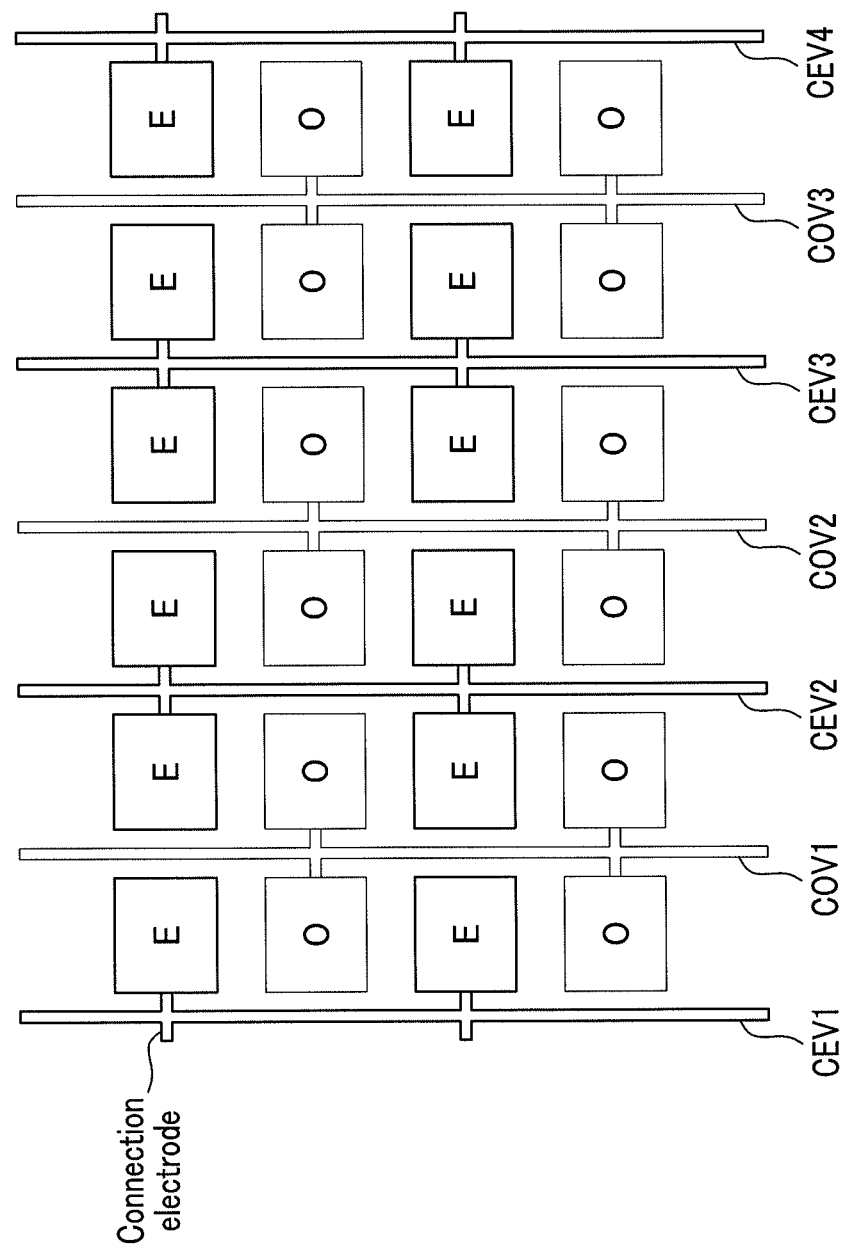
FIG. 17 illustrates a view showing signal lines transmitting a first compensation control signal and a second compensation control signal, the signal lines being arranged in a horizontal direction when unit regions are arranged as in FIG. 2A.

FIG. 17 illustrates a view showing signal lines transmitting a first compensation control signal and a second compensation control signal, the signal lines being arranged in a horizontal direction when unit regions are arranged as in FIG. 2A.

In the example shown in FIG. 17, a plurality of first control signal lines CEV1-CEV4, transmitting the first compensation control signal GCE, and a plurality of second control signal lines COV1-COV3, transmitting the second compensation control signal GCO, are alternately disposed. The arrangement shown in FIG. 17 is merely one example in which a plurality of first and second control signal lines are alternately disposed.

A plurality of unit regions E arranged in the first column are connected to the first control signal line CEV1, thereby receiving the first compensation control signal GCE from the first control signal line CEV1. A plurality of unit regions E arranged in the second column and third column are connected to the first control signal line CEV2, thereby receiving the first compensation control signal GCE from the first control signal line CEV2. A plurality of unit regions E arranged in the fourth column and fifth column are connected to the first control signal line CEV3, thereby receiving the first compensation control signal GCE from the first control signal line CEV3. A plurality of unit regions E arranged in the sixth column are connected to the first control signal line CEV4, thereby receiving the first compensation control signal GCE from the first control signal line CEV4.

A plurality of unit regions O arranged in the first column and second column are connected to the second control signal line COV1, thereby receiving the second compensation control signal GCO from the second control signal line COV1. A plurality of unit regions O arranged in the third column and fourth column are connected to the second control signal line COV2, thereby receiving the second compensation control signal GCO from the second control signal line COV2. A plurality of unit regions O arranged in the fifth column and sixth column are connected to the second control signal line COV3, thereby receiving the second compensation control signal GCO from the second control signal line COV3.

Next, an arrangement of a power line and a control signal line in the display panel (in which a plurality of first unit regions E and a plurality of second unit regions O are arranged according to the 1×1 dot arrangement shown in FIG. 2C) will be described with reference to FIG. 18.

Figure 18:
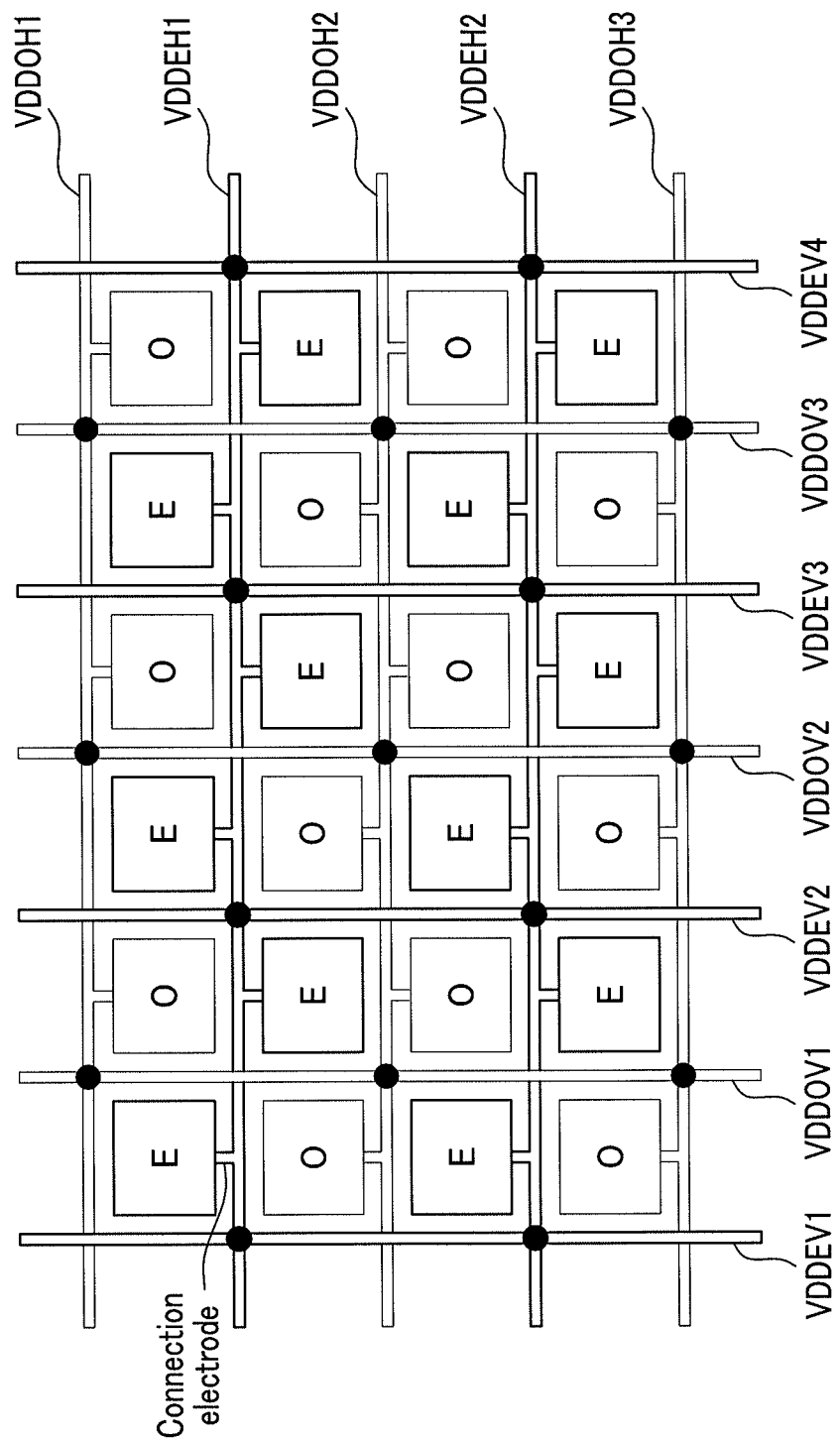
FIG. 18 illustrates a view of a connection structure between a power line and a unit region according to a 1×1 dot arrangement method shown in FIG. 2C.

FIG. 18 illustrates a view of a connection structure between a power line and a unit region according to a 1×1 dot arrangement method shown in FIG. 2C.

In the example shown in FIG. 18, a plurality of first power lines VDDEV1-VDDEV4 and a plurality of second power lines VDDOV1-VDDOV3 are arranged in the horizontal direction. Also, a plurality of first power lines VDDEH1 and VDDEH2 and a plurality of second power lines VDDOH1-VDDOH3 are arranged in the vertical direction.

As shown in FIG. 18, a plurality of first power lines VDDEV1-VDDEV3 intersect a plurality of first power lines VDDEH1 and VDDEH2 and are connected to each other at the intersecting point, thereby forming the matrix structure as in FIG. 14. Likewise, a plurality of second power lines VDDOV1-VDDOV3 intersect a plurality of second power lines VDDOH1-VDDOH3 and are connected to each other at the intersecting point, thereby forming the matrix structure as in FIG. 14.

A plurality of unit regions E arranged in the first row and second row are connected the first power line VDDEH1, thereby receiving the power source voltage VDD from the first power line VDDEH1. A plurality of unit regions E arranged in the third row and fourth row are connected to the first power line VDDEH2, thereby receiving the power source voltage VDD from the first power line VDDEH2.

A plurality of unit regions O arranged in the first row are connected to the second power line VDDOH1, thereby receiving the power source voltage VDD from the second power line VDDOH1. A plurality of unit regions O arranged in the second row and third row are connected to the second power line VDDOH2, thereby receiving the power source voltage VDD from the second power line VDDOH2. A plurality of unit regions O arranged in the fourth row are connected to the second power line VDDOH3, thereby receiving the power source voltage VDD from the second power line VDDOH3.

A plurality of first power lines and a plurality of second power lines are connected to a plurality of corresponding unit regions through the connection electrodes. A plurality of connection electrodes are extended in one direction according to the position of the corresponding unit region among the upper direction and the lower direction according to the 1×1 dot arrangement. In the 1×1 dot arrangement, a plurality of corresponding unit regions are positioned in a zigzag shape with reference to the power line such that a plurality of connection electrodes are alternately formed in the upper direction or the lower direction.

Figure 19:
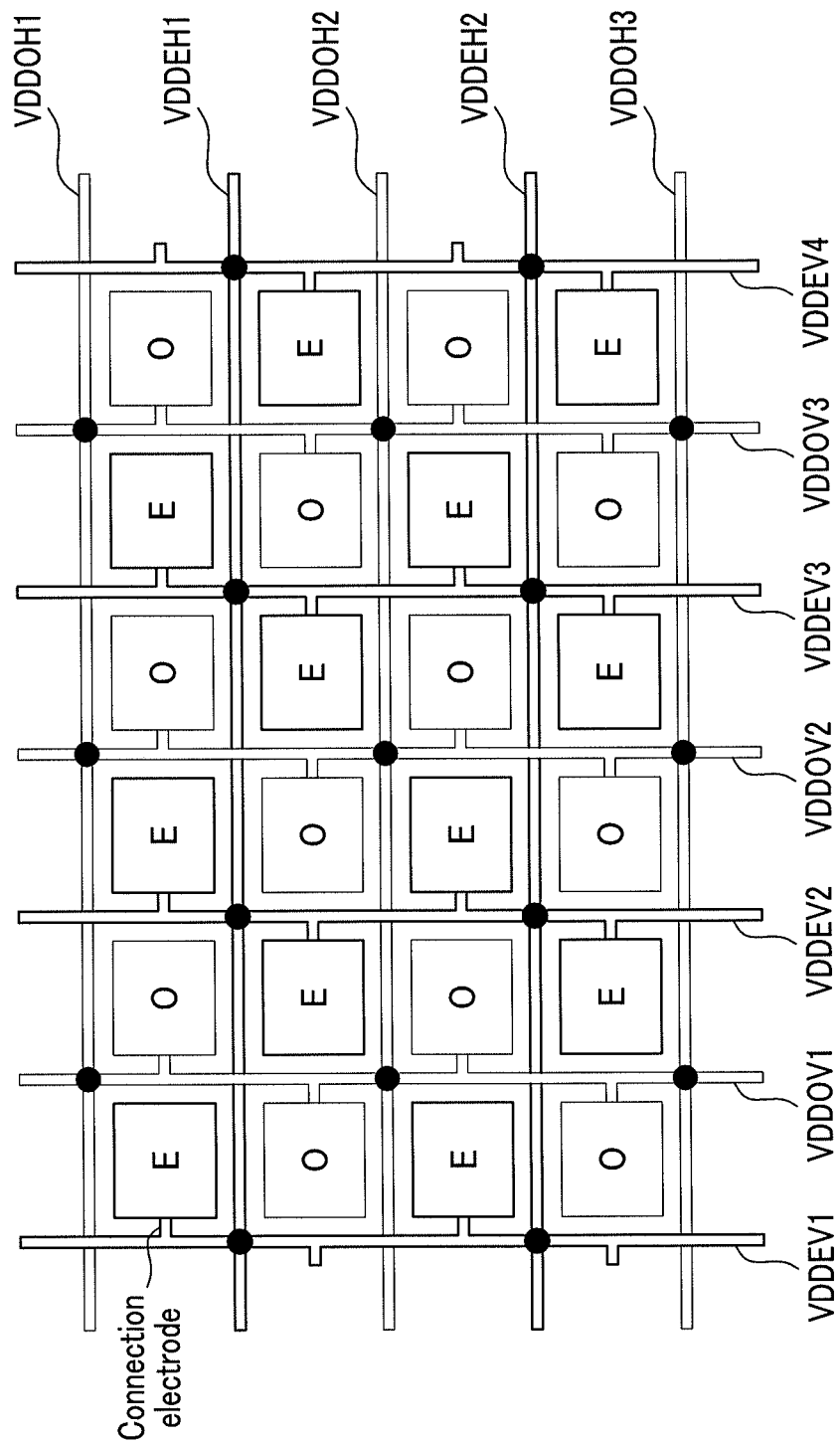
FIG. 19 illustrates a view of another connection structure between a power line and a unit region according to a 1×1 dot arrangement method shown in FIG. 2C.

FIG. 19 illustrates a view of another connection structure between a power line and a unit region according to a 1×1 dot arrangement method shown in FIG. 2C.

The connection relation between a plurality of first power lines and the connection relation between a plurality of second power lines are the same as that of FIG. 14.

A plurality of unit regions E arranged in the first column are connected to the first power line VDDEV1, thereby receiving the power source voltage VDD from the first power line VDDEV1. A plurality of unit regions E arranged in the second column and third column are connected to the first power line VDDEV2, thereby receiving the power source voltage VDD from the first power line VDDEV2. A plurality of unit regions E arranged in the fourth column and fifth column are connected to the first power line VDDEV3, thereby receiving the power source voltage VDD from the first power line VDDEV3. A plurality of unit regions E arranged in the sixth column are connected to the first power line VDDEV4, thereby receiving the power source voltage VDD from the first power line VDDEV4.

A plurality of unit regions O arranged in the first column and second column are connected to the second power line VDDOV1, thereby receiving the power source voltage VDD from the second power line VDDOV1. A plurality of unit regions O arranged in the third column and fourth column are connected to the second power line VDDOV2, thereby receiving the power source voltage VDD from the second power line VDDOV2. A plurality of unit regions O arranged in the fifth column and sixth column are connected to the second power line VDDOV3, thereby receiving the power source voltage VDD from the second power line VDDOV3.

A plurality of first power lines and a plurality of second power lines are connected to a plurality of corresponding unit regions through the connection electrodes. A plurality of connection electrodes are extended in one direction according to the position of the corresponding unit region among the left direction or the right direction according to the 1×1 dot arrangement. A plurality of corresponding unit regions are positioned with the zigzag shape in the 1×1 dot arrangement with reference to the power line such that a plurality of connection electrodes are alternately formed in the left direction or the right direction.

Figure 20:
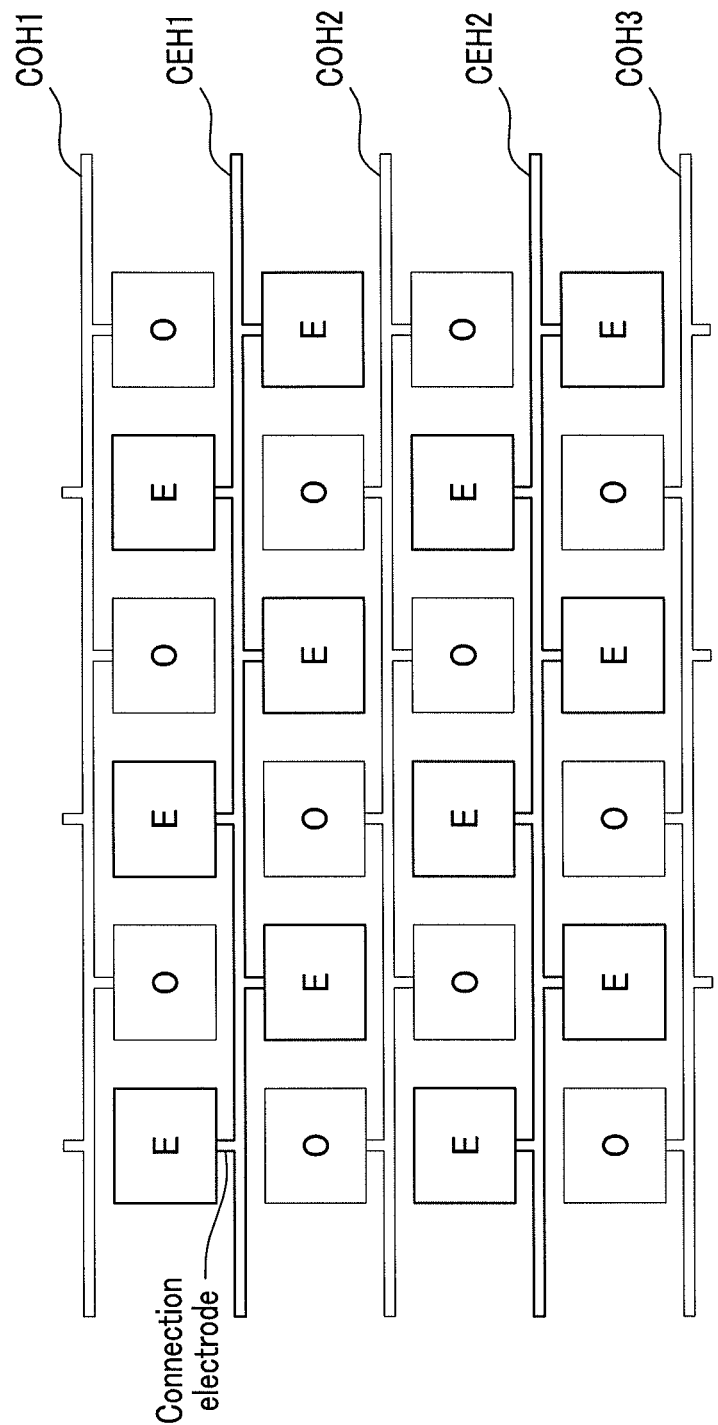
FIG. 20 illustrates a view showing signal lines transmitting a first compensation control signal and a second compensation control signal, the signal lines being arranged in a vertical direction when unit regions are arranged as in FIG. 2C.

FIG. 20 illustrates a view showing signal lines transmitting a first compensation control signal and a second compensation control signal, the signal lines being arranged in a vertical direction when unit regions are arranged as in FIG. 2C.

In the example shown in FIG. 20, a plurality of first control signal lines CEH1 and CEH2, transmitting the first compensation control signal GCE, and a plurality of second control signal lines COH1-COH3, transmitting the second compensation control signal GCO, are alternately disposed. The arrangement shown in FIG. 20 is merely one example in which a plurality of first and second control signal lines are alternately disposed.

A plurality of unit regions E arranged in the first row and second row are connected to the first control signal line CEH1, thereby receiving the first compensation control signal GCE from the first control signal line CEH1. A plurality of unit regions E arranged in the third row and fourth row are connected to the first control signal line CEH2, thereby receiving the first compensation control signal GCE from the first control signal line CEH2.

A plurality of unit regions O arranged in the first row are connected to the second control signal line COH1, thereby receiving the second compensation control signal GCO from the second control signal line COH1. A plurality of unit regions O arranged in the second row and third row are connected to the second control signal line COH2, thereby receiving the second compensation control signal GCO from the second control signal line COH2. A plurality of unit regions O arranged in the fourth row are connected to the second control signal line COH3, thereby receiving the second compensation control signal GCO from the second control signal line COH3.

A plurality of first control signal lines and a plurality of second control signal lines are connected to a plurality of corresponding unit regions through the connection electrodes. A plurality of connection electrodes are extended in one direction according to the position of the corresponding unit region among the upper direction and the lower direction according to the 1×1 dot arrangement. A plurality of corresponding unit regions are positioned with the zigzag shape with reference to the control signal line in the 1×1 dot arrangement such that a plurality of connection electrodes are alternately formed in the upper direction or the lower direction.

Figure 21:
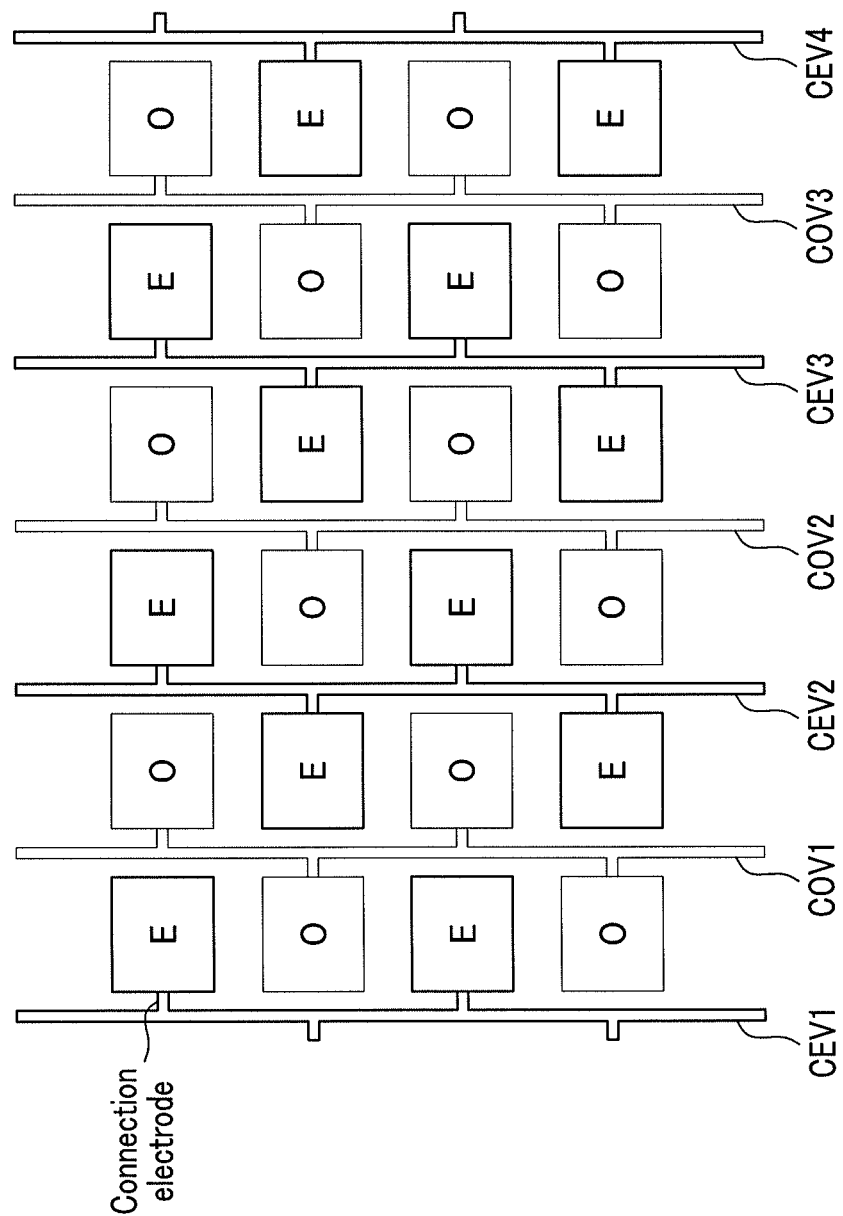
FIG. 21 illustrates a view showing signal lines transmitting a first compensation control signal and a second compensation control signal, the signal lines being arranged in a horizontal direction when unit regions are arranged as in FIG. 2C.

FIG. 21 illustrates a view showing signal lines transmitting a first compensation control signal and a second compensation control signal, the signal lines being arranged in a horizontal direction when unit regions are arranged as in FIG. 2C.

In the example shown in FIG. 21, a plurality of first control signal lines CEV1-CEV4, transmitting the first compensation control signal GCE, and a plurality of second control signal lines COV1-COV3, transmitting the second compensation control signal GCO, are alternately disposed. The arrangement shown in FIG. 21 is merely one example in which a plurality of first and second control signal lines are alternately disposed.

A plurality of unit regions E arranged in the first column are connected to the first control signal line CEV1, thereby receiving the first compensation control signal GCE from the first control signal line CEV1. A plurality of unit regions E arranged in the second column and third column are connected to the first control signal line CEV2, thereby receiving the first compensation control signal GCE from the first control signal line CEV2. A plurality of unit regions E arranged in the fourth column and fifth column are connected to the first control signal line CEV3, thereby receiving the first compensation control signal GCE from the first control signal line CEV3. A plurality of unit regions E arranged in the sixth column are connected to the first control signal line CEV4, thereby receiving the first compensation control signal GCE from the first control signal line CEV4.

A plurality of unit regions O arranged in the first column and second column are connected to the second control signal line COV1, thereby receiving the second compensation control signal GCO from the second control signal line COV1. A plurality of unit regions O arranged in the third column and fourth column are connected to the second control signal line COV2, thereby receiving the second compensation control signal GCO from the second control signal line COV2. A plurality of unit regions O arranged in the fifth column and sixth column are connected to the second control signal line COV3, thereby receiving the second compensation control signal GCO from the second control signal line COV3.

A plurality of first control signal lines and a plurality of second control signal lines are connected to a plurality of corresponding unit regions through the connection electrodes. A plurality of connection electrodes are extended in one direction according to the position of the corresponding unit region among the left direction or the right direction according to the 1×1 dot arrangement. A plurality of corresponding unit regions are positioned in the zigzag shape with reference to the control signal line in the 1×1 dot arrangement such that a plurality of connection electrodes are alternately formed in the left direction or the right direction.

Figure 22:
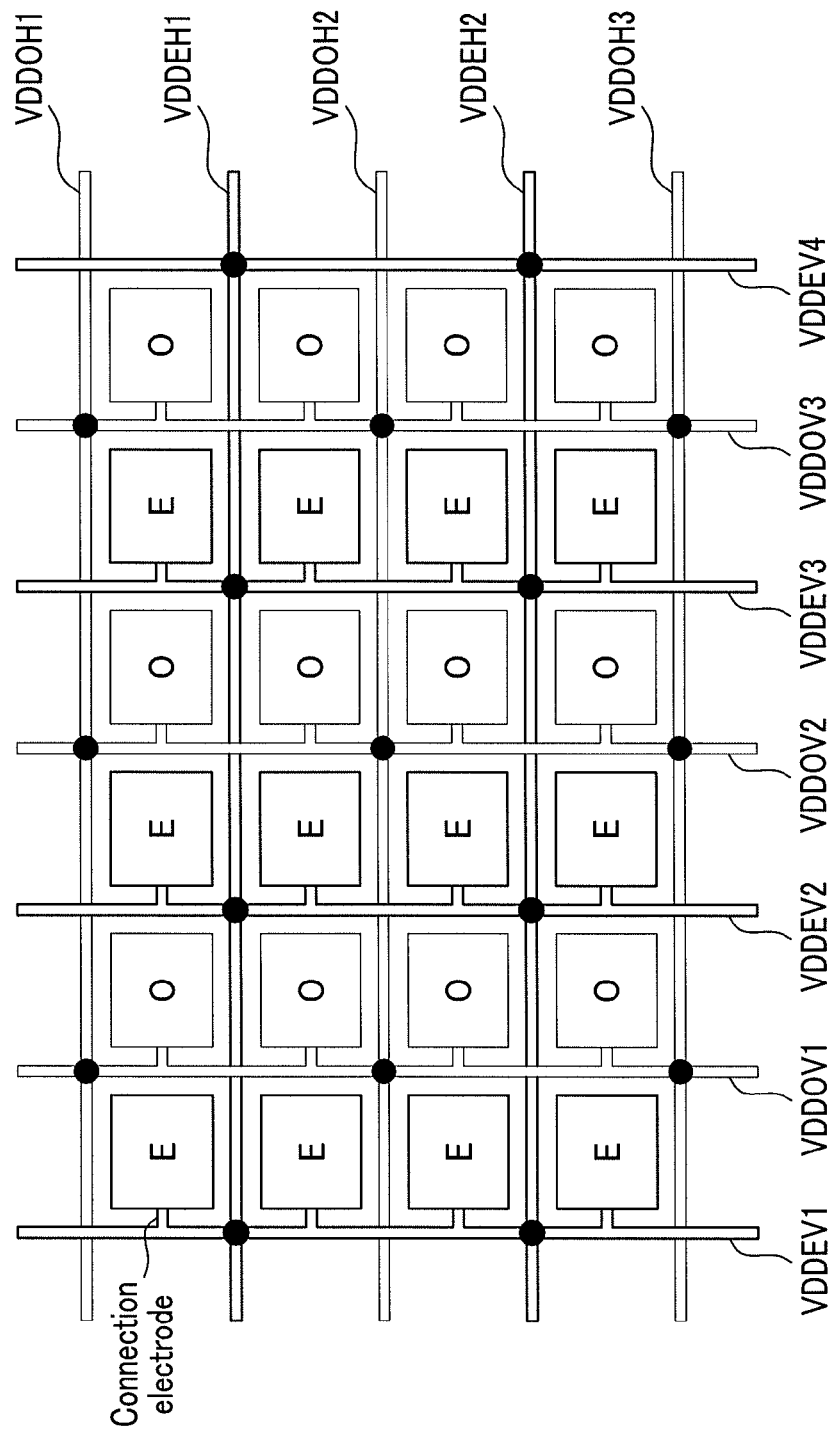
FIG. 22 and FIG. 23 illustrate views of a connection structure between a power line and a unit region according to an arrangement method shown in FIG. 2B.
Figure 23:
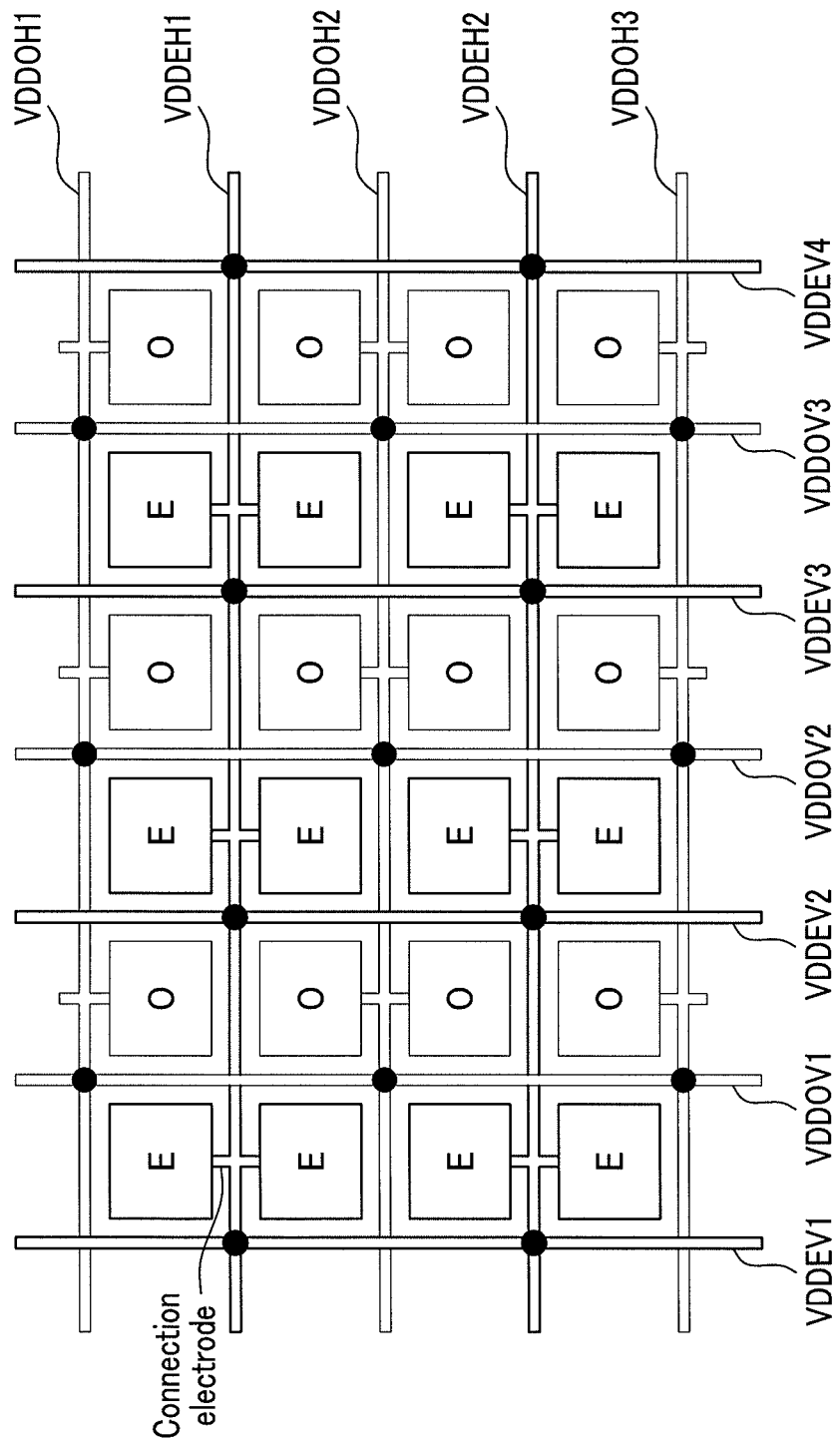

FIG. 22 and FIG. 23 illustrate views of a connection structure between a power line and a unit region according to an arrangement method shown in FIG. 2B. More particularly, FIG. 22 and FIG. 23 illustrate views of a connection structure between a power line and a unit region when a plurality of unit regions E and O are disposed according to an arrangement method shown in FIG. 2B. The connection relation between a plurality of first power lines and the connection relation between a plurality of second power lines are the same as that of FIG. 14.

In the example shown in FIG. 22, a plurality of unit regions E arranged in the first column are connected through a plurality of connection electrodes extended in the right direction from the first power line VDDEV1, thereby receiving the power source voltage VDD from the first power line VDDEV1. A plurality of unit regions E arranged in the third column are connected to the first power line VDDEV2 through a plurality of connection electrodes, thereby receiving the power source voltage VDD from the first power line VDDEV2. A plurality of unit regions E arranged in the fifth column are connected to the first power line VDDEV3 through a plurality of connection electrodes, thereby receiving the power source voltage VDD from the first power line VDDEV3.

A plurality of unit regions O arranged in the second column are connected to the second power line VDDOV1 through a plurality of connection electrodes extended in the right direction from the second power line VDDOV1, thereby receiving the power source voltage VDD from the second power line VDDOV1. A plurality of unit regions O arranged in the fourth column are connected to the second power line VDDOV2 through a plurality of connection electrodes, thereby receiving the power source voltage VDD from the second power line VDDOV2. A plurality of unit regions O arranged in the sixth column are connected to the second power line VDDOV3 through a plurality of connection electrodes, thereby receiving the power source voltage VDD from the second power line VDDOV3.

In a different example, as shown in FIG. 23, a plurality of unit regions E arranged in the first and second rows are connected to the first power line VDDEH1 through a plurality of connection electrodes extended in the up and down direction, thereby receiving the power source voltage VDD from the first power line VDDEH1. A plurality of unit regions E arranged in the third and fourth rows are connected to the first power line VDDEH2 through a plurality of connection electrodes, thereby receiving the power source voltage VDD from the first power line VDDEH2.

A plurality of unit regions O arranged in the first row are connected to the second power line VDDOH1 through a plurality of connection electrodes extended in the lower direction from the second power line VDDOH1, thereby receiving the power source voltage VDD from the second power line VDDOH1. A plurality of unit regions O arranged in the second and third rows are connected to the second power line VDDOH2 through a plurality of connection electrodes extended in the up and down direction from the second power line VDDOH2, thereby receiving the power source voltage VDD from the second power line VDDOH2. A plurality of unit regions O arranged in the fourth row are connected to the second power line VDDOH3 through a plurality of connection electrodes extended in the upper direction from the second power line VDDOH3, thereby receiving the power source voltage VDD from the second power line VDDOH3.

Figure 24:
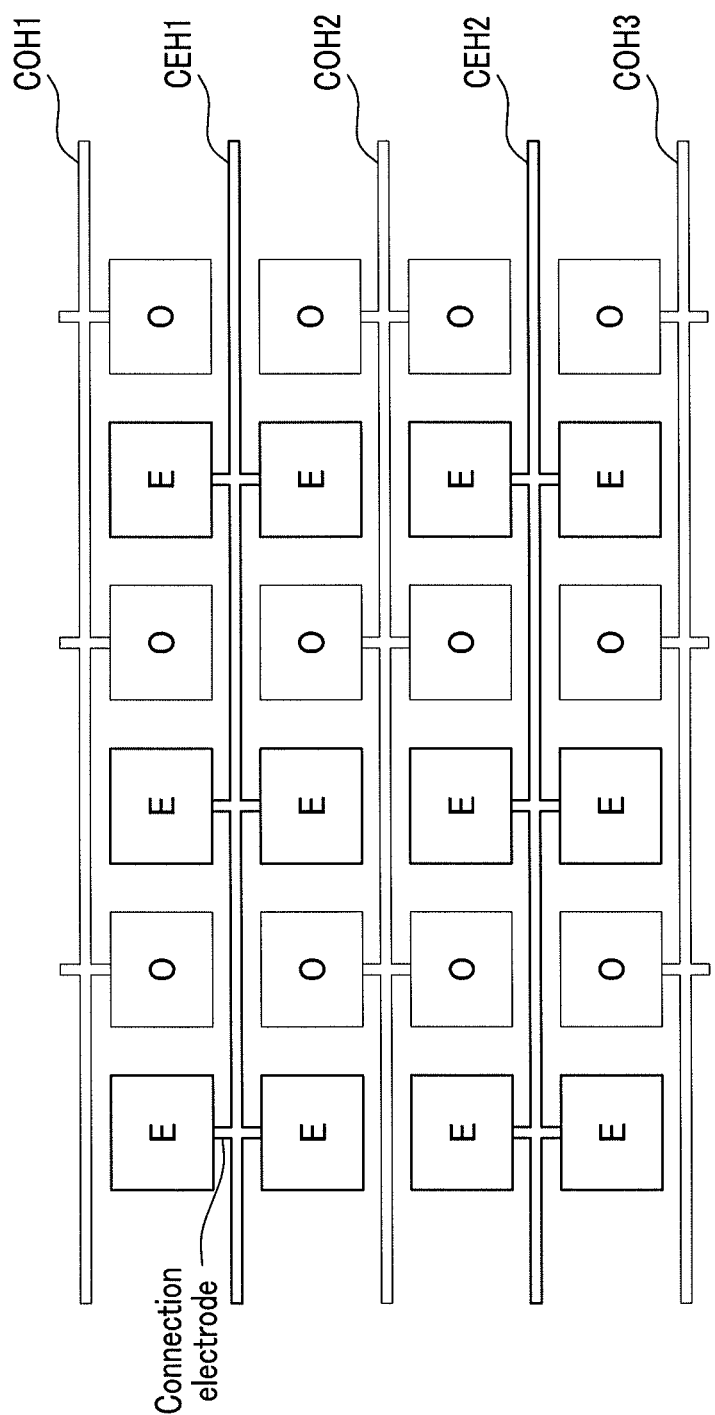
FIG. 24 illustrates a view showing signal lines transmitting a first compensation control signal and a second compensation control signal, the signal lines being formed in a horizontal direction and arranged in a vertical direction when unit regions are arranged as in FIG. 2B.

FIG. 24 illustrates a view showing signal lines transmitting a first compensation control signal and a second compensation control signal, the signal lines being formed in a horizontal direction and arranged in a vertical direction when unit regions are arranged as in FIG. 2B. In FIG. 24, a plurality of first and second control signal lines are arranged the same as in FIG. 20.

A plurality of unit regions E arranged in the first and second rows are connected to the first control signal line CEH1 through a plurality of connection electrodes extended in the up and down direction from the first control signal line CEH1, thereby receiving the first compensation control signal GCE from the first control signal line CEH1. A plurality of unit regions E arranged in the third row and fourth row are connected to the first control signal line CEH2 through a plurality of connection electrodes extended in the up and down direction from the first control signal line CEH2, thereby receiving the first compensation control signal GCE from the first control signal line CEH2.

A plurality of unit regions O arranged in the first row are connected to the second control signal line COH1 through a plurality of connection electrodes extended in the lower direction from the second control signal line COH1, thereby receiving the second compensation control signal GCO from the second control signal line COH1. A plurality of unit regions O arranged in the second row and third row are connected to the second control signal line COH2 through a plurality of connection electrodes extended from the second control signal line COH2 in the up and down direction, thereby receiving the second compensation control signal GCO from the second control signal line COH2. A plurality of unit regions O arranged in the fourth row are connected to the second control signal line COH3 through a plurality of connection electrodes extended from the second control signal line COH3 in the upper direction, thereby receiving the second compensation control signal GCO from the second control signal line COH3.

Figure 25:
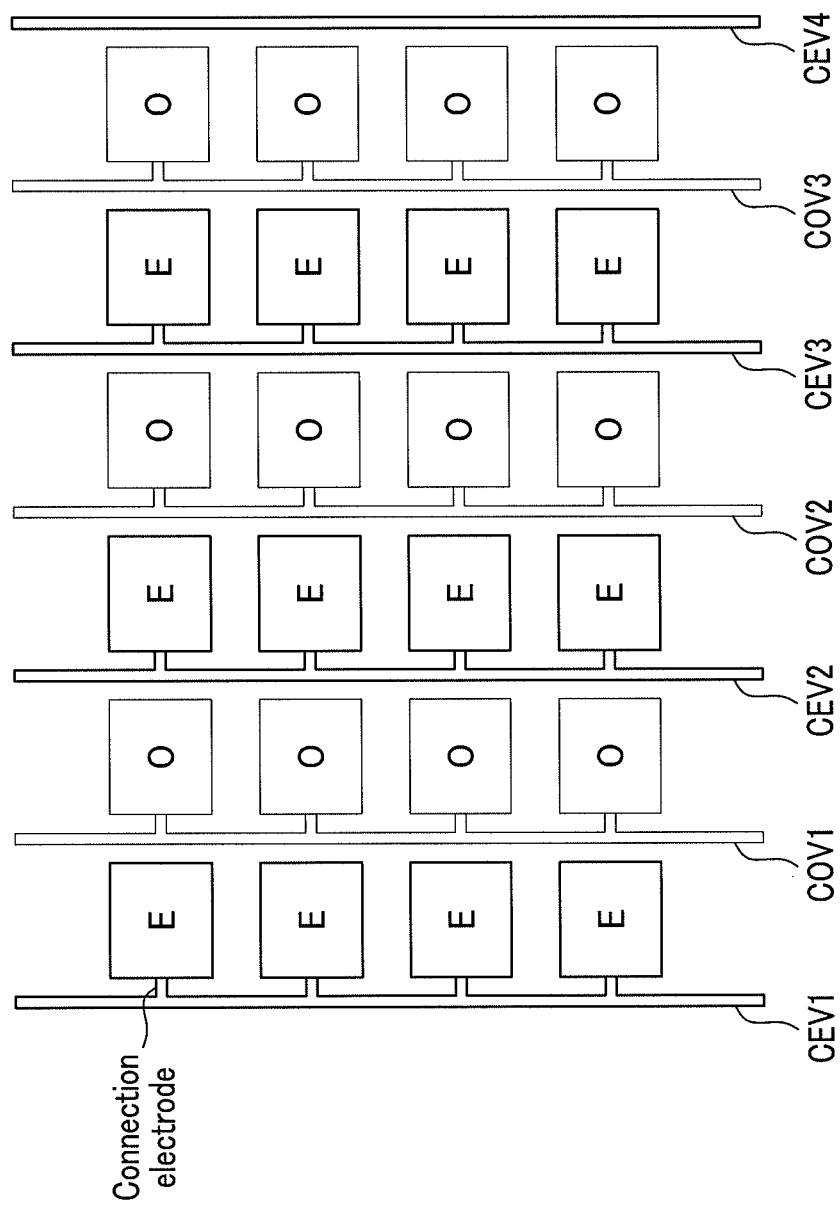
FIG. 25 illustrates a view showing signal lines transmitting a first compensation control signal and a second compensation control signal, the signal lines being formed in a vertical direction and arranged in a horizontal direction when unit regions are arranged as in FIG. 2B.

FIG. 25 illustrates a view showing signal lines transmitting a first compensation control signal and a second compensation control signal, the signal lines being formed in a vertical direction and arranged in a horizontal direction when unit regions are arranged as in FIG. 2B. A plurality of first and second control signal lines shown in FIG. 25 is disposed as in FIG. 21.

In the example shown in FIG. 25, a plurality of unit regions E arranged in the first column are connected to the first control signal line CEV1 through a plurality of connection electrodes extended from the first control signal line CEV1 in the right side, thereby receiving the first compensation control signal GCE from the first control signal line CEV1. A plurality of unit regions E arranged in the third column and fifth column are respectively connected to the first control signal line CEV2 and the first control signal line CEV3 through a plurality of connection electrodes, thereby receiving the first compensation control signal GCE from the first control signal line CEV2 and the first control signal line CEV3.

A plurality of unit regions O arranged in the second column are connected to the second control signal line COV1 through a plurality of connection electrodes extended from the second control signal line COV1 in the right side, thereby receiving the second compensation control signal GCO from the second control signal line COV1. A plurality of unit regions O arranged in the fourth column and sixth column are respectively connected to the second control signal line COV2 and the second control signal line COV3 through a plurality of connection electrodes, thereby receiving the second compensation control signal GCO from the second control signal line COV2 and the second control signal line COV3.

Figure 26:
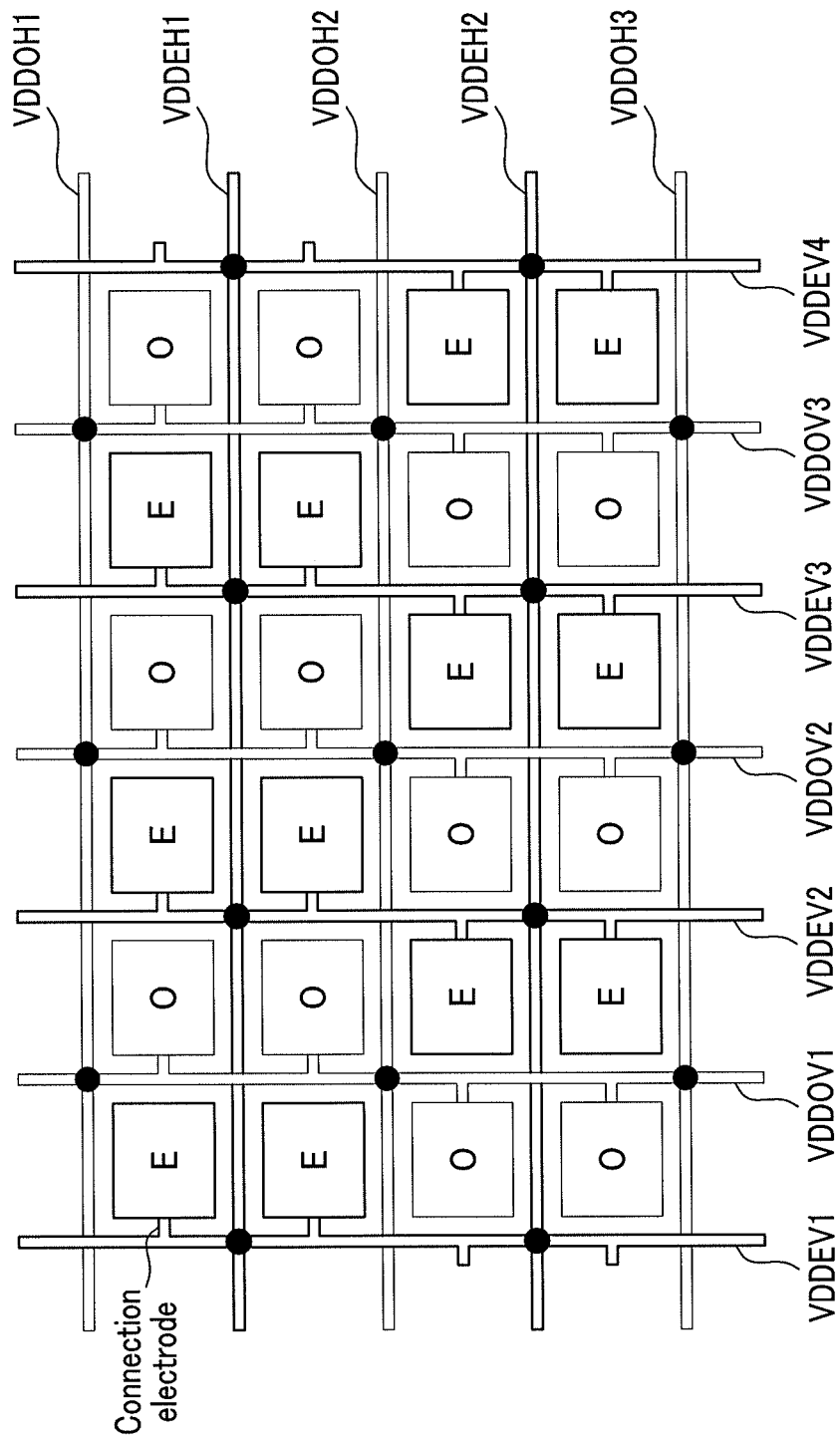
FIG. 26 and FIG. 27 illustrate views of a connection structure between a power line and a unit region according to an arrangement method shown in FIG. 2D.
Figure 27:
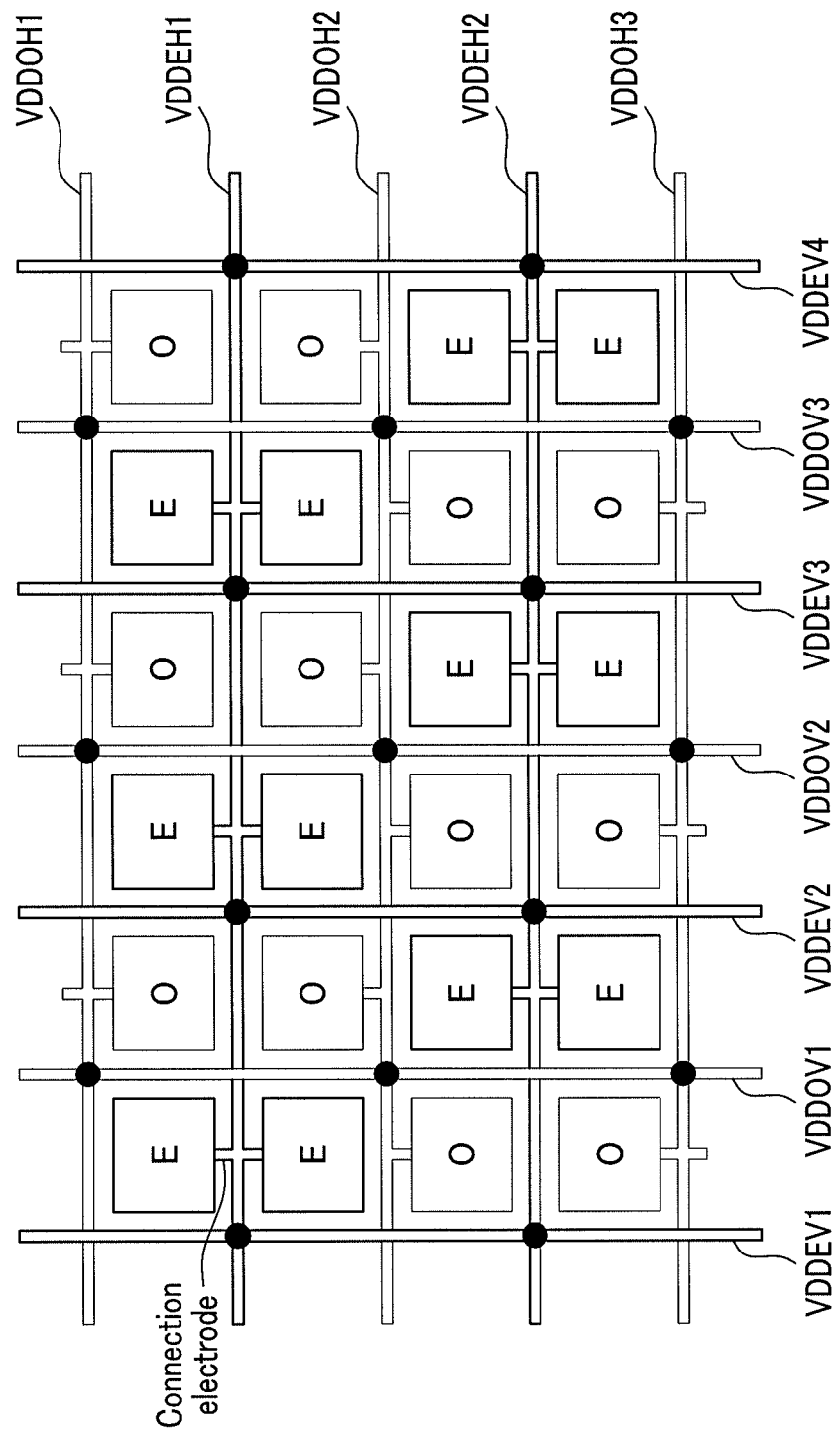

FIG. 26 and FIG. 27 illustrate views of a connection structure between a power line and a unit region in a case of a plurality of unit regions according to an arrangement method shown in FIG. 2D. The connection relation between a plurality of first power lines and the connection relation between a plurality of second power lines are the same as those of FIG. 14.

In the example shown in FIG. 26, a plurality of unit regions E arranged in the first column are connected to the first power line VDDEV1 through a plurality of connection electrodes extended from the first power line VDDEV1 in the right side, thereby receiving the power source voltage VDD from the first power line VDDEV1. A plurality of unit regions E arranged in the second column and third column are connected to the first power line VDDEV2 through a plurality of connection electrodes extended from the first power line VDDEV2 in the right side or the left side, thereby receiving the power source voltage VDD from the first power line VDDEV2. A plurality of unit regions E arranged in the fourth column and fifth column are connected to the first power line VDDEV3 through a plurality of connection electrodes extended from the first power line VDDEV3 in the right side or the left side, thereby receiving the power source voltage VDD from the first power line VDDEV3. A plurality of unit regions E arranged in the sixth column are connected to the first power line VDDEV4 through a plurality of connection electrodes formed from the first power line VDDEV4 in the left side, thereby receiving the power source voltage VDD from the first power line VDDEV4.

A plurality of unit regions O arranged in the first column and second column are connected to the second power line VDDOV1 through a plurality of connection electrodes extended from the second power line VDDOV1 in the right side or the left side, thereby receiving the power source voltage VDD from the second power line VDDOV1. A plurality of unit regions O arranged in the third column and fourth column are connected to the second power line VDDOV2 through a plurality of connection electrodes formed from the second power line VDDOV2 in the right side or the left side, thereby receiving the power source voltage VDD from the second power line VDDOV2. A plurality of unit regions O arranged in the fifth column and sixth column are connected to the second power line VDDOV3 through a plurality of connection electrodes extended from the second power line VDDOV3 in the right side or the left side, thereby receiving the power source voltage VDD from the second power line VDDOV3.

In a different example, as shown in FIG. 27, a plurality of unit regions E arranged in the first and second rows are connected to the first power line VDDEH1 through a plurality of connection electrodes extended from the first power line VDDEH1 in the up and down direction, thereby receiving the power source voltage VDD from the first power line VDDEH1. A plurality of unit regions E arranged in the third and fourth rows are connected to the first power line VDDEH2 through a plurality of connection electrodes formed in the up and down direction, thereby receiving the power source voltage VDD from the first power line VDDEH2.

A plurality of unit regions O arranged in the first row are connected to the second power line VDDOH1 through a plurality of connection electrodes extended from the second power line VDDOH1 in the lower direction, thereby receiving the power source voltage VDD. A plurality of unit regions O arranged in the second row and third row are connected to the second power line VDDOH2 through a plurality of connection electrodes extended from the second power line VDDOH2 in the up and down side, thereby receiving the power source voltage VDD. A plurality of unit regions O arranged in the fourth row are connected to the second power line VDDOH3 extended from the second power line VDDOH3 in the upper direction, thereby receiving the power source voltage VDD.

Figure 28:
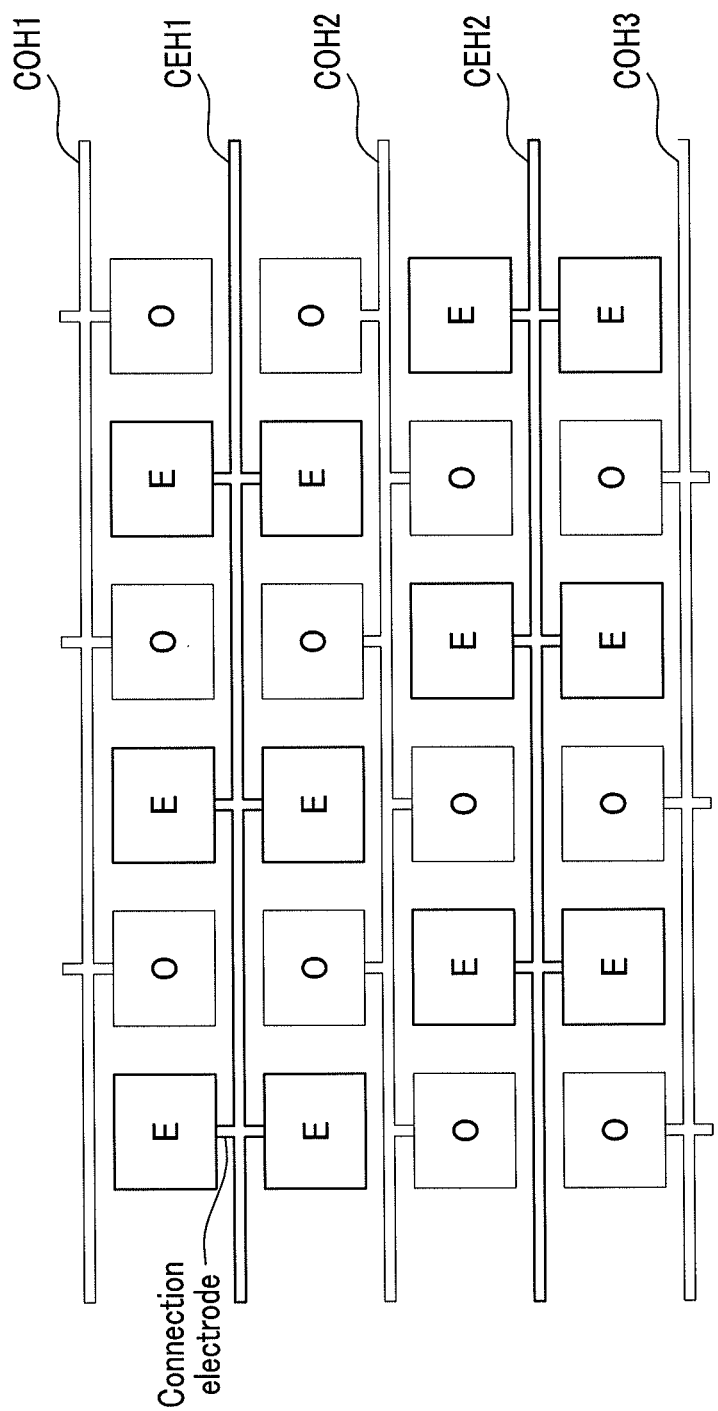
FIG. 28 illustrates a view showing signal lines transmitting a first compensation control signal and a second compensation control signal, the signal lines being formed in a horizontal direction and arranged in a vertical direction when unit regions are arranged as in FIG. 2D.

FIG. 28 illustrates a view showing signal lines transmitting a first compensation control signal and a second compensation control signal, the signal lines being formed in a horizontal direction and arranged in a vertical direction when unit regions are arranged as in FIG. 2D. In FIG. 28, a plurality of first and second control signal lines are disposed as in FIG. 20.

In the example shown in FIG. 28, a plurality of unit regions E arranged in the first and second rows are connected to the first control signal line CEH1 through a plurality of connection electrodes extended from the first control signal line CEH1 in the up and down direction, thereby receiving the first compensation control signal GCE from the first control signal line CEH1. A plurality of unit regions E arranged in the third row and fourth row are connected to the first control signal line CEH2 through a plurality of connection electrodes, thereby receiving the first compensation control signal GCE from the first control signal line CEH2.

A plurality of unit regions O arranged in the first row are connected to the second control signal line COH1 through a plurality of connection electrodes extended in the down direction from the second control signal line COH1, thereby receiving the second compensation control signal GCO from the second control signal line COH1. A plurality of unit regions O arranged in the second row and third row are connected to the second control signal line COH2 through a plurality of connection electrodes extended from the second control signal line COH2 in the up and down direction, thereby receiving the second compensation control signal GCO from the second control signal line COH2. A plurality of unit regions O arranged in the fourth row are connected to the second control signal line COH3 through a plurality of connection electrodes extended from the second control signal line COH3 extended in the upper direction, thereby receiving the second compensation control signal GCO from the second control signal line COH3.

Figure 29:
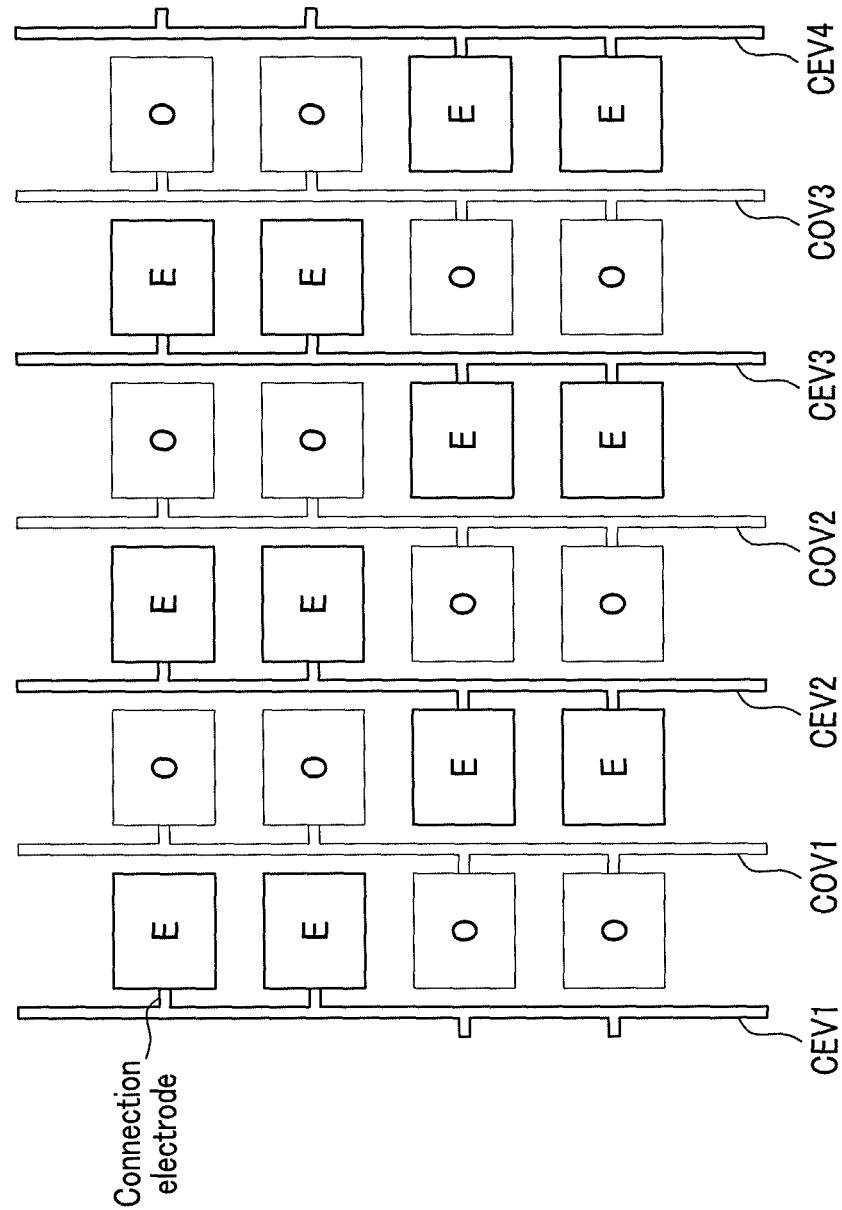
FIG. 29 illustrates a view showing signal lines transmitting a first compensation control signal and a second compensation control signal, the signal lines being formed in a vertical direction and arranged in a horizontal direction when unit regions are arranged as in FIG. 2D.

FIG. 29 illustrates a view showing signal lines transmitting a first compensation control signal and a second compensation control signal, the signal lines being formed in a vertical direction and arranged in a horizontal direction when unit regions are arranged as in FIG. 2D. A plurality of first and second control signal lines shown in FIG. 29 are disposed as in FIG. 21.

In the example shown in FIG. 29, a plurality of unit regions E arranged in the first column are connected to the first control signal line CEV1 through a plurality of connection electrodes extended from the first control signal line CEV1 in the right side, thereby receiving the first compensation control signal GCE from the first control signal line CEV1. A plurality of unit regions E arranged in the second column and third column are connected to the first control signal line CEV2 through a plurality of connection electrodes extended from the first control signal line CEV2 in the right side or the left side, thereby receiving the first compensation control signal GCE from the first control signal line CEV2. A plurality of unit regions E arranged in the fourth column and fifth column are connected to the first control signal line CEV3 through a plurality of connection electrodes extended from the first control signal line CEV3 in the right side or the left side, thereby receiving the first compensation control signal GCE from the first control signal line CEV3. A plurality of unit regions E arranged in the sixth column are connected to the first control signal line CEV4 through a plurality of connection electrodes extended from the first control signal line CEV4 in the left side, thereby receiving the first compensation control signal GCE from the first control signal line CEV4.

A plurality of unit regions O arranged in the first column and second column are connected to the second control signal line COV1 thorough a plurality of connection electrodes from the second control signal line COV1 in the right side or the left side, thereby receiving the second compensation control signal GCO from the second control signal line COV1. A plurality of unit regions O arranged in the third and fourth columns are connected to the second control signal line COV2 through a plurality of connection electrodes extended from the second control signal line COV2 in the left side or the right side, thereby receiving the second compensation control signal GCO from the second control signal line COV2. A plurality of unit regions O arranged in the fifth and sixth columns are connected to the second control signal line COV3 through a plurality of connection electrodes extended from the second control signal line COV3 in the right side or the left side, thereby receiving the second compensation control signal GCO from the second control signal line COV3.

For better understanding and ease of description, the portion of the display panel in which the unit regions are arranged in the 4×6 matrix is described. The power line and the control signal line are arranged according to the above-described method in the entire display panel. The spirit and scope of the embodiment of the 4×6 matrix is apparent from this disclosure.

Next, a display device according to an example embodiment will be described.

Figure 30:
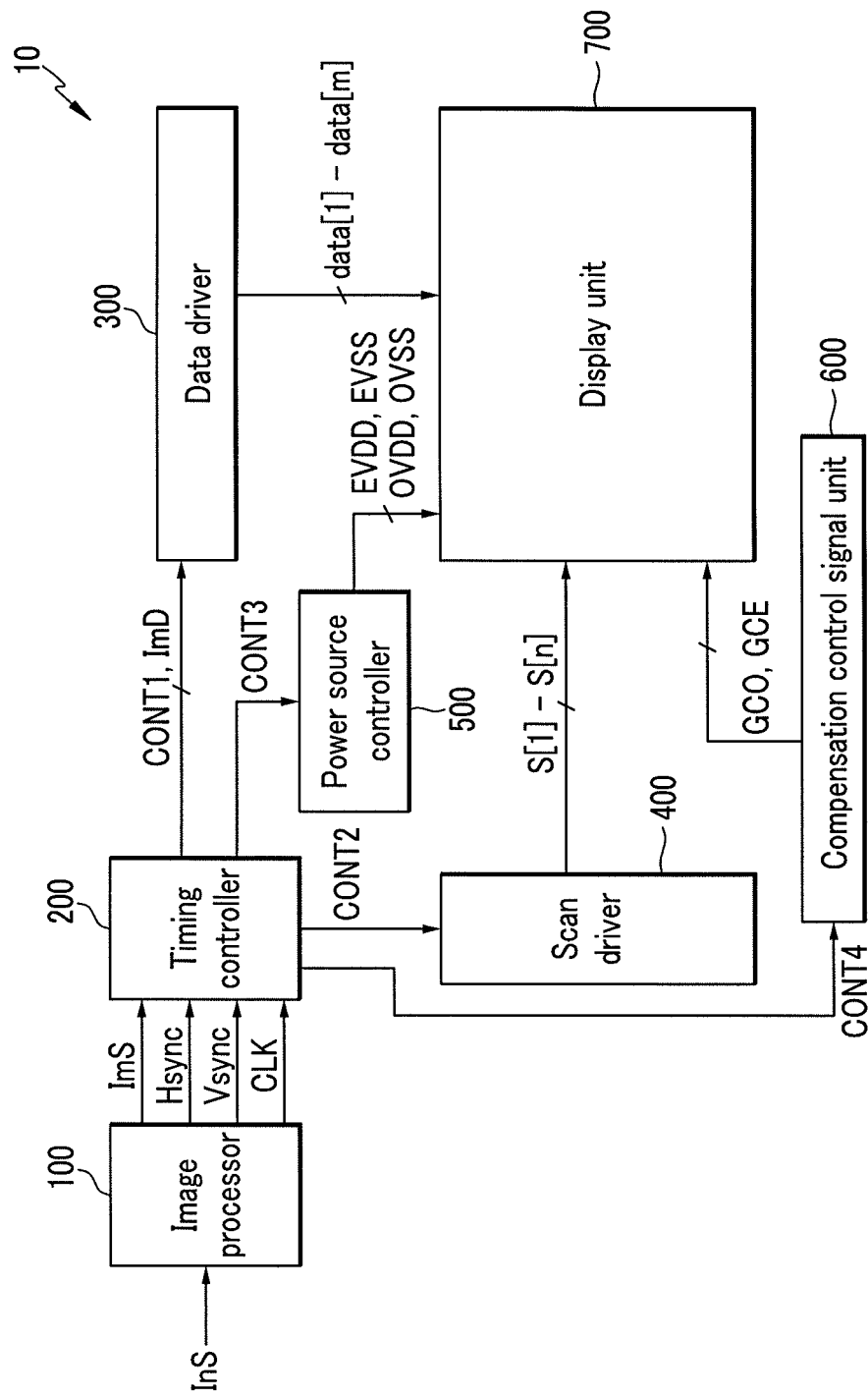
FIG. 30 illustrates a view of a display device according to an example embodiment.

FIG. 30 illustrates a view of a display device according to an example embodiment.

In the example shown in FIG. 30, the display device 10 includes an image processor 100, a timing controller 200, a data driver 300, a scan driver 400, a power source controller 500, a compensation control signal unit 600, and a display unit 700. The above-described display panel may include at least one image processor 100, timing controller 200, data driver 300, scan driver 400, power source controller 500, and compensation control signal unit 600 as well as the display unit 700.

The image processor 100 generates a video signal ImS and a synchronization signal from an input signal InS. The synchronization signal includes a horizontal synchronization signal Hsync, a vertical synchronization signal Vsync, and a main clock signal CLK.

The image processor 100 divides signals into a left-eye image signal, representing a left eye picture, and a right-eye video signal, representing a right eye picture when the signal (hereinafter, image source signal) representing the image included in the input signal InS is a signal displaying a stereoscopic image.

Also, the image processor 100 generates an interpolation video signal representing an interpolation picture from the image source signal according to a stereoscopic image display frequency and an interpolation frequency. The image processor 100 divides the left-eye image signal into a frame unit, and generates the interpolation left-eye image signal representing the interpolation left eye picture as the middle picture between the left eye pictures represented by the left-eye image signals of the continuous frame units. The frame number of the generated interpolation left-eye image signal is determined according to the interpolation frequency. As described above, if the stereoscopic image display frequency and the interpolation frequency are equal to each other, the interpolation left-eye image signal of one frame is generated, and if the interpolation frequency is twice the stereoscopic image display frequency, the interpolation left-eye image signal of three frames is generated.

Likewise, the image processor 100 divides the right-eye image signal into a frame unit, and generates an interpolation right-eye image signal representing an interpolation right eye picture as a middle picture between the right eye pictures represented by the right-eye image signals of the continuous frame units. The frame number of the generated interpolation left-eye image signal is determined according to the interpolation frequency. If the stereoscopic image display frequency and the interpolation frequency are equal to each other, the interpolation right image signal of one frame is generated, and if the interpolation frequency is twice the stereoscopic image display frequency, the interpolation right-eye image signal of three frames is generated.

The original left eye picture corresponds to the left-eye image signal of the frame unit, and the original right eye picture corresponds to the right-eye video signal of the frame unit. The interpolation left eye pictures L1, L2, and L3 correspond to the interpolation left-eye image signal of the frame unit, and the interpolation right eye pictures R1, R2, and R3 correspond to the interpolation right-eye video signal of the frame unit.

The image processor 100 arranges the left-eye image signal, the interpolation left-eye image signal, the right-eye video signal, and the interpolation right-eye video signal according to the selected field, vertical synchronization, and horizontal synchronization to generate the video signal ImS. The image processor 100 extracts the signal according to the selected field from the left-eye image signal, the interpolation left-eye image signal, the right-eye video signal, and the interpolation right-eye video signal.

When the left-eye image signal is displayed in the light emitting period of the first field, only the signal corresponding to the data signal transmitted to the first group pixels is extracted among the left-eye image signal data signal. The signal according to the selected field is only extracted from the interpolation left-eye image signal, the right-eye video signal, and the interpolation right-eye video signal by the above-described method. The image processor 100 divides the extracted signals for the frame according to the vertical synchronization, and divides and arranges them for each pixel row according to the horizontal synchronization.

In detail, the video signal ImS according to the equal-interval light emitting mode shown in FIG. 4 is the signal in which the video signal including the left eye picture LE[n] and the interpolation left eye picture LE1[n] and the video signal including the right eye picture RO[n] and the interpolation right eye picture RO1[n] are arranged according to the synchronization. Due to the arrangement according to the synchronization, when the video signal ImS is a series signal, the signals representing the left eye picture LE[n], the right eye picture RO[n], the interpolation left eye picture LE1[n], and the interpolation right eye picture RO1[n] are arranged in the video signal ImS.

When the image processor 100 does not depend on the equal-interval light emitting mode but depends on the concatenation light emitting mode, the interpolation video signal is not generated. The image processor 100 arranges the left-eye image signal and the right-eye video signal according to the selected field, the vertical synchronization, and the horizontal synchronization to generate the video signal ImS. The image processor 100 extracts the signal depending on the selected field from the left-eye image signal and the right-eye video signal.

The image processor 100 divides the signal corresponding to the data signal transmitted to the first group pixels (the first field light emitting period) and the signal corresponding to the data signal transmitted to the second group pixels (the second field light emitting period) among the left-eye image signal. The image processor 100 divides the signal corresponding to the data signal transmitted to the first group pixels (the light emitting period the first field) and the signal corresponding to the data signal transmitted to the second group pixels (the light emitting period of the second field) among the right-eye video signal. The image processor 100 divides the divided signals for the frame according to the vertical synchronization, and divides and arranges for each pixel row according to the horizontal synchronization.

In detail, the video signal ImS according to the equal-interval light emitting mode shown in FIG. 9 is the signal in which the left-eye image signal, including the left eye picture LE[n] and the left eye picture LO[n], and the right eye-video signal, including the right eye picture RE[n] and the right eye picture RO[n], are arranged according to the synchronization. Due to the arrangement according to the synchronization, when the video signal ImS is the series signal, the signals representing the left eye picture LE[n], the left eye picture LO[n], the right eye picture RE[n], and the right eye picture RO[n] are arranged in the video signal ImS.

When the image source signal is the signal representing the plane image, the image processor 100 divides the image source signal representing the plane picture into the frame unit and generates the interpolation video signal representing the interpolation picture from the image source signal according to the plane image display frequency and the interpolation frequency.

The image processor 100 generates the interpolation video signal representing the interpolation picture as the middle picture between the pictures represented by the image source signals of the continuous frame units. The frame number of the generated interpolation video signal is generated according to the interpolation frequency. As described above, if the plane image display frequency and the interpolation frequency are equal to each other, the interpolation video signal of one frame is generated, and if the interpolation frequency is twice the plane image display frequency, the interpolation video signal of 3 frames is generated.

The original plane picture corresponds to the plane video signal of the frame unit, and the interpolation plane pictures F1, F2, and F3 correspond to the interpolation video signal of the frame unit.

The image processor 100 arranges the plane video signal and the interpolation video signal according to the selected field, the vertical synchronization, and the horizontal synchronization to generate the video signal ImS. The image processor 100 extracts the signals depend on the selected field from the plane video signal and the interpolation video signal.

When the plane video signal is displayed in the light emitting period of the first field, only the signal corresponding to the data signal transmitted to the first group pixels is extracted among the plane video signal. The signal depending on the field selected from the interpolation video signal is extracted by the above method. The image processor 100 divides the extracted signals for the frame according to the vertical synchronization, and divides and arranges them for each pixel row according to the horizontal synchronization.

In the example shown in FIG. 11, when the interpolation frequency is 240 Hz in the equal-interval light emitting mode, the interpolation video signal of three frames is generated between the plane video signals of the continuous frame units. In the example shown in FIG. 10, the plane video signal of the frame unit is displayed in the light emitting period 1FE"[n]_4 of the first field such that only the signal representing the data signal corresponding to the first group pixels is extracted. Among the interpolation video signals of three frames, the interpolation video signal of the first frame is selected as the second field, the interpolation video signal of the next frame is selected as the first field, and the interpolation video signal of the next frame is selected as the second field, and thereby only the signal representing the data signal according thereto is extracted. The image processor 100 arranges the extracted signals according to the vertical and horizontal synchronization to generate the video signal ImS.

In the example shown in FIG. 13, when the interpolation frequency is 120 Hz in the concatenation light emitting mode, the interpolation video signal of one frame is generated between the plane video signals of the continuous frame units. In the example shown in FIG. 12, the plane video signal of the frame unit is displayed in the light emitting period 1FE'''[n]_4 of the first field and the light emitting period 1FO'''[n]_4 of the second field such that the signal representing the data signal corresponding to the first group pixels and the signal representing the data signal corresponding to the second group pixels are divided. The interpolation video signal of one frame is displayed in the light emitting period 2FE'''[n]_4 of the first field and the light emitting period 2FO'''[n]_4 of the second field is displayed such that the signal representing the data signal corresponding to the first group pixels and the signal representing the data signal corresponding to the second group pixels are divided. The image processor 100 arranges the divided signals according to the vertical and horizontal synchronizations to the video signal ImS.

The image processor 100 generates the horizontal synchronization signal Hsync, the vertical synchronization signal Vsync, and the main clock signal CLK according to the synchronization signal.

When the stereoscopic image display frequency or the plane image display frequency is 120 Hz, the entire scan of the display unit is generated four times during the unit time of 1/60 second such that the vertical synchronization signal Vsync is 240 Hz. The horizontal synchronization signal Hsync as the frequency determined according to the scan period 3 among one frame period is set up as the frequency to transmit the data signal to the entire pixels of one among the first group pixels and the second group pixels during the scan period 3.

In detail, as shown in FIG. 2A, when the first group pixels and the second group pixels are not mixed in each row, only half among the entire scan lines may be scanned during the scan period 3. Accordingly, if the scan period 3 is divided by the number of the half of the entire scan lines, the scan period permitted for each scan line is determined and the frequency of the horizontal synchronization signal Hsync is determined.

However, as shown in FIGS. 2B, 2C, and 2D, when the first group pixels and the second group pixels are mixed for each row, the entire scan line is scanned during the scan period 3. Accordingly, if the scan period 3 is divided by the number of the entire scan lines, the scan period permitted for each scan line is determined and the frequency of the horizontal synchronization signal Hsync is also determined.

The main clock signal CLK may be a clock signal having the basic frequency included in the image source signal or a clock signal that is appropriately generated according to the necessity of the image processor 100.

The timing controller 200 generates the first to fourth driving control signals CONT1-CONT4 and the image data signal ImD according to the video signal ImS, the vertical synchronization signal Vsync, the horizontal synchronization signal Hsync, and the main clock signal CLK.

The timing controller 200 divides the video signal ImS by the frame unit according to the vertical synchronization signal Vsync and the video signal ImS by the scan line unit according to the horizontal synchronization signal Hsync to generate the image data signal ImD and to transmit it to the data driver 300 along with the first driving control signal CONT1.

The data driver 300 samples and holds the input image data signal ImD according to the first driving control signal CONT1, and transmits a plurality of data signals data[1]-data[m] to a plurality of data lines.

The scan driver 400 generates a plurality of scan signals S[1]-S[n] according to the second driving control signal CONT2, and transmits them to the corresponding scan lines during the scan period 3.

The power source controller 500 determines the level of the power source voltages EVDD, EVSS, OVDD, and OVSS according to the reset period 1, the compensation period 2, the scan period 3, and the light emitting period 4 of the first group pixels and the second group pixels according to the third driving control signal CONT3, and supplies them to the power line.

The compensation control signal unit 600 determines the level of the compensation control signals GCE and GCO during the compensation period 2 of the first group pixels and the second group pixels according to the fourth driving control signal CONT4, and supplies them to the control signal line.

The display unit 700, as the display area including the first group pixels and the second group pixels, is formed with a plurality of data lines transmitting a plurality of data signals data[1]-data[ ], a plurality of scan lines transmitting a plurality of scan signals S[1]-S[n], a plurality of power lines, and a plurality of control signal lines.

An operation of the display device according to an example embodiment will now be described with reference to FIG. 31.

The driving method according to embodiments may be classified according to the level number of a plurality of power source voltages EVDD, EVSS, OVDD, and OVSS. There is a bi-level driving method in which a plurality of power source voltages EVDD, EVSS, OVDD, and OVSS have two levels. There is also a tri-level driving method in which EVDD and OVDD have three levels and EVSS and OVSS are fixed among a plurality of power source voltages EVDD, EVSS, OVDD, and OVSS.

Firstly, the operation of the display device according to the bi-level driving method will be described with reference to FIG. 31.

Figure 31:
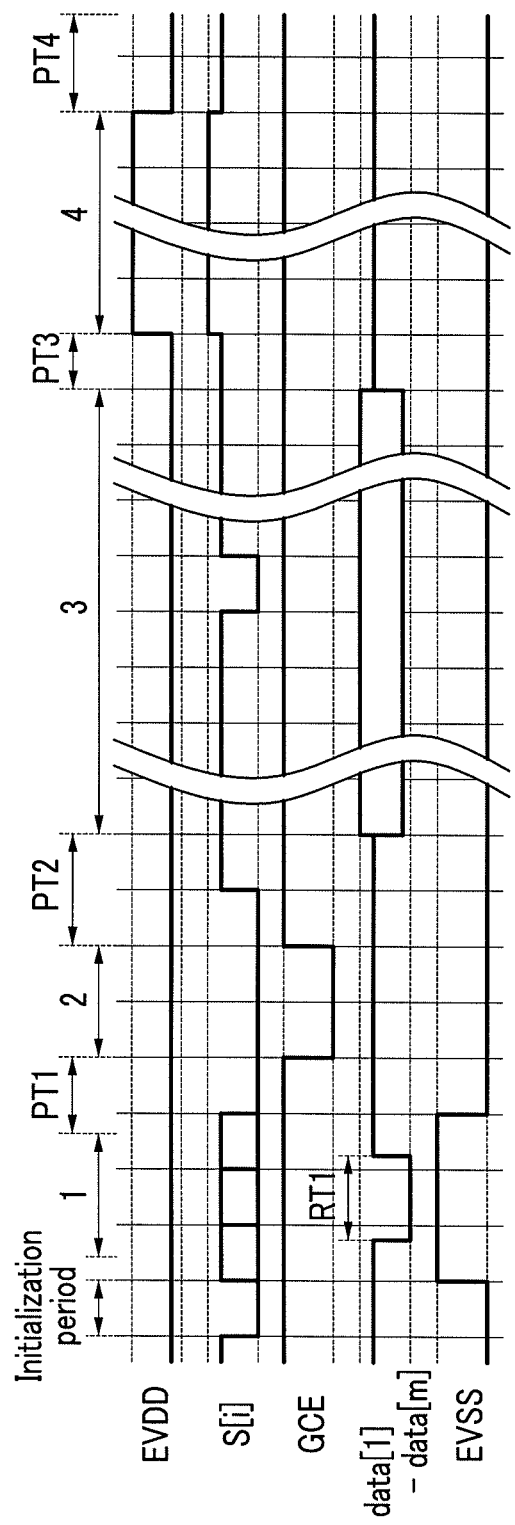
FIG. 31 illustrates a view showing two power source voltages, a scan signal, a compensation control signal, and a data signal according to a bi-level driving method.

FIG. 31 illustrates a view showing two power source voltages, a scan signal, a compensation control signal, and a data signal according to a bi-level driving method.

In FIG. 31, an initialization period is further included before the reset period 1. In other implementations, the initialization period may not be included.

FIG. 31 is a view showing a waveform of the signals during one frame period of the first field. However, the waveform of the signals during one frame period of the second field is the same. The operation of the pixel for each signal will be described with reference to FIG. 3A.

In the present example embodiment, the initialization period is a period in which the scan signals S[1]-S[n] of the high level are decreased to the low level such that the data signals data[1]-data[m] are the high level, and thereby the driving transistor ETR is turned off. All pixels are initialized as a predetermined voltage in the initialization period. The initialization period existing before the operation of every frame is started such that the influence of the previous frame is eliminated, and all pixels execute the compensation operation and the data signal input operation in the same condition.

The influence of the previous frame is eliminated such that a change of the initial operation of the driving transistor according to the data signal input in the previous frame may be prevented. The image quality determination such as after-image generation due to the change of the initial state, motion picture sticking, and crosstalk between the right view point and the left view point in displaying stereoscopic images is prevented, and the image quality is uniform.

The power source voltage EVSS is maintained as the high level 12V during the reset period 1, and a plurality of data signals data[1]-data[n] become the low level 0V in the reset period 1 and are maintained during a predetermined period RT1.

The voltage of the data signals data[1]-data[n] is low such that the gate voltage of the driving transistors ETR and OTR of the pixel is sufficiently decreased, and thereby the driving transistors ETR and OTR may further flow the current. The voltage (generally higher by about 0-3V compared with VSS) of an intrinsic capacitor of the organic light emitting diode OLED is discharged for the anode voltage of the organic light emitting diode OLED_E and OLED_O to be the power source voltage EVDD and OVDD voltage during the reset period 1. That is, the voltage of the data signals data[1]-data[n] becomes the minimum value such that the current driving capacity of the driving transistors ETR and OTR is the maximum, and thereby the anode voltage of the organic light emitting diode OLED may be reduced in the shortest time.

The level of a plurality of scan signals S[1]-S[n] is the low level during the period overlapping at least the period RT1 of the reset period 1 by a predetermined period during the reset period 1. The level of the plurality of the scan signals S[1]-S[n] may be one of HLH, HLL, LLH, and LLL during of the period of 3 blocks corresponding to the reset period 1 shown in FIG. 31.

A predetermined interval PT1 exists between the reset period 1 and the compensation period 2. The power source voltage EVSS is decreased to the low level 0V at the timing point when the reset period 1 is finished. If the reset period 1 is finished in the state in which a plurality of scan signals S[1]-S[n] are the low level, the change of the level of a plurality of scan signals S[1]-S[n] is not generated. In FIG. 31, the scan signal S[i] among a plurality of scan signals S[1]-S[n] is shown.

The first compensation control signal GCE is decreased to the low level at the starting point of the compensation period 2, and is maintained as the low level during the compensation period 2. Data signals data[1]-data[m] are maintained as the high level 6V, and the power source voltage EVDD is maintained as the low level 3V.

The compensation transistor ETH is turned on according to the first compensation control signal GCE such that the driving transistor ETR is diode-connected, and the gate electrode of the driving transistor ETR is supplied with the voltage with a value that is determined by subtracting the threshold voltage of the driving transistor ETR from the power source voltage EVDD. Here, the compensation capacitor ECH is charged with the voltage corresponding to the difference between the voltage of the data signal data[j] and the voltage EVDD−VTH that has a value of the threshold voltage VTH subtracted from the power source voltage EVDD.

The predetermined interval PT2 exists between the compensation period 2 and the scan period 3, and scan signals S[1]-S[i] all become the high level among the interval PT2.

Scan signals S[1]-S[n] sequentially become the low level during the scan period 3 such that the switching transistor ETS is turned on. The data signal data[ ] is transmitted to the node MD, where the other electrode of the compensation capacitor ECH and one electrode of the storage capacitor ECS meet each other, during the period in which the switching transistor ETS is turned on.

One electrode of the compensation capacitor ECH is connected to the gate electrode of the driving transistor ETR and is in the floating state. The changing amount of the voltage of the node MD is divided according to the capacitance rate between the storage capacitor ECS and the compensation capacitor ECH, and the changing amount ΔV of the voltage divided to the compensation capacitor ECH is reflected to the gate voltage of the driving transistor ETR. Accordingly, the gate voltage of the driving transistor ETR at the scan period 3 becomes EVDD 3V−VTH+ΔV.

If the scan period 3 is finished, data signals data[1]-data[m] become the voltage 5V of the high level, and the predetermined interval PT3 between the scan period 3 and the light emitting period 4 exists.

If the light emitting period 4 is started, the power source voltage EVDD is increased to the high level 12V, and scan signals S[1]-S[n] are increased from the high level to a further higher level. If the scan signal S[i] is increased to the further higher level, the switching transistor ETS is pulled off such that a leakage current (that may be generated during the light emitting period 4) may be prevented. The voltage of the node MD is approximately within the voltage range of the data line Dj before the light emitting period 4 such that the voltage difference between the drain-source of the switch transistor ETS is not large.

If the power source voltage EVDD is increased at the starting point of the light emitting period 4, the voltage of the node MD and the gate voltage of the driving transistor ETR are increased according to the coupling of the capacitors ECS and ECH by the same amount.

For example, the power source voltage EVDD is increased from 2V to 12V and the voltage of the node MD is also increased by 10V such that the drain-source voltage of the switching transistor ETS is increased by that amount. Generally, the leakage current of the transistor is proportional to the drain-source voltage such that the leakage current flowing from the node MD to the data line is increased.

Accordingly, if the voltage of the data line Dj is increased by at least a middle value of the voltage of the node MD that is increased by the coupling, the drain-source voltage of the switching transistor ETS is decreased such that the leakage current may be reduced.

For example, if the voltage range of the data signal during the scan period is 1-6V, the voltage of the node MD directly after the scan period may be the value in this range. If the power source voltage EVDD is further increased by 10V, the voltage range of the node MD becomes 11-16V, the voltage of the data line Dj is 1V, and the voltage of the node MD is 16V in the worst case such that the drain-source voltage of the switching transistor becomes 15V. However, if the voltage of the data line Dj during the light emitting period 4 is increased to 13.5V, and in the worst case, the drain-source voltage is merely 2.5V. Accordingly, the leakage current may be about reduced to ⅙ (15/2.5).

The power source voltage EVDD is increased such that the driving transistor ETR generates the driving current according to the difference between the source voltage and the gate voltage. The threshold voltage VTH is again subtracted from the voltage of the gate voltage EVDD (3V−VTH+ΔV) subtracted from the source voltage EVDD (12V) of the driving transistor ETR such that the driving current of the driving transistor ETR becomes the current corresponding to the square of the voltage (9V−ΔV). That is, the deviation according to the same data signal between the driving currents is not generated according to the threshold voltage deviation between the driving transistors.

If the light emitting period 4 is finished, the power source voltage EVDD becomes the low level 3V and the light emitting off period PT4 is generated. The pixel does not emit the light in the light emitting off period PT4 as the interval between the next frame and the current frame.

In FIG. 31, the pixel emitting the light in the first field EFD is described as an example, however the pixel emitting the light in the second field OFD also emits light by the same method. Also, the voltage level that is the example of the high level or the low level is merely one example.

Figure 32:
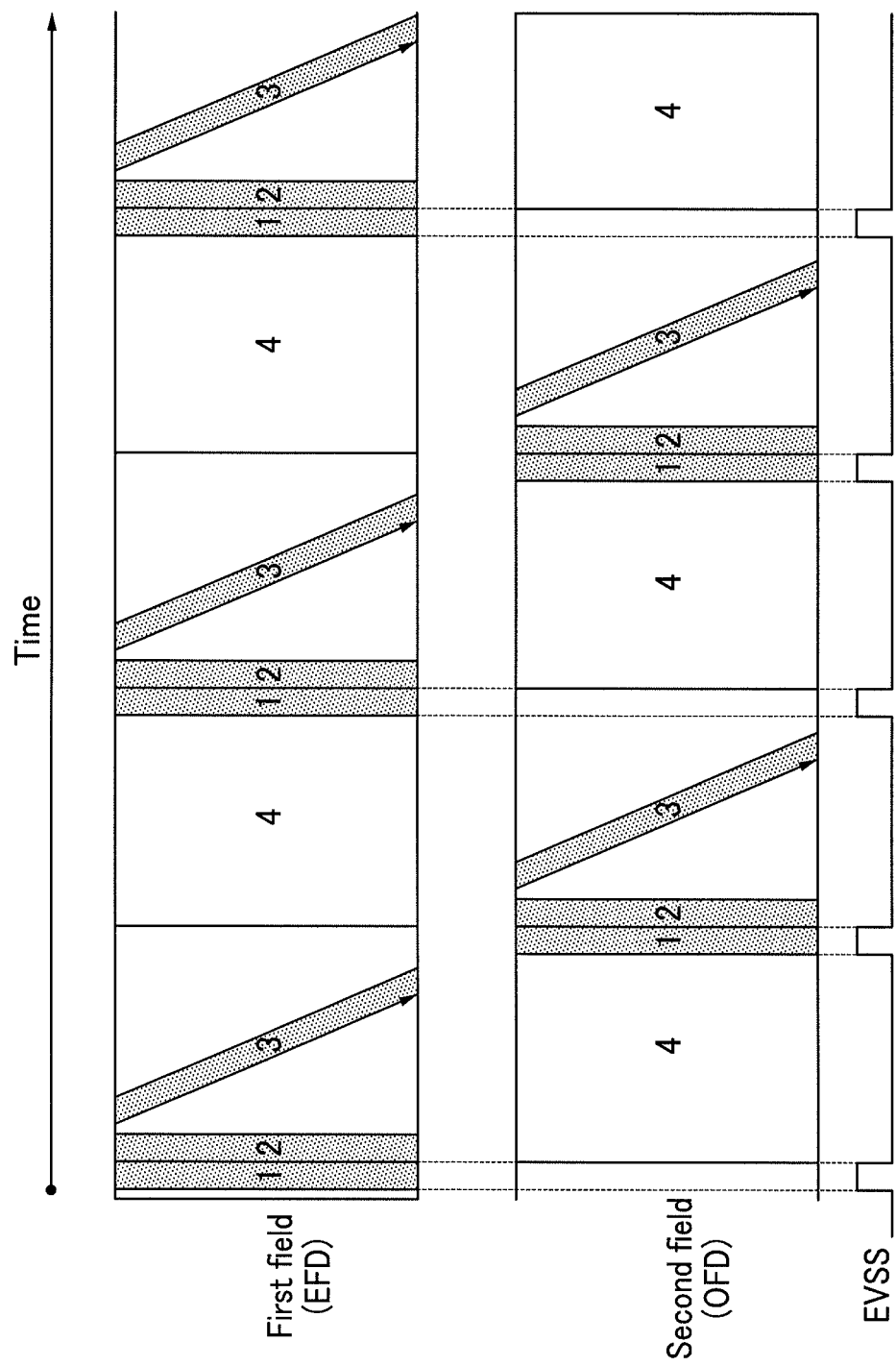
FIG. 32 illustrates a view showing a first field and a second field along with a power source voltage according to a bi-level driving method.

FIG. 32 illustrates a view showing a first field and a second field along with a power source voltage according to a bi-level driving method. One power source voltage may be used when following the bi-level driving method regardless of the power source voltage EVSS and the power source voltage OVSS.

Here, the light emitting period 4 of the first field EFD and the reset period 1 of the second field OFD do not overlap, and the light emitting period 4 of the second field OFD and the reset period 1 of the first field EFD do not overlap.

In the example shown in FIG. 32, the power source voltage EVSS becomes the high level in the reset period 1 of the first field EFD and the reset period 1 of the second field OFD, and becomes the low level in the remaining periods.

Next, the operation of the display device according to the tri-level driving method will be described with reference to FIG. 33.

Figure 33:
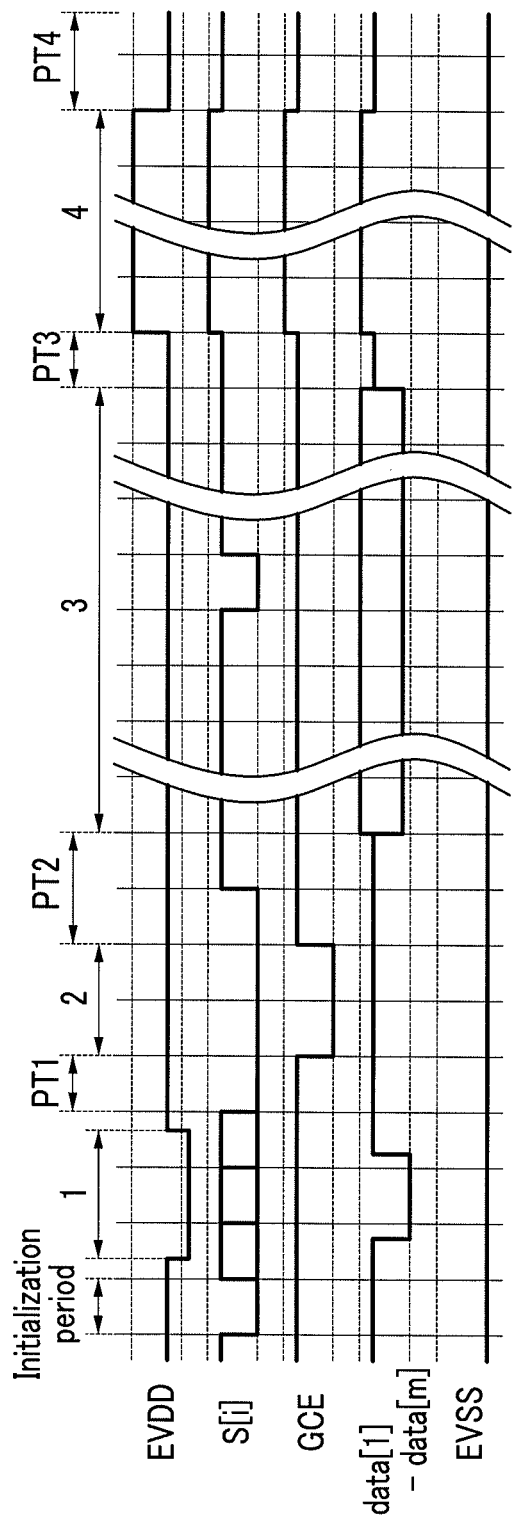
FIG. 33 illustrates a view showing two power source voltages, a scan signal, a compensation control signal, and a data signal according to a tri-level driving method.

FIG. 33 illustrates a view showing two power source voltages, a scan signal, a compensation control signal, and a data signal according to a tri-level driving method. In the tri-level driving method, the level of the power source voltage EVDD and the power source voltage OVDD in the reset period 1 is different from that of the bi-level driving method shown in FIG. 31. The other periods are the same such that the same reference numerals are used, and the detailed description is omitted.

The power source voltage EVDD in the reset period 1 of the tri-level driving method is the low level −3V that is lower than the power source voltage EVDD in the reset period 1 of the bi-level driving method. In the reset period 1 of the tri-level driving method, the power source voltage EVSS is maintained as the low level 0V, and is not increased.

If the power source voltage EVDD becomes −3V, the anode voltage of the organic light emitting diode OLED_E becomes the low voltage close to −3V such that the reset operation is executed.

The level of a plurality of scan signals S[1]-S[n] is irrelevant with regard to the reset operation among the reset period 1 such that the level may be the high level or the low level.

The voltage difference between the power source voltage EVDD and the power source voltage VSS is reversed during the reset period 1. Accordingly, the anode voltage of the organic light emitting diode OLED is higher than the power source voltage EVDD, and the anode of the organic light emitting diode OLED becomes the source at the point of the driving transistor. The gate voltage of the driving transistors ETR and OTR is similar to the power source voltages EVDD and OVDD, however the anode voltage of the organic light emitting diodes OLED_E and OLED_O is a voltage that is very much higher than that.

The anode voltage of the organic light emitting diodes OLED_E and OLED_O is the sum of the power source voltage VSS and the voltage that is stored to the organic light emitting diodes OLED_E and OLED_O (e.g. 0~3V). Therefore, the gate-source voltage of the driving transistors ETR and OTR become enough the negative voltage, and thereby the driving transistors ETR and OTR are turned on.

Here, the current flowing through the driving transistors ETR and OTR flows in the direction from the anode of the organic light emitting diodes OLED_E and OLED_O to the power source voltages EVDD and OVDD, and, eventually, the current flows until the anode voltage of the organic light emitting diodes OLED_E and OLED_O is equal to the power source voltages EVDD and OVDD.

However, the power source voltages EVDD and OVDD may not become a sufficiently low voltage such that the gate voltage of the driving transistors ETR and OTR may not be low enough. In this case, the voltage of the data signals data[1]-data[m] is set up as the low voltage during the reset period 1 and the scan signals S[1]-S[n] are set up as the low level such that the gate voltage may be decreased.

In FIG. 33, a case in which the data signal becomes the low voltage is shown. In another implementation, as described above, when the power source voltage EVDD is low enough, the data signal is not changed to the low level, and the scan signal is the high level.

If the reset operation is completed among the reset period 1, the power source voltage EVDD is increased from the low level −3V to the low level 3V.

Figure 34:
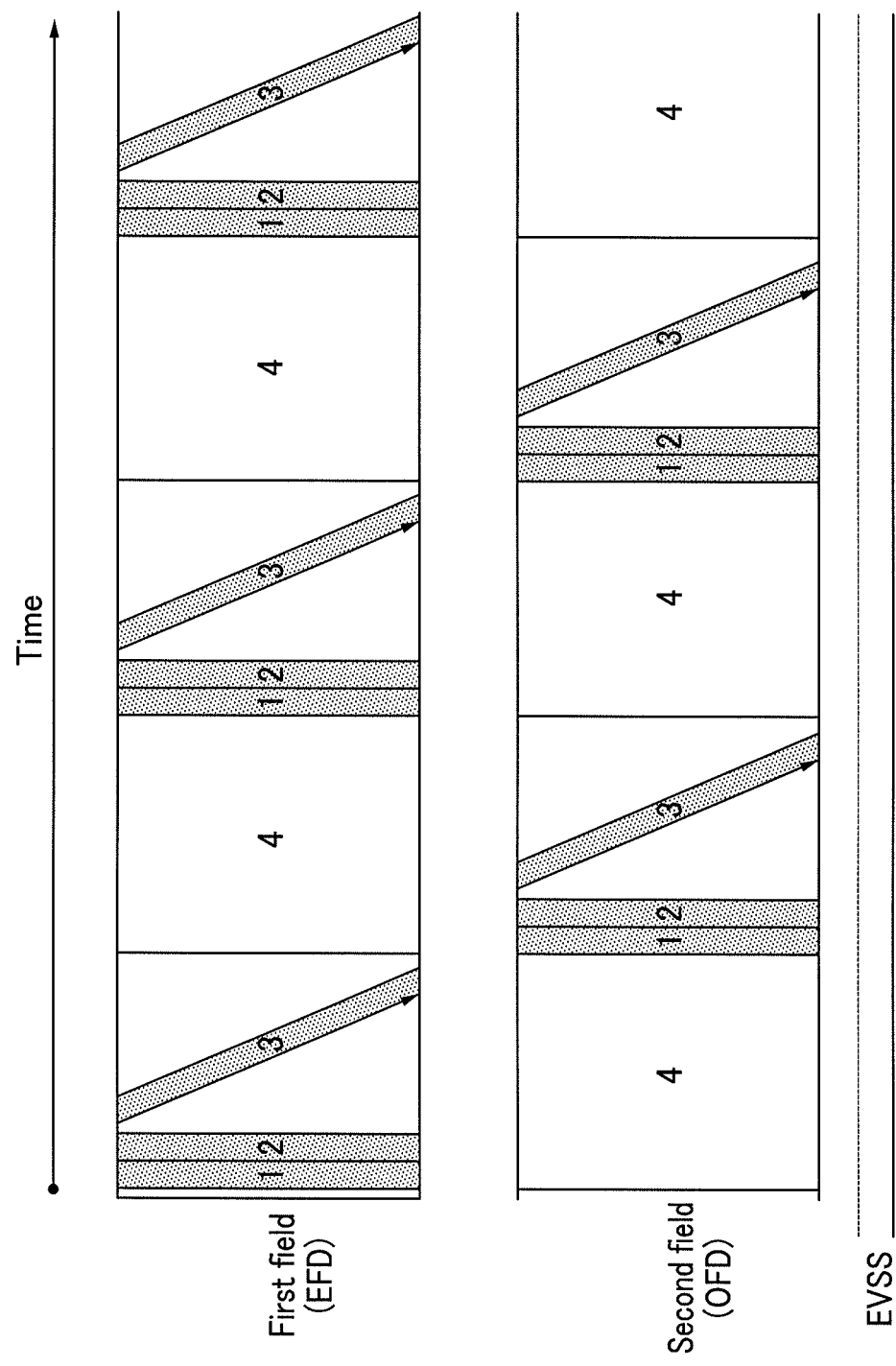
FIG. 34 and FIG. 35 illustrate views showing a first field and a second field along with a power source voltage according to a tri-level driving method.
Figure 35:
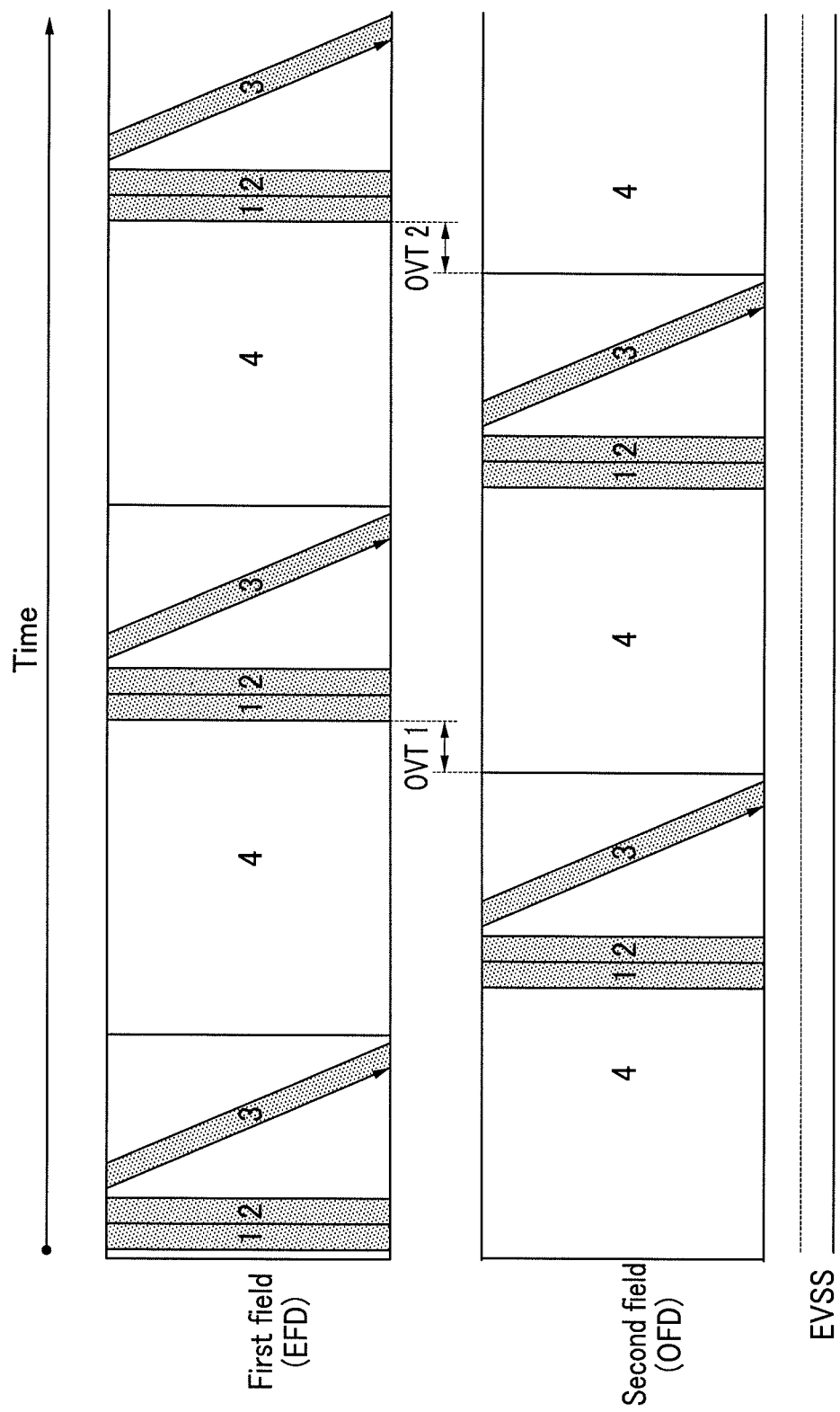

FIG. 34 and FIG. 35 illustrate views showing a first field and a second field along with a power source voltage according to a tri-level driving method. The power source voltage EVSS and the power source voltage OVSS are not swung but are fixed as a constant level, and in the tri-level driving method, the power source voltage EVSS and the power source voltage OVSS may be driven with the same voltage.

As shown in FIG. 34, the power source voltage EVSS is not swung such that the reset period 1 and the compensation period 2 of the first field EFD may overlap the light emitting period 4 of the second field OFD, and the reset period 1 and the compensation period 2 of the second field OFD may overlap the light emitting period 4 of the first field EFD.

Also, as shown in FIG. 35, the light emitting period 4 of the first field EFD and the light emitting period of the second field OFD may overlap. It is possible for the scan period 3 to be a period that is shorter than half of one frame period. The light emitting period 4 of the first field EFD and the second field OFD has the overlapped period such that the motion artifact may be decreased and the light emitting time may be maximized.

The method in which the display device is divided into the first field and the second field and is operated according to an example embodiment is described above. Accordingly, through this driving method, the motion artifact may be reduced and the light emitting time may be maximized such that a display device including an organic light emitting diode OLED of a large size may be realized.

By way of summation and review, embodiments relate to an active matrix type of display device and a driving method. Embodiments provide a display device for displaying a stereoscopic image or a plane image in an environment requiring at least one of a large size and high resolution, and a driving method thereof. A display device capable of reducing a motion artifact and maximizing light emitting time and a driving method thereof are provided. The display device displaying a stereoscopic image or a plane image with a lower driving frequency than the conventional art in an environment requiring at least one of a large size and high resolution, and the driving method thereof, are provided.

Description of Symbols: reset period 1, compensation period 2, scan period 3, light emitting period 4, first field EFD; second field OFD, first unit region E, second unit region O; first horizontal line HE1-HE3, second horizontal line H01-H03, first vertical line VE1-VE4; second vertical line VO1-VO4, first pixel EPX, switching transistor ETS; driving transistor ETR, compensation transistor ETH, compensation capacitor ECH; storage capacitor ECS, second pixel OPX, switching transistor OTS; driving transistor OTR, compensation transistor OTH, compensation capacitor OCH; storage capacitor OCS, original left eye picture L[n], left eye picture LE[n]; original right eye picture R[n], right eye picture RO[n], interpolation picture F1[$n$], F2[$n$], F3[$n$]; interpolation left eye picture L1[$n$], L2[$n$], L3[$n$], interpolation right eye picture R1[$n$], R2[$n$], R3[$n$]; first field light emitting period 1FE [n]_4, 1FE'[n]_4, 1FE''[n]_4, 1FE'''[n]_4, 2FE[n]_4, 2FE'[n]_4, 2FE''[n]_4, 2FE'''[n]_4); second field light emitting period 1FO[n]_4, 1FO'[n]_4, 1FO''[n]_4, 1FO'''[n]_4, 2FO[n]_4, 2FO'[n]_4, 2F0''[n]_4, 2FO'''[n]_4); first power line VDDEH1, VDDEH2, VDDEH3, VDDEV1, VDDEV2, VDDEV3, VDDEV4; second power line VDDOH1, VDDOH2, VDDOH3, VDDOV1, VDDOV2, VDDOV3; first control signal line CEH1, CEH2, CEV1, CEV2, CEV3, CEV4; second control signal line COH1, COH2, COV1, COV2, COV3, display device 10; image processor 100, timing controller 200, data driver 300; scan driver 400, power source controller 500, compensation control signal unit 600, display unit 700.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated.

Accordingly, it will be understood by those of skill in the art that various changes in form and details may be made without departing from the spirit and scope of the present invention as set forth in the following claims.

What is claimed is:
1. A display device, comprising:
a plurality of pixels, each pixel including an organic light emitting diode and a driving transistor controlling a driving current supplied to organic light emitting diode;
a plurality of data lines transmitting a plurality of data signals to the plurality of pixels;
a plurality of scan lines transmitting a plurality of scan signals to the plurality of pixels;
a plurality of first power lines supplying a first power source voltage to the plurality of pixels; and
a plurality of power lines supplying a second power source voltage to the plurality of pixels, wherein an image is displayed while being divided into:
a first field, the first field including a first compensation period in which a threshold voltage of respective driving transistors of first group pixels among the plurality of pixels is compensated, and a first light emitting period in which the first group pixels simultaneously emit light according to a programmed data signal, and
a second field, the second field including a second compensation period in which a threshold voltage of respective driving transistors of second group pixels, different from the first group pixels, among the plurality of pixels is compensated, and a second light emitting period in which the second group pixels simultaneously emit light according to a programmed data signal,
wherein the plurality of first power lines includes:
a plurality of second power lines arranged according to a first direction to supply the first power source voltage to first group pixels,
a plurality of third power lines arranged according to a second direction, intersecting the first direction, to supply the first power source voltage to the first group pixels,
a plurality of fourth power lines arranged according to the first direction, each of the fourth power lines arranged between adjacent ones of the second power lines to supply the first power source voltage to the second group pixels, and
a plurality of fifth power lines arranged according to the second direction, each of the fifth power lines between adjacent ones of the third power lines to supply the first power source voltage to the second group pixels,
wherein the second power lines and the third power lines are connected at respective first nodes,
wherein the fourth power lines and the fifth power lines are connected at respective second nodes, the first and second nodes aligned in a third direction different from the first and second directions.
2. The display device as claimed in claim 1, wherein:
the first group pixels include a plurality of first pixel rows in which first pixels are arranged according to the second direction,
the second group pixels include a plurality of second pixel rows in which second pixels are arranged according to the second direction, and
the plurality of first pixel rows and the plurality of second pixel rows are alternately arranged according to the first direction.

3. The display device as claimed in claim 2, wherein:
the first pixels are connected to an adjacent second power line, and the second pixels are connected to an adjacent fourth power line, or
the first pixels are connected to an adjacent third power line, and the second pixels are connected to an adjacent fifth power line.

4. The display device as claimed in claim 2, wherein:
the first group pixels include first pixels,
the second group pixels include second pixels, and
the first pixels and the second pixels are alternately arranged according to the first direction and the second direction.

5. The display device as claimed in claim 4, wherein:
the first pixels are connected to an adjacent second power line and the second pixels are connected to an adjacent fourth power line, or
the first pixels are connected to an adjacent third power line and the second pixels are connected to an adjacent fifth power line.

6. The display device as claimed in claim 1, wherein:
the first group pixels include a plurality of first pixel columns in which first pixels are arranged according to the first direction,
the second group pixels include a plurality of second pixel columns in which second pixels are arranged according to the first direction, and
the plurality of first pixel columns and the plurality of second pixel columns are alternately arranged according to the second direction.

7. The display device as claimed in claim 6, wherein:
the first pixels are connected to an adjacent second power line, and the second pixels are connected to an adjacent fourth power line, or
the first pixels are connected to an adjacent third power line, and the second pixels are connected to an adjacent fifth power line.

8. The display device as claimed in claim 1, wherein:
the first group pixels includes first pixels,
the second group pixels includes second pixels,
at least two first pixels and at least two second pixels are alternately arranged according to the first direction, and
first pixels and second pixels are alternately arranged according to the second direction.

9. The display device as claimed in claim 8, wherein:
the first pixels are connected to an adjacent second power line, and the second pixels are connected to an adjacent fourth power line, or
the first pixels are connected to an adjacent third power line, and the second pixels are connected to an adjacent fifth power line.

10. The display device as claimed in claim 1, wherein:
each pixel further includes a compensation transistor connected between a gate electrode and a drain electrode of the driving transistor, such that the display device includes a plurality of compensation transistors,
a plurality of first compensation transistors among the plurality of compensation transistors are turned on in the first compensation period, and
a plurality of second compensation transistors, different from the plurality of first compensation transistors, among the plurality of compensation transistors are turned on in the second compensation period.

11. The display device as claimed in claim 10, wherein:
a plurality of first controlling lines transmitting respective compensation control signals to the plurality of first compensation transistors is arranged according to the first direction, and
a plurality of second controlling lines transmitting respective compensation control signals to the plurality of second compensation transistors is arranged between the plurality of first controlling lines according to the first direction.

12. The display device as claimed in claim 11, wherein:
a plurality of first pixels is connected to an adjacent first controlling line, and a plurality of second pixels is connected to an adjacent second controlling line.

13. The display device as claimed in claim 10, wherein:
a plurality of first controlling lines transmitting respective compensation control signals to a plurality of first compensation transistors are extended in a row direction and is arranged according to a column direction, and a plurality of second controlling lines transmitting respective compensation control signals to a plurality of second compensation transistors is extended in the row direction and is arranged between the plurality of first controlling lines according to the column direction, or
a plurality of first controlling lines transmitting respective compensation control signals to a plurality of first compensation transistors is extended in the column direction and is arranged according to the row direction, and a plurality of second controlling lines transmitting respective compensation control signals to a plurality of second compensation transistors is extended in the column direction and is arranged between the plurality of first controlling lines according to the row direction.

14. The display device as claimed in claim 13, wherein:
the first group pixels include a plurality of first pixel rows in which first pixels are arranged according to the row direction,
the second group pixels include a plurality of second pixel rows in which second pixels are arranged according to the row direction,
the first pixels are connected to an adjacent first controlling line, and
the second pixels are connected to an adjacent second controlling line.

15. The display device as claimed in claim 13, wherein:
the first group pixels includes first pixels,
the second group pixels includes second pixels,
the first pixels and the second pixels are alternately arranged according to the row and the column directions,
the first pixels are connected to an adjacent first controlling line, and
the second pixels are connected to an adjacent second controlling line.

16. The display device as claimed in claim 13, wherein:
the first group pixels include a plurality of first pixel columns in which first pixels are arranged according to the column direction,
the second group pixels include a plurality of second pixel columns in which second pixels are arranged according to the column direction,
the plurality of first pixel columns and the plurality of second pixel columns are alternately arranged according to the row direction, the first pixels are connected to an adjacent first controlling line, and the second pixels are connected to an adjacent second controlling line.

17. The display device as claimed in claim 13, wherein:

the first group pixels include first pixels, the second group pixels include second pixels, at least two first pixels and at least two second pixels are alternately arranged according to a column direction, a first pixel and a second pixel are alternately arranged according to a row direction, the first pixels are connected to an adjacent first controlling line, and the second pixels are connected to an adjacent second controlling line.

18. The display device as claimed in claim 1, wherein:

each pixel further includes:
- a switching transistor transmitting a data signal to the driving transistor according to a scan signal;
- a compensation transistor connected between a gate electrode and a drain electrode of the driving transistor;
- a compensation capacitor connected between the switching transistor and the gate electrode of the driving transistor; and
- a storage capacitor connected between the switching transistor and a source electrode of the driving transistor, the first power source voltage is transmitted to the source electrode of the driving transistor, and the second power source voltage is transmitted to a cathode of the organic light emitting diode.

19. The display device as claimed in claim 18, wherein:

the first field further includes a first reset period in which anode voltages of organic light emitting diodes of the first group pixels are reset, and the second field further includes a second reset period in which anode voltages of organic light emitting diode of the second group pixels are reset.

20. The display device as claimed in claim 19, wherein:

the voltage of a plurality of data signals supplied to the first group pixels during the first reset period is a level for resetting the corresponding anode voltages to the first power source voltage supplied to the first group pixels by respective currents flowing to driving transistors of the first group pixels during the reset period.

21. The display device as claimed in claim 19, wherein:

the voltage of a plurality of data signals supplied to the second group pixels during the second reset period is a level for resetting the corresponding anode voltages to the first power source voltage supplied to the second group pixels by respective currents flowing to driving transistors of the second group pixels during the second reset period.

22. The display device as claimed in claim 18, wherein:

during the first light emitting period and the second light emitting period, the first power source voltage has a different level from remaining periods, and is a higher voltage than the second power source voltage.

23. The display device as claimed in claim 22, wherein:

the first field further includes a first reset period resetting anode voltages of organic light emitting diodes of first group pixels, and the second field further includes a second reset period resetting anode voltages of organic light emitting diodes of the second group pixels.

24. The display device as claimed in claim 23, wherein:

the second power source voltage is constantly maintained, and the first power source voltage is a lower level than the second power source voltage during the first reset period and the second reset period.

25. The display device as claimed in claim 24, wherein:

a plurality of compensation transistors of the first group pixels is turned on during the first compensation period, a plurality of compensation transistors of the second group pixels is turned on during the second compensation period, and the first power source voltage during the first compensation period and the second compensation period is different from the first power source voltage of the first reset period and the second reset period.

26. The display device as claimed in claim 25, wherein:

the first power source voltage during the first light emitting period and the second light emitting period is different from the first power source voltage during the first compensation period and the second compensation period, and the first reset period and the second reset period.

27. The display device as claimed in claim 23, wherein:

the first field further includes a first scan period in which data signals are transmitted to compensation capacitors and storage capacitors through switching transistors of the first group pixels, and the second field further includes a second scan period in which plurality of data signals are transmitted to compensation capacitors and storage capacitors through switching transistors of the second group pixels.

28. The display device as claimed in claim 27, wherein:

the first power source voltage during the first scan period and the second scan period is equal to the first power source voltage during the first compensation period and the second compensation period.

29. The display device as claimed in claim 28, wherein:

the first power source voltage during the first light emitting period and the second light emitting period is different from the first power source voltage during the first compensation period, the second compensation period, the first reset period, and the second reset period, and the first power source voltage during the first compensation period and the second compensation period is different from the first power source voltage during the first reset period and the second reset period.

30. The display device as claimed in claim 1, wherein the first field includes a first scan period and the second period includes a second scan period, and in the first light emitting period, the second scan period is provided in which a data signal respectively corresponding to the second group pixels is programmed and generated, and in the second light emitting period, the first second scan period is provided in which a data signal respectively corresponding to the first group pixels is programmed and generated.

* * * * *